(12) United States Patent
Gurfinkel et al.

(10) Patent No.: US 12,443,449 B2
(45) Date of Patent: *Oct. 14, 2025

(54) TECHNIQUES FOR MODIFYING AN EXECUTABLE GRAPH TO PERFORM A WORKLOAD ASSOCIATED WITH A NEW TASK GRAPH

(71) Applicant: NVIDIA CORPORATION, Santa Clara, CA (US)

(72) Inventors: Steven Gurfinkel, Santa Clara, CA (US); Stephen Jones, San Francisco, CA (US); David Fontaine, Mountain View, CA (US); Sally Stevenson, Santa Clara, CA (US); Parag Kulkarni, Pune (IN); Jason Gaiser, Campbell, CA (US); Deyu Fu, Santa Clara, CA (US); Sharan Chetlur, San Jose, CA (US); Kexin Yu, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 499 days.

This patent is subject to a terminal disclaimer.

(21) Appl. No.: 16/732,014

(22) Filed: Dec. 31, 2019

(65) Prior Publication Data

US 2021/0149734 A1 May 20, 2021

(30) Foreign Application Priority Data

Nov. 15, 2019 (IN) .............................. 201941046676

(51) Int. Cl.
*G06F 9/50* (2006.01)
*G06F 9/445* (2018.01)

(52) U.S. Cl.
CPC ........ *G06F 9/5027* (2013.01); *G06F 9/44568* (2013.01)

(58) Field of Classification Search
None
See application file for complete search history.

(56) References Cited

U.S. PATENT DOCUMENTS 7,164,422 B1 * 1/2007 Wholey, III ............. G06F 8/34
345/440.1
8,578,389 B1 * 11/2013 Boucher ............... G06F 9/4494
717/148

(Continued)

FOREIGN PATENT DOCUMENTS

CN 1643498 A 7/2005
CN 108694686 A 10/2018

(Continued)

OTHER PUBLICATIONS

Bakoda et al.; "Analyzing CUDA Workloads Using a Detailed GPU Simulator", University of British Columbia, IEEE 2009; (Bakhoda. pdf; pp. 1-12) (Year: 2009).*

(Continued)

*Primary Examiner* — Hiren P Patel
(74) *Attorney, Agent, or Firm* — Davis Wright Tremaine LLP

(57) ABSTRACT

Techniques to modify executable graphs to perform different workloads. In at least one embodiment, an executable version of a first task graph is modified by applying a non-executable version of a second task graph to executable version of first task graph so that executable version of first task graph can perform a second workload of non-executable version of second task graph.

21 Claims, 42 Drawing Sheets

(56) References Cited

U.S. PATENT DOCUMENTS

| | | | |
|---|---|---|---|
| 9,563,411 B2* | 2/2017 | Roberts | G06F 8/433 |
| 10,055,333 B2* | 8/2018 | Offner | G06F 16/2428 |
| 10,108,321 B2* | 10/2018 | Hachmeister | G06F 3/04812 |
| 10,318,739 B2* | 6/2019 | Brucker | G06F 21/577 |
| 10,416,999 B2 | 9/2019 | Fleming et al. | |
| 10,657,474 B2* | 5/2020 | Moolman | G06F 9/45529 |
| 10,802,945 B2* | 10/2020 | Rozenberg | G06F 8/10 |
| 10,817,406 B2* | 10/2020 | Vigneau | G06F 11/3696 |
| 10,990,364 B2* | 4/2021 | Bach | G06F 8/433 |
| 2004/0243970 A1 | 12/2004 | Ohmori et al. | |
| 2007/0294665 A1 | 12/2007 | Papakipos et al. | |
| 2010/0257538 A1 | 10/2010 | Zhao et al. | |
| 2011/0161939 A1 | 6/2011 | Demiya et al. | |
| 2011/0307897 A1* | 12/2011 | Atterbury | G06F 9/4494 718/102 |
| 2013/0145299 A1 | 6/2013 | Steimle et al. | |
| 2015/0268963 A1* | 9/2015 | Etsion | G06F 9/4881 712/225 |
| 2015/0339209 A1* | 11/2015 | Kerr | G06F 11/3452 717/131 |
| 2016/0034306 A1 | 2/2016 | Galdy et al. | |
| 2016/0071233 A1 | 3/2016 | Macko et al. | |
| 2016/0124998 A1* | 5/2016 | Offner | G06F 16/2428 707/798 |
| 2016/0154634 A1* | 6/2016 | Simitsis | G06F 16/24524 717/156 |
| 2016/0179504 A1* | 6/2016 | Voss | G06F 8/72 717/120 |
| 2016/0188371 A1 | 6/2016 | Munshi et al. | |
| 2016/0357516 A1 | 12/2016 | Kogel et al. | |
| 2017/0124452 A1 | 5/2017 | Tucker et al. | |
| 2018/0157579 A1* | 6/2018 | Rozenberg | G06F 8/71 |
| 2018/0203673 A1* | 7/2018 | Ravishankar | G06N 5/022 |
| 2018/0246988 A1* | 8/2018 | Johnson | G06F 16/9024 |
| 2018/0247243 A1* | 8/2018 | Moolman | G06F 9/45529 |
| 2018/0336020 A1* | 11/2018 | Berg | G06F 16/9024 |
| 2019/0377558 A1* | 12/2019 | Bach | G06F 8/71 |
| 2020/0257672 A1 | 8/2020 | Lee et al. | |
| 2020/0401444 A1* | 12/2020 | Hirota | G06F 9/52 |
| 2021/0149680 A1 | 5/2021 | Hughes et al. | |
| 2021/0149719 A1* | 5/2021 | Jones | G06F 9/541 |
| 2021/0406069 A1 | 12/2021 | Koneru et al. | |

FOREIGN PATENT DOCUMENTS

| | | |
|---|---|---|
| EP | 2287808 A2 | 2/2011 |
| JP | 2007133039 A | 5/2007 |
| WO | 2018155810 A1 | 8/2018 |

OTHER PUBLICATIONS

Extended European Search Report mailed Apr. 13, 2021, for Application No. 20206389.7, 11 pages.
IEEE "IEEE Standard for Floating-Point Arithmetic", Microprocessor Standards Committee of the IEEE Computer Society, IEEE Std 754-2008, dated Jun. 12, 2008.
Jones et al., "Compute Graph Optimization," U.S. Appl. No. 16/786,602, filed Feb. 10, 2020.
Office Action for European Application No. 20206389.7, mailed Jun. 12, 2023, 7 pages.
Office Action for Chinese Application No. 202011280064.3, mailed Feb. 7, 2025, 17 pages.
Office Action for Chinese Application No. 202011280064.3, mailed Jul. 4, 2024, 18 pages.
Wang et al., "Concurrent Composition Method in Data-driven Task Graph Execution," Computer Engineering & Design, 39(3): Mar. 2018, 5 pages.
Notice of Decision to Grant for Chinese Application No. 202011280064. 3, mailed May 1, 2025, 8 pages.
Office Action for Chinese Application No. 202110168290.0, mailed Jun. 23, 2025, 6 pages.
Earwen, "Running Tensorflow Graph Multiple Times Over Different Input Parameters: What Kind of Loop is Efficient," Stack Overflow, Dec. 2017, 3 pages.
Extended European Seach Report for Application No. 20206387.1, Apr. 13, 2021, 10 pages.
Gray, "Getting Started with CUDA Graphs," NVIDIA, retrieved from https://developer.nvidia.com/blog/cuda-graphs, Sep. 2019, 4 pages.
Kaushik et al., "Optimizing Hyperplane Sweep Operations Using Asynchronous Multi-grain GPU Tasks," IEEE, 2019, 11 pages.
Lee, "Turing Architecture and CUDA 10 New Features," retrieved from http://on-demand.gputechconf.com/gtc-kr/2018/pdf/HPC_Minseok_Lee_NVIDIA.pdf, 2018, 38 pages.
Notice of intention to Grant for United Kingdom Application No. GB2101839.5, mailed Dec. 5, 2024, 2 pages.
Nvidia, "CUDA C++ Programming Guide Design Guide," retrieved from https://web.archive.org/web/20200215150315/https://docs.nvidia.com/cuda/pdf/CUDA_C_Programming_Guide.pdf, Nov. 2019, 346 pages.
Office Action for Chinese Application No. 202011280090.6, mailed Dec. 24, 2024, 29 pages.
Office Action for Chinese Application No. 202011280090.6, mailed Jul. 1, 2024, 30 pages.
Office Action for Chinese Application No. 202110168290.0, mailed Aug. 15, 2024, 10 pages.
Office Action for Chinese Application No. 202110168290.0, mailed Jan. 15, 2025, 11 pages.
Office Action for Chinese Application No. 202110168290.0, mailed Jan. 30, 2024, 6 pages.
Office Action for Chinese Application No. 202110168290.0, mailed Jul. 12, 2023, 10 pages.
Office Action for European Application No. 20206387.1, mailed Jun. 13, 2023, 6 pages.
Office Action for United Kingdom Application No. GB2101839.5, mailed Aug. 3, 2022, 5 pages.
Office Action for United Kingdom Application No. GB2101839.5, mailed Feb. 21, 2024, 4 pages.
Office Action for United Kingdom Application No. GB2101839.5, mailed Feb. 27, 2023, 8 pages.
Office Action for United Kingdom Application No. GB2101839.5, mailed May 3, 2022, 5 pages.
Office Action for United Kingdom Application No. GB2101839.5, mailed Nov. 19, 2024, 5 pages.
Office Action for United Kingdom Application No. GB2101839.5, mailed Oct. 7, 2024, 4 pages.
Ramarao et al., "CUDA 10 Features Revealed: Turing, CU DA Graphs, and More," Nvidia Developer, Developer Blog, Sep. 2018, 10 pages.
Sorensen et al., "One Size Doesn't Fit All: Quantifying Performance Portability of Graph Applications on GPUs," IEEE International Symposium on Workload Characterization, 2019, 12 pages.
United Kingdom Combined Search and Examination Report for Patent Application No. 2101839.5 dated Oct. 18, 2021, 8 pages.
United Kingdom Search and Examination Report for Patent Application No. GB2101839.5 mailed Jul. 15, 2024, 8 pages.
Wang et al., "Analysis of the Spark Kernel Mechanism and Performance Tuning," China Machine Press, Jan. 31, 2017, 16 pages.
Decision of Rejection for Chinese Application No. 202011280090. 6, mailed Mar. 3, 2025, 27 pages.

* cited by examiner

```
// Kernel definition
__global__ void MatAdd(float A[N][N], float B[N][N], float C[N][N])
{
   int i = blockIdx.x * blockDim.x + threadIdx.x;
   int j = blockIdx.y * blockDim.y + threadIdx.y;
   if (i < N && j < N)
       C[i][j] = A[i][j] + B[i][j];
}
int main()
{
   ...
   // Kernel call
   dim3 threadsPerBlock(16, 16);
   dim3 numBlocks(N / threadsPerBlock.x, N / threadsPerBlock.y);
   MatAdd<<<numBlocks, threadsPerBlock>>>(A, B, C);
   ...
}
```

CUDA Source Code 2810

↓

CUDA to HIP Translation Tool 2820

CUDA Kernel Launch Syntax 2910

KernelName<<<GridSize, BlockSize, SharedMemorySize, Stream>>>(KernelArguments);

→

HIP Kernel Launch Syntax 2920 hipLaunchKernelGGL(KernelName, GridSize, BlockSize, SharedMemorySize, Stream, KernelArguments);

↓

```
// Kernel definition
__global__ void MatAdd(float A[N][N], float B[N][N], float C[N][N])
{
   int i = blockIdx.x * blockDim.x + threadIdx.x;
   int j = blockIdx.y * blockDim.y + threadIdx.y;
   if (i < N && j < N)
       C[i][j] = A[i][j] + B[i][j];
}
int main()
{
   ...
   // Kernel invocation
   dim3 threadsPerBlock(16, 16);
   dim3 numBlocks(N / threadsPerBlock.x, N / threadsPerBlock.y);
   hipLaunchKernelGGL(MatAdd, numBlocks, threadsPerBlock, 0, 0, A, B, C);
   ...
}
```

HIP Source Code 2830

FIGURE 29

TECHNIQUES FOR MODIFYING AN EXECUTABLE GRAPH TO PERFORM A WORKLOAD ASSOCIATED WITH A NEW TASK GRAPH

CROSS-REFERENCE TO RELATED APPLICATIONS

This application claims the priority benefit of the India Provisional Patent Application titled, "TECHNIQUES FOR MODIFYING AN EXECUTABLE GRAPH TO PERFORM A WORKLOAD ASSOCIATED WITH A NEW TASK GRAPH," filed on Nov. 15, 2019 and having Serial Number 201941046676. The subject matter of this related application is hereby incorporated herein by reference.

FIELD

Various embodiments are described which relate generally to parallel computing and, more particularly, to techniques for modifying an executable graph to perform a workload associated with a new task graph.

BACKGROUND

Task graphs are a useful tool for modeling a workload corresponding to parallel computing tasks. In a task graph, computing tasks are modeled as nodes and dependencies among computing tasks are modeled as directed edges. To be usable to cause one or more computing resources to perform a workload, a task graph is converted to an executable graph. A workload is then performed by configuring, according to an executable graph, each of one or more computing resources to perform tasks, transferring data, if necessary, to one or more computing resources, and retrieving results from one or more computing resources. An executable graph can used multiple times to have a same workload performed multiple times. However, an executable graph is typically usable for only a single workload of a task graph from which that executable graph was created.

As the foregoing illustrates, what is needed in the art are more effective techniques for using executable graphs to perform a workload associated with a new task graph.

BRIEF DESCRIPTION OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments of the inventive concepts and are therefore not to be considered limiting of its scope, for the invention may admit to other equally effective embodiments.

FIG. 29 illustrates an exemplary kernel translated by CUDA-to-HIP translation tool of FIG. 28C, in accordance with at least one embodiment;

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Data Center

Figure 1:
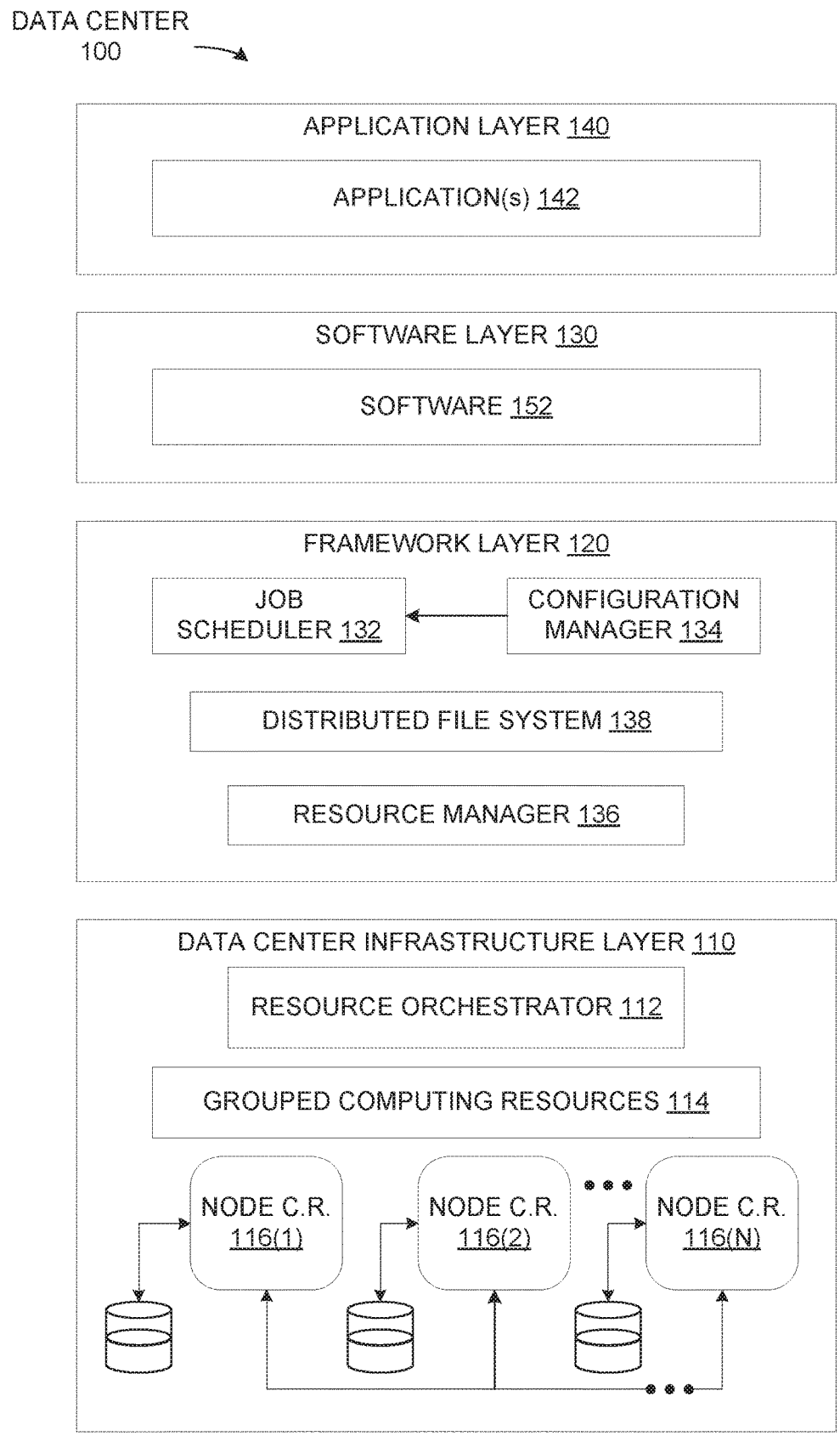
FIG. 1 illustrates an exemplary data center, in accordance with at least one embodiment.

FIG. 1 illustrates an exemplary data center 100, in accordance with at least one embodiment. In at least one embodiment, data center 100 includes, without limitation, a data center infrastructure layer 110, a framework layer 120, a software layer 130 and an application layer 140.

In at least one embodiment, as shown in FIG. 1, data center infrastructure layer 110 may include a resource orchestrator 112, grouped computing resources 114, and node computing resources ("node C.R.s") 116(1)-116(N), where "N" represents any whole, positive integer. In at least one embodiment, node C.R.s 116(1)-116(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 116(1)-116(N) may be a server having one or more of above-mentioned computing resources.

In at least one embodiment, grouped computing resources 114 may include separate groupings of node C.R.s housed within one or more racks (not shown), or many racks housed in data centers at various geographical locations (also not shown). Separate groupings of node C.R.s within grouped computing resources 114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 112 may configure or otherwise control one or more node C.R.s 116(1)-116(N) and/or grouped computing resources 114. In at least one embodiment, resource orchestrator 112 may include a software design infrastructure ("SCI") management entity for data center 100. In at least one embodiment, resource orchestrator 112 may include hardware, software or some combination thereof.

In at least one embodiment, as shown in FIG. 1, framework layer 120 includes, without limitation, a job scheduler 132, a configuration manager 134, a resource manager 136 and a distributed file system 138. In at least one embodiment, framework layer 120 may include a framework to support software 152 of software layer 130 and/or one or more application(s) 142 of application layer 140. In at least one embodiment, software 152 or application(s) 142 may respectively include web-based service software or applications, such as those provided by Amazon Web Services, Google Cloud and Microsoft Azure. In at least one embodiment, framework layer 120 may be, but is not limited to, a type of free and open-source software web application framework such as Apache Spark™ (hereinafter "Spark") that may utilize distributed file system 138 for large-scale data processing (e.g., "big data"). In at least one embodiment, job scheduler 132 may include a Spark driver to facilitate scheduling of workloads supported by various layers of data center 100. In at least one embodiment, configuration manager 134 may be capable of configuring different layers such as software layer 130 and framework layer 120, including Spark and distributed file system 138 for supporting large-scale data processing. In at least one embodiment, resource manager 136 may be capable of managing clustered or grouped computing resources mapped to or allocated for support of distributed file system 138 and job scheduler 132. In at least one embodiment, clustered or grouped computing resources may include grouped computing resource 114 at data center infrastructure layer 110. In at least one embodiment, resource manager 136 may coordinate with resource orchestrator 112 to manage these mapped or allocated computing resources.

In at least one embodiment, software 152 included in software layer 130 may include software used by at least portions of node C.R.s 116(1)-116(N), grouped computing resources 114, and/or distributed file system 138 of framework layer 120. One or more types of software may include, but are not limited to, Internet web page search software, e-mail virus scan software, database software, and streaming video content software.

In at least one embodiment, application(s) 142 included in application layer 140 may include one or more types of applications used by at least portions of node C.R.s 116(1)-116(N), grouped computing resources 114, and/or distributed file system 138 of framework layer 120. In at least one or more types of applications may include, without limitation, CUDA applications.

In at least one embodiment, any of configuration manager 134, resource manager 136, and resource orchestrator 112 may implement any number and type of self-modifying actions based on any amount and type of data acquired in any technically feasible fashion. In at least one embodiment, self-modifying actions may relieve a data center operator of data center 100 from making possibly bad configuration decisions and possibly avoiding underutilized and/or poor performing portions of a data center.

Computer-Based Systems

The following figures set forth, without limitation, exemplary computer-based systems that can be used to implement at least one embodiment.

Figure 2:
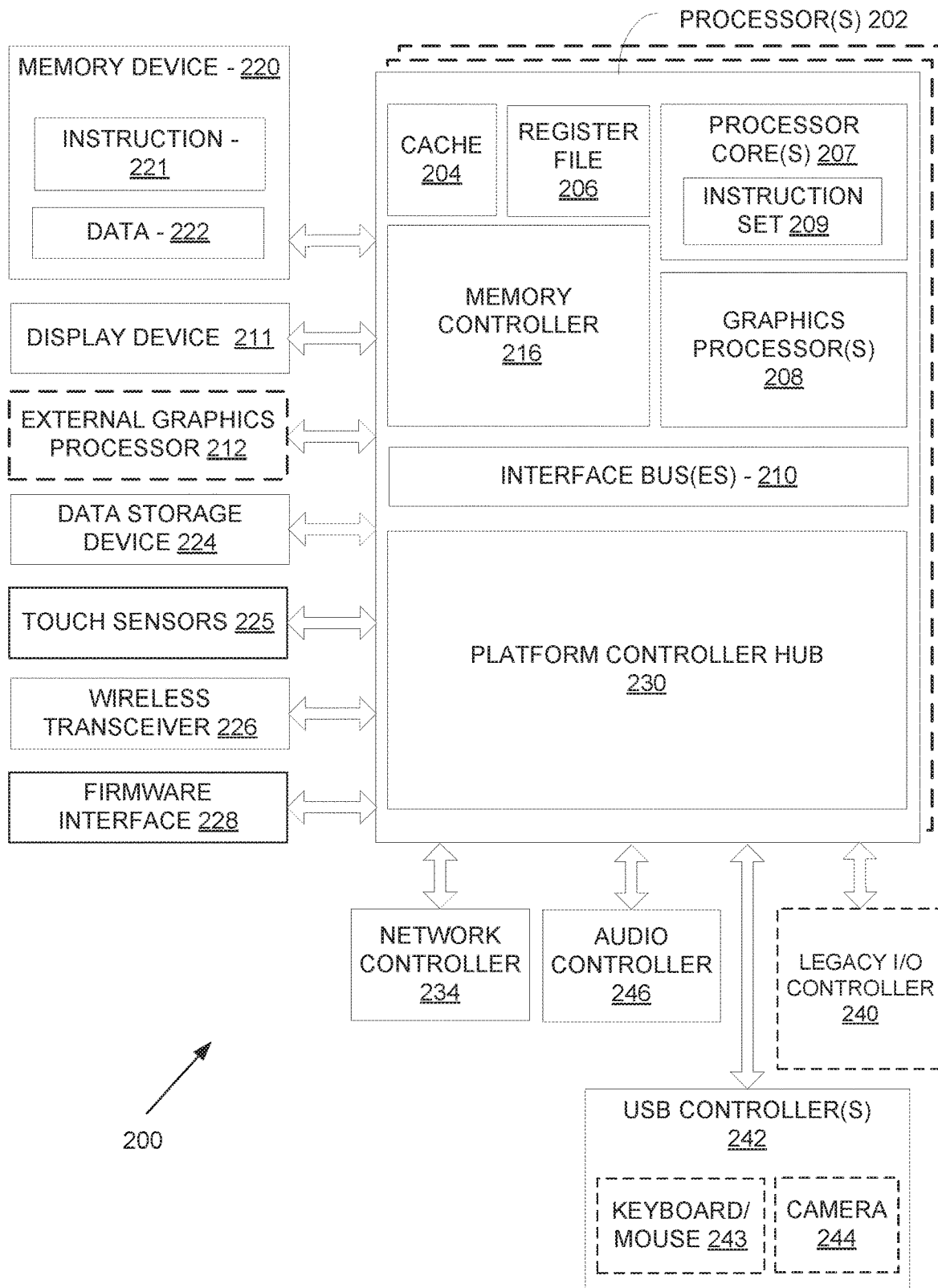
FIG. 2 illustrates a processing system, in accordance with at least one embodiment.

FIG. 2 illustrates a processing system 200, in accordance with at least one embodiment. In at least one embodiment, processing system 200 includes one or more processors 202 and one or more graphics processors 208, and may be a single processor desktop system, a multiprocessor workstation system, or a server system having a large number of processors 202 or processor cores 207. In at least one embodiment, processing system 200 is a processing platform incorporated within a system-on-a-chip ("SoC") integrated circuit for use in mobile, handheld, or embedded devices.

In at least one embodiment, processing system 200 can include, or be incorporated within a server-based gaming platform, a game console, a media console, a mobile gaming console, a handheld game console, or an online game console. In at least one embodiment, processing system 200 is a mobile phone, smart phone, tablet computing device or mobile Internet device. In at least one embodiment, processing system 200 can also include, couple with, or be integrated within a wearable device, such as a smart watch wearable device, smart eyewear device, augmented reality device, or virtual reality device. In at least one embodiment, processing system 200 is a television or set top box device having one or more processors 202 and a graphical interface generated by one or more graphics processors 208.

In at least one embodiment, one or more processors 202 each include one or more processor cores 207 to process instructions which, when executed, perform operations for system and user software. In at least one embodiment, each of one or more processor cores 207 is configured to process a specific instruction set 209. In at least one embodiment, instruction set 209 may facilitate Complex Instruction Set Computing ("CISC"), Reduced Instruction Set Computing ("RISC"), or computing via a Very Long Instruction Word ("VLIW"). In at least one embodiment, processor cores 207 may each process a different instruction set 209, which may include instructions to facilitate emulation of other instruction sets. In at least one embodiment, processor core 207 may also include other processing devices, such as a digital signal processor ("DSP").

In at least one embodiment, processor 202 includes cache memory ('cache') 204. In at least one embodiment, processor 202 can have a single internal cache or multiple levels of internal cache. In at least one embodiment, cache memory is shared among various components of processor 202. In at least one embodiment, processor 202 also uses an external cache (e.g., a Level 3 ("L3") cache or Last Level Cache ("LLC")) (not shown), which may be shared among processor cores 207 using known cache coherency techniques. In at least one embodiment, register file 206 is additionally included in processor 202 which may include different types of registers for storing different types of data (e.g., integer registers, floating point registers, status registers, and an instruction pointer register). In at least one embodiment, register file 206 may include general-purpose registers or other registers.

In at least one embodiment, one or more processor(s) 202 are coupled with one or more interface bus(es) 210 to transmit communication signals such as address, data, or control signals between processor 202 and other components in processing system 200. In at least one embodiment interface bus 210, in one embodiment, can be a processor bus, such as a version of a Direct Media Interface ("DMI") bus. In at least one embodiment, interface bus 210 is not limited to a DMI bus, and may include one or more Peripheral Component Interconnect buses (e.g., "PCI," PCI Express ("PCIe")), memory buses, or other types of interface buses. In at least one embodiment processor(s) 202 include an integrated memory controller 216 and a platform controller hub 230. In at least one embodiment, memory controller 216 facilitates communication between a memory device and other components of processing system 200, while platform controller hub ("PCH") 230 provides connections to Input/Output ("I/O") devices via a local I/O bus.

In at least one embodiment, memory device 220 can be a dynamic random access memory ("DRAM") device, a static random access memory ("SRAM") device, flash memory device, phase-change memory device, or some other memory device having suitable performance to serve as processor memory. In at least one embodiment memory device 220 can operate as system memory for processing system 200, to store data 222 and instructions 221 for use when one or more processors 202 executes an application or process. In at least one embodiment, memory controller 216 also couples with an optional external graphics processor 212, which may communicate with one or more graphics processors 208 in processors 202 to perform graphics and media operations. In at least one embodiment, a display device 211 can connect to processor(s) 202. In at least one embodiment display device 211 can include one or more of an internal display device, as in a mobile electronic device or a laptop device or an external display device attached via a display interface (e.g., DisplayPort, etc.). In at least one embodiment, display device 211 can include a head mounted display ("HMD") such as a stereoscopic display device for use in virtual reality ("VR") applications or augmented reality ("AR") applications.

In at least one embodiment, platform controller hub 230 enables peripherals to connect to memory device 220 and processor 202 via a high-speed I/O bus. In at least one embodiment, I/O peripherals include, but are not limited to, an audio controller 246, a network controller 234, a firmware interface 228, a wireless transceiver 226, touch sensors 225, a data storage device 224 (e.g., hard disk drive, flash memory, etc.). In at least one embodiment, data storage device 224 can connect via a storage interface (e.g., SATA) or via a peripheral bus, such as PCI, or PCIe. In at least one embodiment, touch sensors 225 can include touch screen sensors, pressure sensors, or fingerprint sensors. In at least one embodiment, wireless transceiver 226 can be a Wi-Fi transceiver, a Bluetooth transceiver, or a mobile network transceiver such as a 3G, 4G, or Long Term Evolution ("LTE") transceiver. In at least one embodiment, firmware interface 228 enables communication with system firmware, and can be, for example, a unified extensible firmware interface ("UEFI"). In at least one embodiment, network controller 234 can enable a network connection to a wired network. In at least one embodiment, a high-performance network controller (not shown) couples with interface bus 210. In at least one embodiment, audio controller 246 is a multi-channel high definition audio controller. In at least one embodiment, processing system 200 includes an optional legacy I/O controller 240 for coupling legacy (e.g., Personal System 2 ("PS/2")) devices to processing system 200. In at least one embodiment, platform controller hub 230 can also connect to one or more Universal Serial Bus ("USB") controllers 242 connect input devices, such as keyboard and mouse 243 combinations, a camera 244, or other USB input devices.

In at least one embodiment, an instance of memory controller 216 and platform controller hub 230 may be integrated into a discreet external graphics processor, such as external graphics processor 212. In at least one embodiment, platform controller hub 230 and/or memory controller 216 may be external to one or more processor(s) 202. For example, in at least one embodiment, processing system 200 can include an external memory controller 216 and platform controller hub 230, which may be configured as a memory controller hub and peripheral controller hub within a system chipset that is in communication with processor(s) 202.

Figure 3:
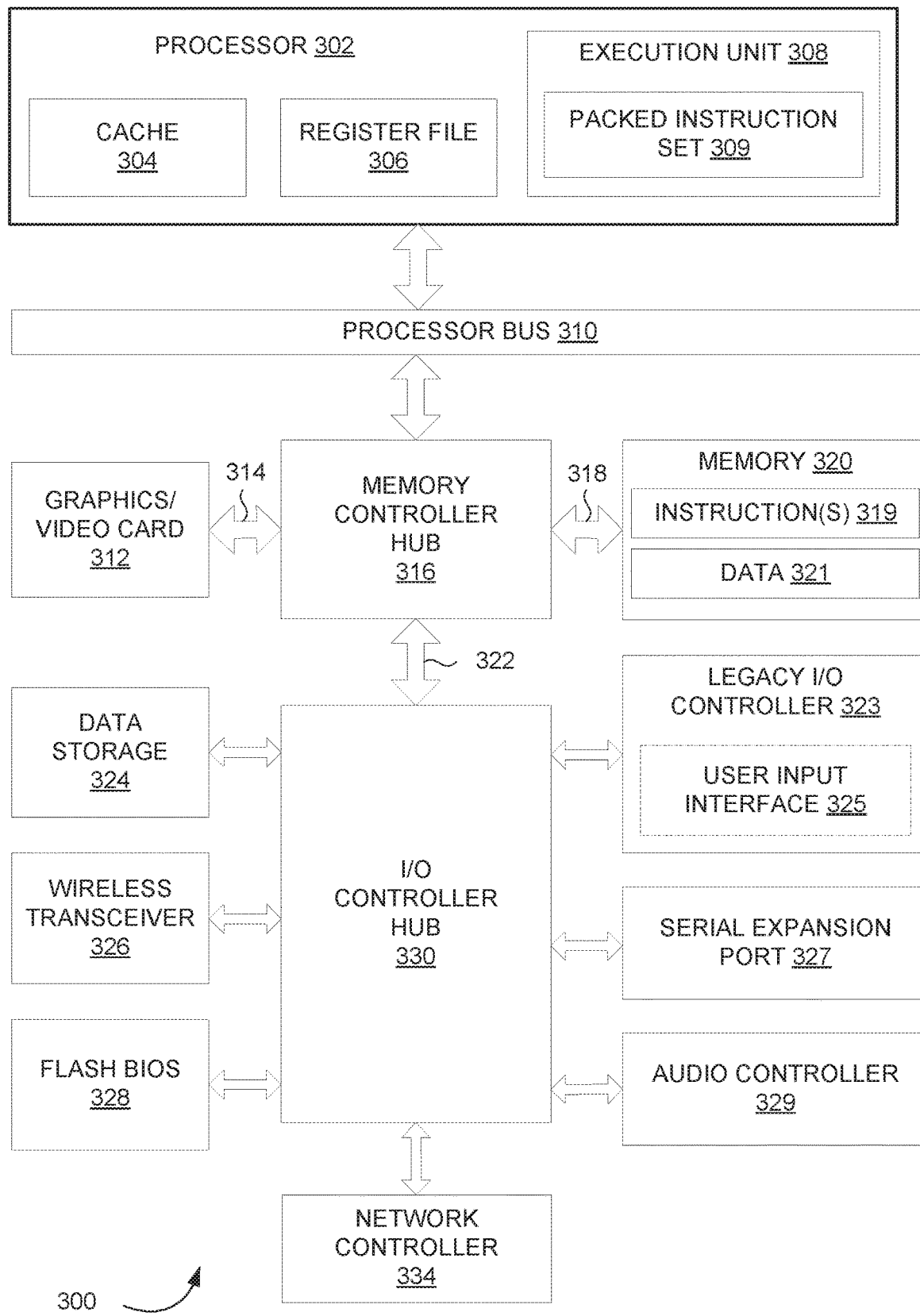
FIG. 3 illustrates a computer system, in accordance with at least one embodiment.

FIG. 3 illustrates a computer system 300, in accordance with at least one embodiment. In at least one embodiment, computer system 300 may be a system with interconnected devices and components, an SOC, or some combination. In at least on embodiment, computer system 300 is formed with a processor 302 that may include execution units to execute an instruction. In at least one embodiment, computer system 300 may include, without limitation, a component, such as processor 302 to employ execution units including logic to perform algorithms for processing data. In at least one embodiment, computer system 300 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 300 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 300 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 300 may include, without limitation, processor 302 that may include, without limitation, one or more execution units 308 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 300 is a single processor desktop or server system. In at least one embodiment, computer system 300 may be a multiprocessor system. In at least one embodiment, processor 302 may include, without limitation, a CISC microprocessor, a RISC microprocessor, a VLIW microprocessor, a processor implementing a combination of instruction sets, or any other processor device, such as a digital signal processor, for example. In at least one embodiment, processor 302 may be coupled to a processor bus 310 that may transmit data signals between processor 302 and other components in computer system 300.

In at least one embodiment, processor 302 may include, without limitation, a Level 1 ("L1") internal cache memory ("cache") 304. In at least one embodiment, processor 302 may have a single internal cache or multiple levels of internal cache. In at least one embodiment, cache memory may reside external to processor 302. In at least one embodiment, processor 302 may also include a combination of both internal and external caches. In at least one embodiment, a register file 306 may store different types of data in various registers including, without limitation, integer registers, floating point registers, status registers, and instruction pointer register.

In at least one embodiment, execution unit 308, including, without limitation, logic to perform integer and floating point operations, also resides in processor 302. Processor 302 may also include a microcode ("ucode") read only memory ("ROM") that stores microcode for certain macro instructions. In at least one embodiment, execution unit 308 may include logic to handle a packed instruction set 309. In at least one embodiment, by including packed instruction set 309 in an instruction set of a general-purpose processor 302, along with associated circuitry to execute instructions, operations used by many multimedia applications may be performed using packed data in a general-purpose processor 302. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 308 may also be used in microcontrollers, embedded processors, graphics devices, DSPs, and other types of logic circuits. In at least one embodiment, computer system 300 may include, without limitation, a memory 320. In at least one embodiment, memory 320 may be implemented as a DRAM device, an SRAM device, flash memory device, or other memory device. Memory 320 may store instruction(s) 319 and/or data 321 represented by data signals that may be executed by processor 302.

In at least one embodiment, a system logic chip may be coupled to processor bus 310 and memory 320. In at least one embodiment, the system logic chip may include, without limitation, a memory controller hub ("MCH") 316, and processor 302 may communicate with MCH 316 via processor bus 310. In at least one embodiment, MCH 316 may provide a high bandwidth memory path 318 to memory 320 for instruction and data storage and for storage of graphics commands, data and textures. In at least one embodiment, MCH 316 may direct data signals between processor 302, memory 320, and other components in computer system 300 and to bridge data signals between processor bus 310, memory 320, and a system I/O 322. In at least one embodiment, system logic chip may provide a graphics port for coupling to a graphics controller. In at least one embodiment, MCH 316 may be coupled to memory 320 through high bandwidth memory path 318 and graphics/video card 312 may be coupled to MCH 316 through an Accelerated Graphics Port ("AGP") interconnect 314.

In at least one embodiment, computer system 300 may use system I/O 322 that is a proprietary hub interface bus to couple MCH 316 to I/O controller hub ("ICH") 330. In at least one embodiment, ICH 330 may provide direct connections to some I/O devices via a local I/O bus. In at least one embodiment, local I/O bus may include, without limitation, a high-speed I/O bus for connecting peripherals to memory 320, a chipset, and processor 302. Examples may include, without limitation, an audio controller 329, a firmware hub ("flash BIOS") 328, a wireless transceiver 326, a data storage 324, a legacy I/O controller 323 containing a user input interface 325 and a keyboard interface, a serial expansion port 327, such as a USB, and a network controller 334. Data storage 324 may comprise a hard disk drive, a floppy disk drive, a CD-ROM device, a flash memory device, or other mass storage device.

In at least one embodiment, FIG. 3 illustrates a system, which includes interconnected hardware devices or "chips." In at least one embodiment, FIG. 3 may illustrate an exemplary SoC. In at least one embodiment, devices illustrated in FIG. 3 may be interconnected with proprietary interconnects, standardized interconnects (e.g., PCIe), or some combination thereof. In at least one embodiment, one or more components of system 300 are interconnected using compute express link ("CXL") interconnects.

Figure 4:
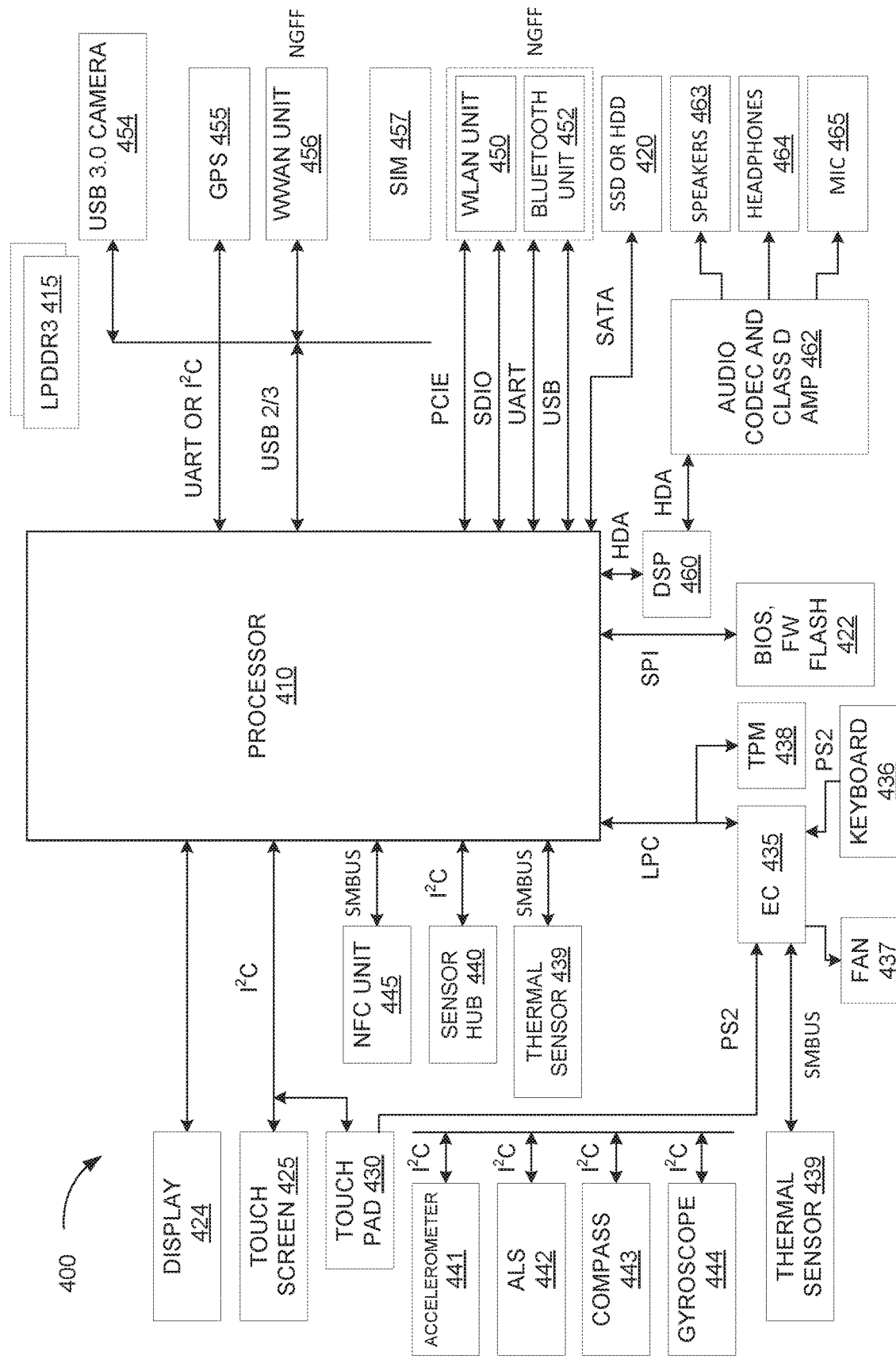
FIG. 4 illustrates a system, in accordance with at least one embodiment.

FIG. 4 illustrates a system 400, in accordance with at least one embodiment. In at least one embodiment, system 400 is an electronic device that utilizes a processor 410. In at least one embodiment, system 400 may be, for example and without limitation, a notebook, a tower server, a rack server, a blade server, a laptop, a desktop, a tablet, a mobile device, a phone, an embedded computer, or any other suitable electronic device.

In at least one embodiment, system 400 may include, without limitation, processor 410 communicatively coupled to any suitable number or kind of components, peripherals, modules, or devices. In at least one embodiment, processor 410 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 4 illustrates a system which includes interconnected hardware devices or "chips." In at least one embodiment, FIG. 4 may illustrate an exemplary SoC. In at least one embodiment, devices illustrated in FIG. 4 may be interconnected with proprietary interconnects, standardized interconnects (e.g., PCIe) or some combination thereof. In at least one embodiment, one or more components of FIG. 4 are interconnected using CXL interconnects.

In at least one embodiment, FIG. 4 may include a display 424, a touch screen 425, a touch pad 430, a Near Field Communications unit ("NFC") 445, a sensor hub 440, a thermal sensor 446, an Express Chipset ("EC") 435, a Trusted Platform Module ("TPM") 438, BIOS/firmware/flash memory ("BIOS, FW Flash") 422, a DSP 460, a Solid State Disk ("S23") or Hard Disk Drive ("HDD") 420, a wireless local area network unit ("WLAN") 450, a Bluetooth unit 452, a Wireless Wide Area Network unit ("WWAN") 456, a Global Positioning System ("GPS") 455, a camera ("USB 3.0 camera") 454 such as a USB 3.0 camera, or a Low Power Double Data Rate ("LPDDR") memory unit ("LPDDR3") 415 implemented in, for example, LPDDR3 standard. These components may each be implemented in any suitable manner.

In at least one embodiment, other components may be communicatively coupled to processor 410 through components discussed above. In at least one embodiment, an accelerometer 441, an Ambient Light Sensor ("ALS") 442, a compass 443, and a gyroscope 444 may be communicatively coupled to sensor hub 440. In at least one embodiment, a thermal sensor 439, a fan 437, a keyboard 446, and a touch pad 430 may be communicatively coupled to EC 435. In at least one embodiment, a speaker 463, a headphones 464, and a microphone ("mic") 465 may be communicatively coupled to an audio unit ("audio codec and class d amp") 464, which may in turn be communicatively coupled to DSP 460. In at least one embodiment, audio unit 464 may include, for example and without limitation, an audio coder/decoder ("codec") and a class D amplifier. In at least one embodiment, a SIM card ("SIM") 457 may be communicatively coupled to WWAN unit 456. In at least one embodiment, components such as WLAN unit 450 and Bluetooth unit 452, as well as WWAN unit 456 may be implemented in a Next Generation Form Factor ("NGFF").

Figure 5:
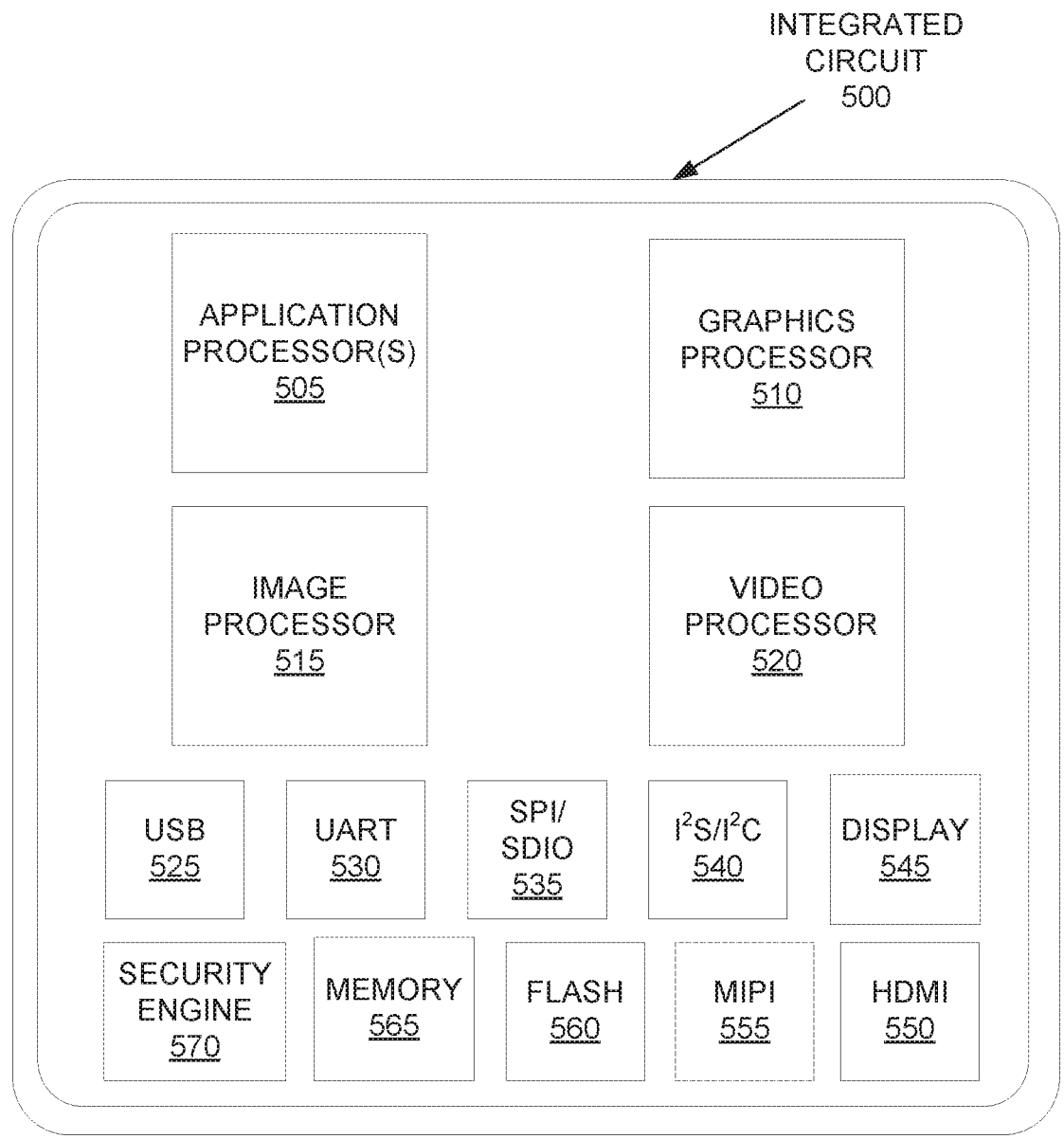
FIG. 5 illustrates an exemplary integrated circuit, in accordance with at least one embodiment.

FIG. 5 illustrates an exemplary integrated circuit 500, in accordance with at least one embodiment. In at least one embodiment, exemplary integrated circuit 500 is an SoC that may be fabricated using one or more IP cores. In at least one embodiment, integrated circuit 500 includes one or more application processor(s) 505 (e.g., CPUs), at least one graphics processor 510, and may additionally include an image processor 515 and/or a video processor 520, any of which may be a modular IP core. In at least one embodiment, integrated circuit 500 includes peripheral or bus logic including a USB controller 525, a UART controller 530, an SPI/SDIO controller 535, and an I²S/I²C controller 540. In at least one embodiment, integrated circuit 500 can include a display device 545 coupled to one or more of a high-definition multimedia interface ("HDMI") controller 550 and a mobile industry processor interface ("MIPI") display interface 555. In at least one embodiment, storage may be provided by a flash memory subsystem 560 including flash memory and a flash memory controller. In at least one embodiment, a memory interface may be provided via a memory controller 565 for access to 23 RAM or SRAM memory devices. In at least one embodiment, some integrated circuits additionally include an embedded security engine 570.

Figure 6:
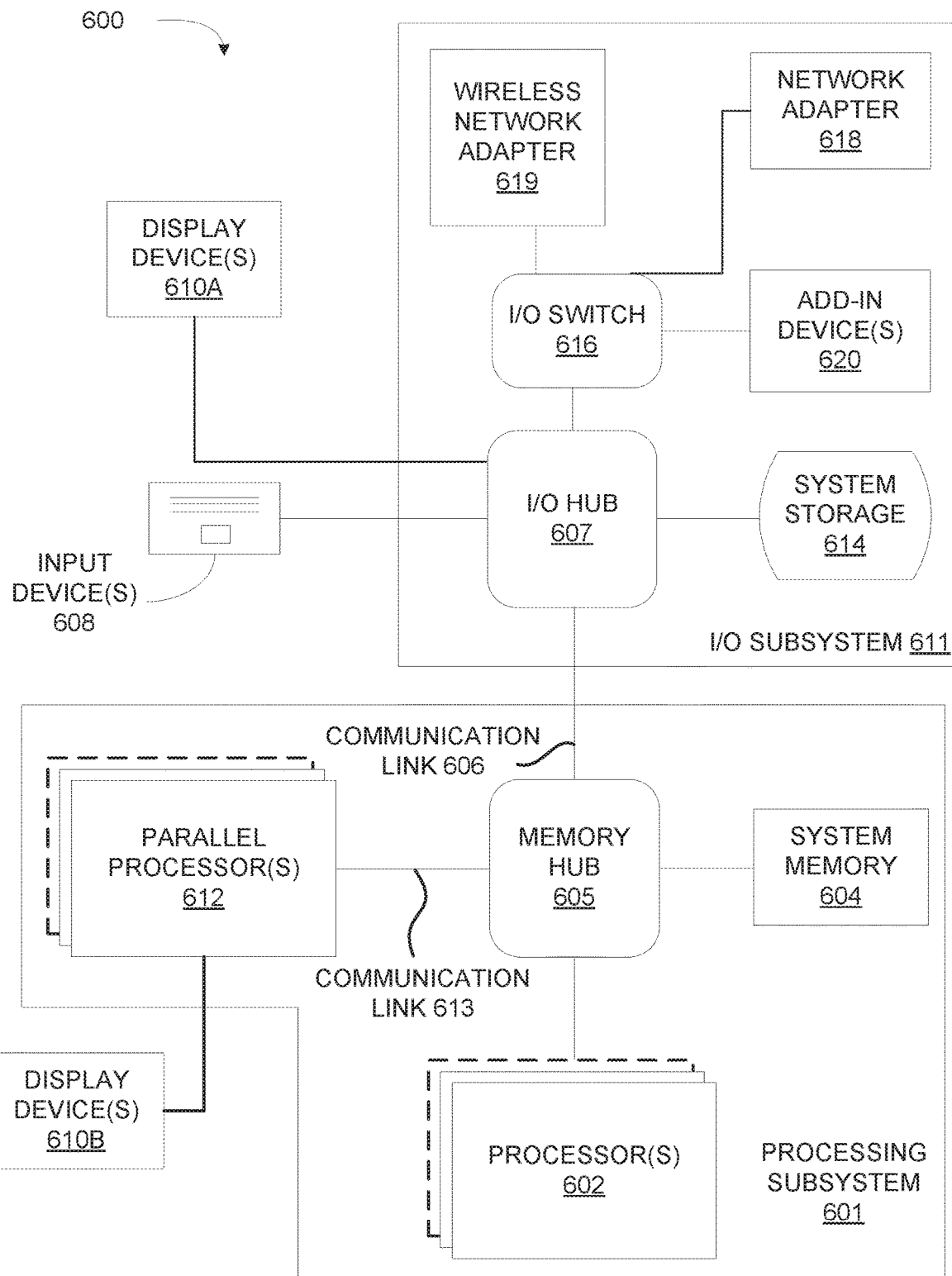
FIG. 6 illustrates a computing system, according to at least one embodiment.

FIG. 6 illustrates a computing system 600, according to at least one embodiment; In at least one embodiment, computing system 600 includes a processing subsystem 601 having one or more processor(s) 602 and a system memory 604 communicating via an interconnection path that may include a memory hub 605. In at least one embodiment, memory hub 605 may be a separate component within a chipset component or may be integrated within one or more processor(s) 602. In at least one embodiment, memory hub 605 couples with an I/O subsystem 611 via a communication link 606. In at least one embodiment, I/O subsystem 611 includes an I/O hub 607 that can enable computing system 600 to receive input from one or more input device(s) 608. In at least one embodiment, I/O hub 607 can enable a display controller, which may be included in one or more processor(s) 602, to provide outputs to one or more display device(s) 610A. In at least one embodiment, one or more display device(s) 610A coupled with I/O hub 607 can include a local, internal, or embedded display device.

In at least one embodiment, processing subsystem 601 includes one or more parallel processor(s) 612 coupled to memory hub 605 via a bus or other communication link 613. In at least one embodiment, communication link 613 may be one of any number of standards based communication link technologies or protocols, such as, but not limited to PCIe, or may be a vendor specific communications interface or communications fabric. In at least one embodiment, one or more parallel processor(s) 612 form a computationally focused parallel or vector processing system that can include a large number of processing cores and/or processing clusters, such as a many integrated core processor. In at least one embodiment, one or more parallel processor(s) 612 form a graphics processing subsystem that can output pixels to one of one or more display device(s) 610A coupled via I/O Hub 607. In at least one embodiment, one or more parallel processor(s) 612 can also include a display controller and display interface (not shown) to enable a direct connection to one or more display device(s) 610B.

In at least one embodiment, a system storage unit 614 can connect to I/O hub 607 to provide a storage mechanism for computing system 600. In at least one embodiment, an I/O switch 616 can be used to provide an interface mechanism to enable connections between I/O hub 607 and other components, such as a network adapter 618 and/or wireless network adapter 619 that may be integrated into a platform, and various other devices that can be added via one or more add-in device(s) 620. In at least one embodiment, network adapter 618 can be an Ethernet adapter or another wired network adapter. In at least one embodiment, wireless network adapter 619 can include one or more of a Wi-Fi, Bluetooth, NFC, or other network device that includes one or more wireless radios.

In at least one embodiment, computing system 600 can include other components not explicitly shown, including USB or other port connections, optical storage drives, video capture devices, and the like, that may also be connected to I/O hub 607. In at least one embodiment, communication paths interconnecting various components in FIG. 6 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 612 incorporate circuitry optimized for graphics and video processing, including, for example, video output circuitry, and constitutes a graphics processing unit ("GPU"). In at least one embodiment, one or more parallel processor(s) 612 incorporate circuitry optimized for general purpose processing. In at least embodiment, components of computing system 600 may be integrated with one or more other system elements on a single integrated circuit. For example, in at least one embodiment, one or more parallel processor(s) 612, memory hub 605, processor(s) 602, and I/O hub 607 can be integrated into an SoC integrated circuit. In at least one embodiment, components of computing system 600 can be integrated into a single package to form a system in package ("SIP") configuration. In at least one embodiment, at least a portion of the components of computing system 600 can be integrated into a multi-chip module ("MCM"), which can be interconnected with other multi-chip modules into a modular computing system. In at least one embodiment, I/O subsystem 611 and display devices 610B are omitted from computing system 600.

Processing Systems

The following figures set forth, without limitation, exemplary processing systems that can be used to implement at least one embodiment.

Figure 7:
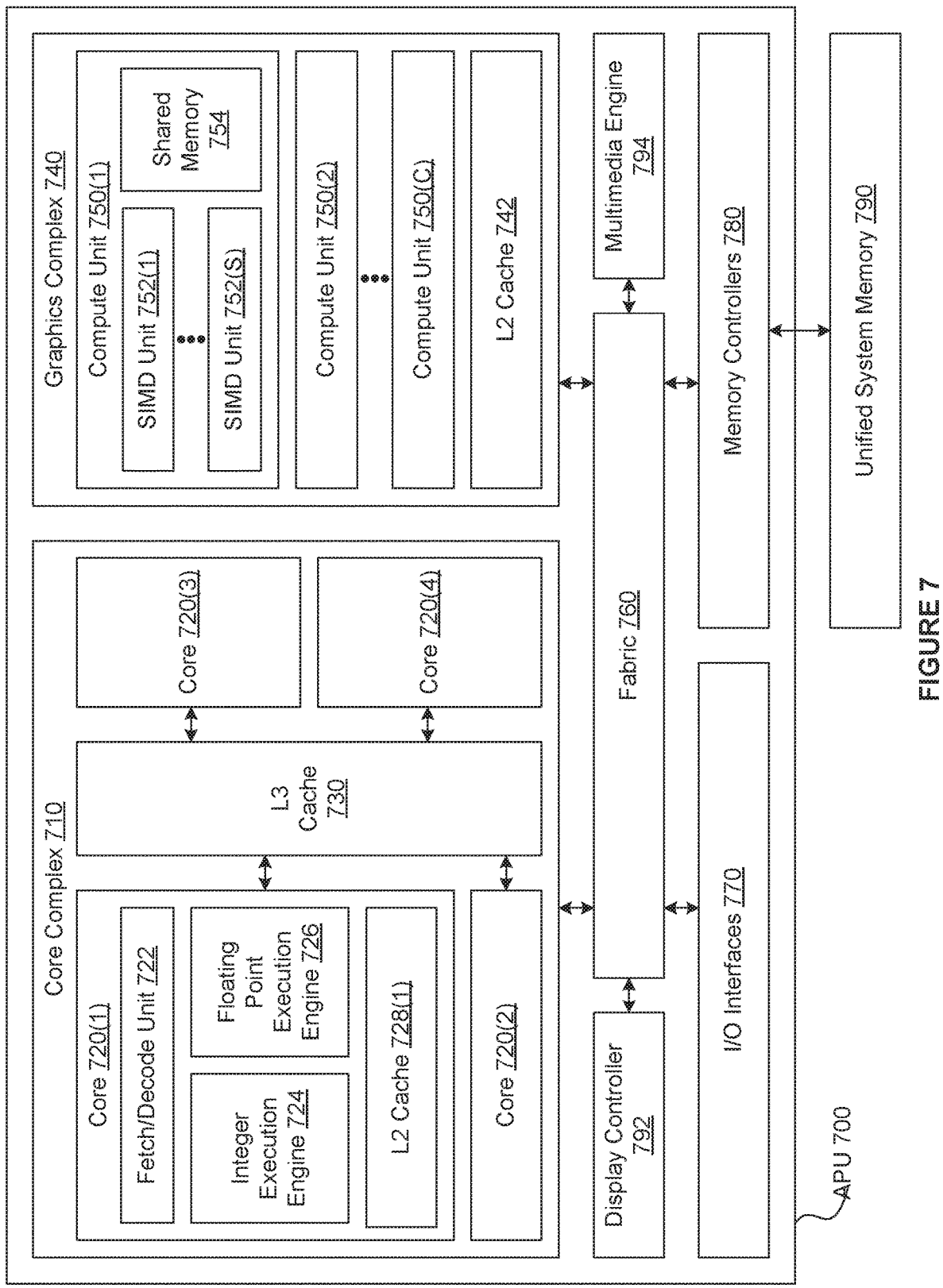
FIG. 7 illustrates an APU, in accordance with at least one embodiment.

FIG. 7 illustrates an accelerated processing unit ("APU") 700, in accordance with at least one embodiment. In at least one embodiment, APU 700 is developed by AMD Corporation of Santa Clara, CA In at least one embodiment, APU 700 can be configured to execute an application program, such as a CUDA program. In at least one embodiment, APU 700 includes, without limitation, a core complex 710, a graphics complex 740, fabric 760, I/O interfaces 770, memory controllers 780, a display controller 792, and a multimedia engine 794. In at least one embodiment, APU 700 may include, without limitation, any number of core complexes 710, any number of graphics complexes 750, any number of display controllers 792, and any number of multimedia engines 794 in any combination. For explanatory purposes, multiple instances of like objects are denoted herein with reference numbers identifying the object and parenthetical numbers identifying the instance where needed.

In at least one embodiment, core complex 710 is a CPU, graphics complex 740 is a GPU, and APU 700 is a processing unit that integrates, without limitation, 710 and 740 onto a single chip. In at least one embodiment, some tasks may be assigned to core complex 710 and other tasks may be assigned to graphics complex 740. In at least one embodiment, core complex 710 is configured to execute main control software associated with APU 700, such as an operating system. In at least one embodiment, core complex 710 is the master processor of APU 700, controlling and coordinating operations of other processors. In at least one embodiment, core complex 710 issues commands that control the operation of graphics complex 740. In at least one embodiment, core complex 710 can be configured to execute host executable code derived from CUDA source code, and graphics complex 740 can be configured to execute device executable code derived from CUDA source code.

In at least one embodiment, core complex 710 includes, without limitation, cores 720(1)-720(4) and an L3 cache 730. In at least one embodiment, core complex 710 may include, without limitation, any number of cores 720 and any number and type of caches in any combination. In at least one embodiment, cores 720 are configured to execute instructions of a particular instruction set architecture ("I20"). In at least one embodiment, each core 720 is a CPU core.

In at least one embodiment, each core 720 includes, without limitation, a fetch/decode unit 722, an integer execution engine 724, a floating point execution engine 726, and an L2 cache 728. In at least one embodiment, fetch/decode unit 722 fetches instructions, decodes such instructions, generates micro-operations, and dispatches separate micro-instructions to integer execution engine 724 and floating point execution engine 726. In at least one embodiment, fetch/decode unit 722 can concurrently dispatch one micro-instruction to integer execution engine 724 and another micro-instruction to floating point execution engine 726. In at least one embodiment, integer execution engine 724 executes, without limitation, integer and memory operations. In at least one embodiment, floating point engine 726 executes, without limitation, floating point and vector operations. In at least one embodiment, fetch-decode unit 722 dispatches micro-instructions to a single execution engine that replaces both integer execution engine 724 and floating point execution engine 726.

In at least one embodiment, each core 720($i$), where i is an integer representing a particular instance of core 720, may access L2 cache 728($i$) included in core 720($i$). In at least one embodiment, each core 720 included in core complex 710($j$), where j is an integer representing a particular instance of core complex 710, is connected to other cores 720 included in core complex 710($j$) via L3 cache 730($j$) included in core complex 710($j$). In at least one embodiment, cores 720 included in core complex 710($j$), where j is an integer representing a particular instance of core complex 710, can access all of L3 cache 730($j$) included in core complex 710($j$). In at least one embodiment, L3 cache 730 may include, without limitation, any number of slices.

In at least one embodiment, graphics complex 740 can be configured to perform compute operations in a highly-parallel fashion. In at least one embodiment, graphics complex 740 is configured to execute graphics pipeline operations such as draw commands, pixel operations, geometric computations, and other operations associated with rendering an image to a display. In at least one embodiment, graphics complex 740 is configured to execute operations unrelated to graphics. In at least one embodiment, graphics complex 740 is configured to execute both operations related to graphics and operations unrelated to graphics.

In at least one embodiment, graphics complex 740 includes, without limitation, any number of compute units 750 and an L2 cache 742. In at least one embodiment, compute units 750 share L2 cache 742. In at least one embodiment, L2 cache 742 is partitioned. In at least one embodiment, graphics complex 740 includes, without limitation, any number of compute units 750 and any number (including zero) and type of caches. In at least one embodiment, graphics complex 740 includes, without limitation, any amount of dedicated graphics hardware.

In at least one embodiment, each compute unit 750 includes, without limitation, any number of SIMD units 752 and a shared memory 754. In at least one embodiment, each SIMD unit 752 implements a SIMD architecture and is configured to perform operations in parallel. In at least one embodiment, each compute unit 750 may execute any number of thread blocks, but each thread block executes on a single compute unit 750. In at least one embodiment, a thread block includes, without limitation, any number of threads of execution. In at least one embodiment, a workgroup is a thread block. In at least one embodiment, each SIMD unit 752 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 754.

In at least one embodiment, fabric 760 is a system interconnect that facilitates data and control transmissions across core complex 710, graphics complex 740, I/O interfaces 770, memory controllers 780, display controller 792, and multimedia engine 794. In at least one embodiment, APU 700 may include, without limitation, any amount and type of system interconnect in addition to or instead of fabric 760 that facilitates data and control transmissions across any number and type of directly or indirectly linked components that may be internal or external to APU 700. In at least one embodiment, I/O interfaces 770 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 770 In at least one embodiment, peripheral devices that are coupled to I/O interfaces 770 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 240 includes, without limitation, any amount and type of circuitry that is related to multimedia, such as a video decoder, a video encoder, an image signal processor, etc. In at least one embodiment, memory controllers 780 facilitate data transfers between APU 700 and a unified system memory 790. In at least one embodiment, core complex 710 and graphics complex 740 share unified system memory 790.

In at least one embodiment, APU 700 implements a memory subsystem that includes, without limitation, any amount and type of memory controllers 780 and memory devices (e.g., shared memory 754) that may be dedicated to one component or shared among multiple components. In at least one embodiment, APU 700 implements a cache subsystem that includes, without limitation, one or more cache memories (e.g., L2 caches 828, L3 cache 730, and L2 cache 742) that may each be private to or shared between any number of components (e.g., cores 720, core complex 710, SIMD units 752, compute units 750, and graphics complex 740).

Figure 8:
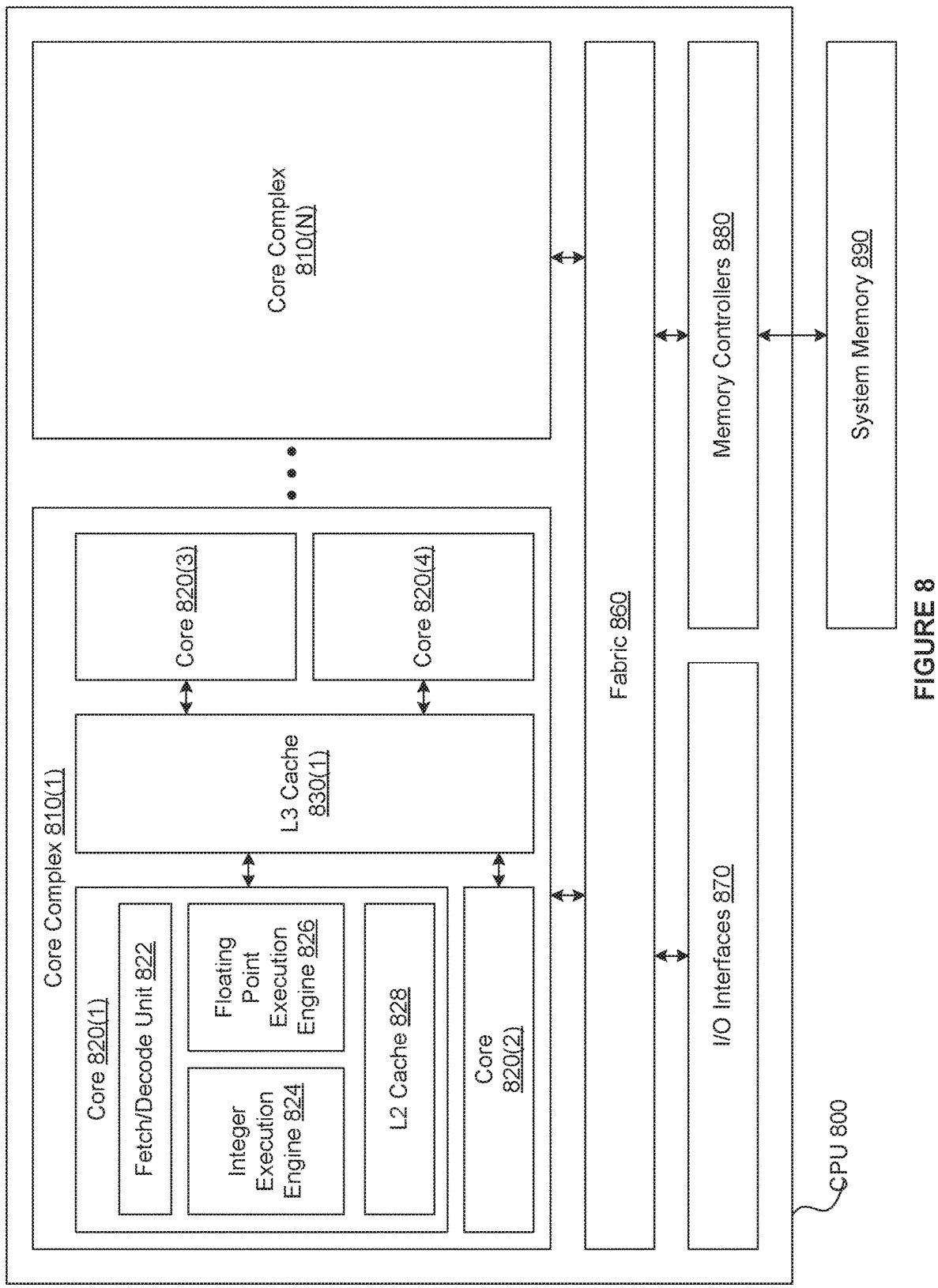
FIG. 8 illustrates a CPU, in accordance with at least one embodiment.

FIG. 8 illustrates a CPU 800, in accordance with at least one embodiment. In at least one embodiment, CPU 800 is developed by AMD Corporation of Santa Clara, CA In at least one embodiment, CPU 800 can be configured to execute an application program. In at least one embodiment, CPU 800 is configured to execute main control software, such as an operating system. In at least one embodiment, CPU 800 issues commands that control the operation of an external GPU (not shown). In at least one embodiment, CPU 800 can be configured to execute host executable code derived from CUDA source code, and an external GPU can be configured to execute device executable code derived from such CUDA source code. In at least one embodiment, CPU 800 includes, without limitation, any number of core complexes 810, fabric 860, I/O interfaces 870, and memory controllers 880.

In at least one embodiment, core complex 810 includes, without limitation, cores 820(1)-820(4) and an L3 cache 830. In at least one embodiment, core complex 810 may include, without limitation, any number of cores 820 and any number and type of caches in any combination. In at least one embodiment, cores 820 are configured to execute instructions of a particular 120. In at least one embodiment, each core 820 is a CPU core.

In at least one embodiment, each core 820 includes, without limitation, a fetch/decode unit 822, an integer execution engine 824, a floating point execution engine 826, and an L2 cache 828. In at least one embodiment, fetch/decode unit 822 fetches instructions, decodes such instructions, generates micro-operations, and dispatches separate micro-instructions to integer execution engine 824 and floating point execution engine 826. In at least one embodiment, fetch/decode unit 822 can concurrently dispatch one micro-instruction to integer execution engine 824 and another micro-instruction to floating point execution engine 826. In at least one embodiment, integer execution engine 824 executes, without limitation, integer and memory operations. In at least one embodiment, floating point engine 826 executes, without limitation, floating point and vector operations. In at least one embodiment, fetch-decode unit 822 dispatches micro-instructions to a single execution engine that replaces both integer execution engine 824 and floating point execution engine 826.

In at least one embodiment, each core 820(i), where i is an integer representing a particular instance of core 820, may access L2 cache 828(i) included in core 820(i). In at least one embodiment, each core 820 included in core complex 810(j), where j is an integer representing a particular instance of core complex 810, is connected to other cores 820 in core complex 810(j) via L3 cache 830(j) included in core complex 810(j). In at least one embodiment, cores 820 included in core complex 810(j), where j is an integer representing a particular instance of core complex 810, can access all of L3 cache 830(j) included in core complex 810(j). In at least one embodiment, L3 cache 830 may include, without limitation, any number of slices.

In at least one embodiment, fabric 860 is a system interconnect that facilitates data and control transmissions across core complexes 810(1)-810(N) (where N is an integer greater than zero), I/O interfaces 870, and memory controllers 880. In at least one embodiment, CPU 800 may include, without limitation, any amount and type of system interconnect in addition to or instead of fabric 860 that facilitates data and control transmissions across any number and type of directly or indirectly linked components that may be internal or external to CPU 800. In at least one embodiment, I/O interfaces 870 are representative of any number and type of I/O interfaces (e.g., PCI, PCI-X, PCIe, GBE, USB, etc.). In at least one embodiment, various types of peripheral devices are coupled to I/O interfaces 870 In at least one embodiment, peripheral devices that are coupled to I/O interfaces 870 may include, without limitation, displays, keyboards, mice, printers, scanners, joysticks or other types of game controllers, media recording devices, external storage devices, network interface cards, and so forth.

In at least one embodiment, memory controllers 880 facilitate data transfers between CPU 800 and a system memory 890. In at least one embodiment, core complex 810 and graphics complex 840 share system memory 890. In at least one embodiment, CPU 800 implements a memory subsystem that includes, without limitation, any amount and type of memory controllers 880 and memory devices that may be dedicated to one component or shared among multiple components. In at least one embodiment, CPU 800 implements a cache subsystem that includes, without limitation, one or more cache memories (e.g., L2 caches 828 and L3 caches 830) that may each be private to or shared between any number of components (e.g., cores 820 and core complexes 810).

Figure 9:
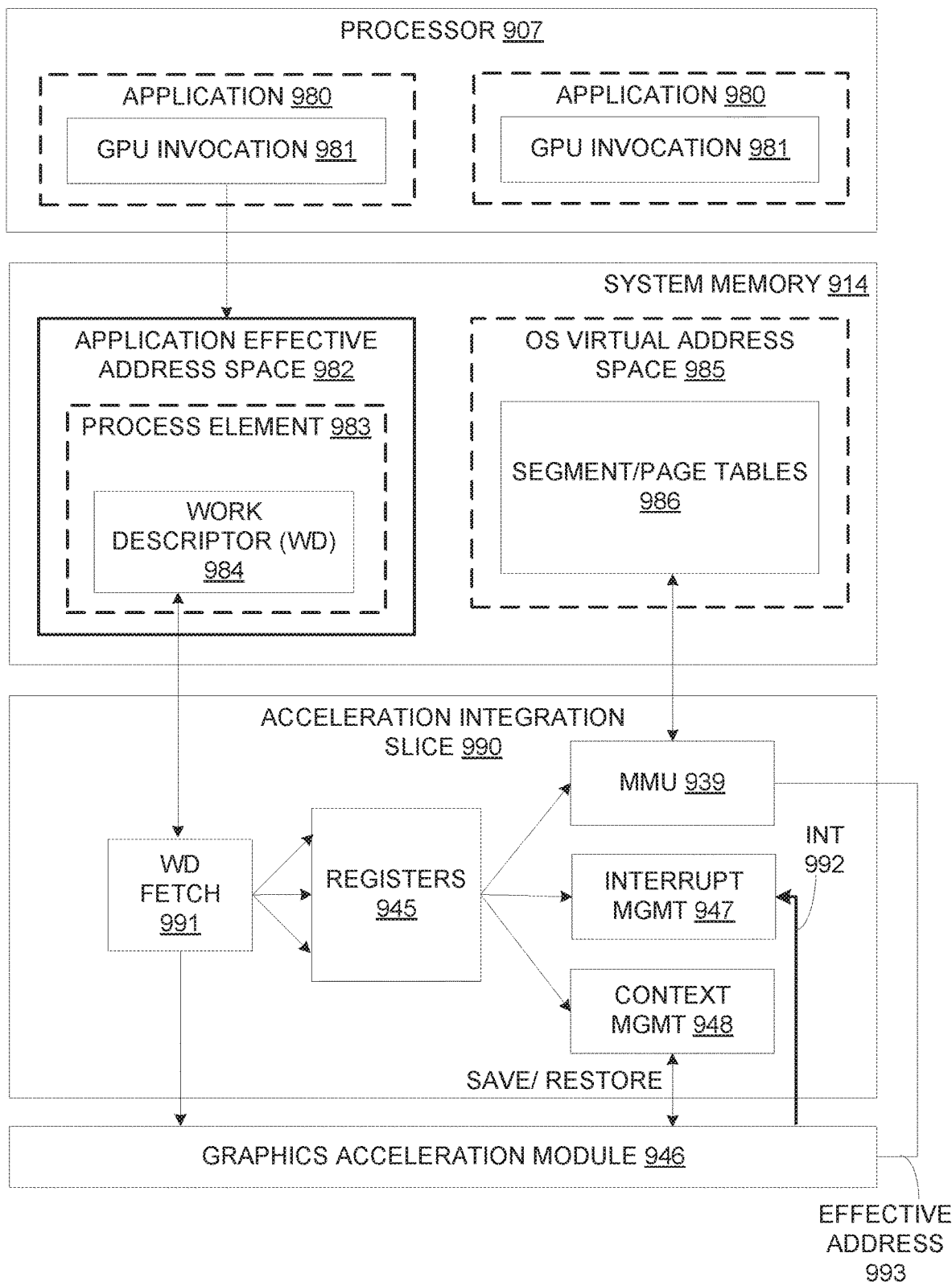
FIG. 9 illustrates an exemplary accelerator integration slice, in accordance with at least one embodiment.

FIG. 9 illustrates an exemplary accelerator integration slice 990, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 982 within system memory 914 stores process elements 983. In one embodiment, process elements 983 are stored in response to GPU invocations 981 from applications 980 executed on processor 907. A process element 983 contains process state for corresponding application 980. A work descriptor ("WD") 984 contained in process element 983 can be a single job requested by an application or may contain a pointer to a queue of jobs. In at least one embodiment, WD 984 is a pointer to a job request queue in application effective address space 982.

Graphics acceleration module 946 and/or individual graphics processing engines can be shared by all or a subset of processes in a system. In at least one embodiment, an infrastructure for setting up process state and sending WD 984 to graphics acceleration module 946 to start a job in a virtualized environment may be included.

In at least one embodiment, a dedicated-process programming model is implementation-specific. In this model, a single process owns graphics acceleration module 946 or an individual graphics processing engine. Because graphics acceleration module 946 is owned by a single process, a hypervisor initializes an accelerator integration circuit for an owning partition and an operating system initializes accelerator integration circuit for an owning process when graphics acceleration module 946 is assigned.

In operation, a WD fetch unit 991 in accelerator integration slice 990 fetches next WD 984 which includes an indication of work to be done by one or more graphics processing engines of graphics acceleration module 946. Data from WD 984 may be stored in registers 945 and used by a memory management unit ("MMU") 939, interrupt management circuit 947 and/or context management circuit 948 as illustrated. For example, one embodiment of MMU 939 includes segment/page walk circuitry for accessing segment/page tables 986 within OS virtual address space 985. Interrupt management circuit 947 may process interrupt events ("INT") 992 received from graphics acceleration module 946. When performing graphics operations, an effective address 993 generated by a graphics processing engine is translated to a real address by MMU 939.

In one embodiment, a same set of registers 945 are duplicated for each graphics processing engine and/or graphics acceleration module 946 and may be initialized by a hypervisor or operating system. Each of these duplicated registers may be included in accelerator integration slice 990. Exemplary registers that may be initialized by a hypervisor are shown in Table 1.

TABLE 1

| Hypervisor Initialized Registers |
|---|
| 1  Slice Control Register |
| 2  Real Address (RA) Scheduled Processes Area Pointer |
| 3  Authority Mask Override Register |
| 4  Interrupt Vector Table Entry Offset |
| 5  Interrupt Vector Table Entry Limit |
| 6  State Register |
| 7  Logical Partition ID |
| 8  Real address (RA) Hypervisor Accelerator Utilization Record Pointer |
| 9  Storage Description Register |

Exemplary registers that may be initialized by an operating system are shown in Table 2.

TABLE 2

| Operating System Initialized Registers |
|---|
| 1  Process and Thread Identification |
| 2  Effective Address (EA) Context Save/Restore Pointer |
| 3  Virtual Address (VA) Accelerator Utilization Record Pointer |
| 4  Virtual Address (VA) Storage Segment Table Pointer |
| 5  Authority Mask |
| 6  Work descriptor |

In one embodiment, each WD 984 is specific to a particular graphics acceleration module 946 and/or a particular graphics processing engine. It contains all information required by a graphics processing engine to do work or it can be a pointer to a memory location where an application has set up a command queue of work to be completed.

Figure 10A:
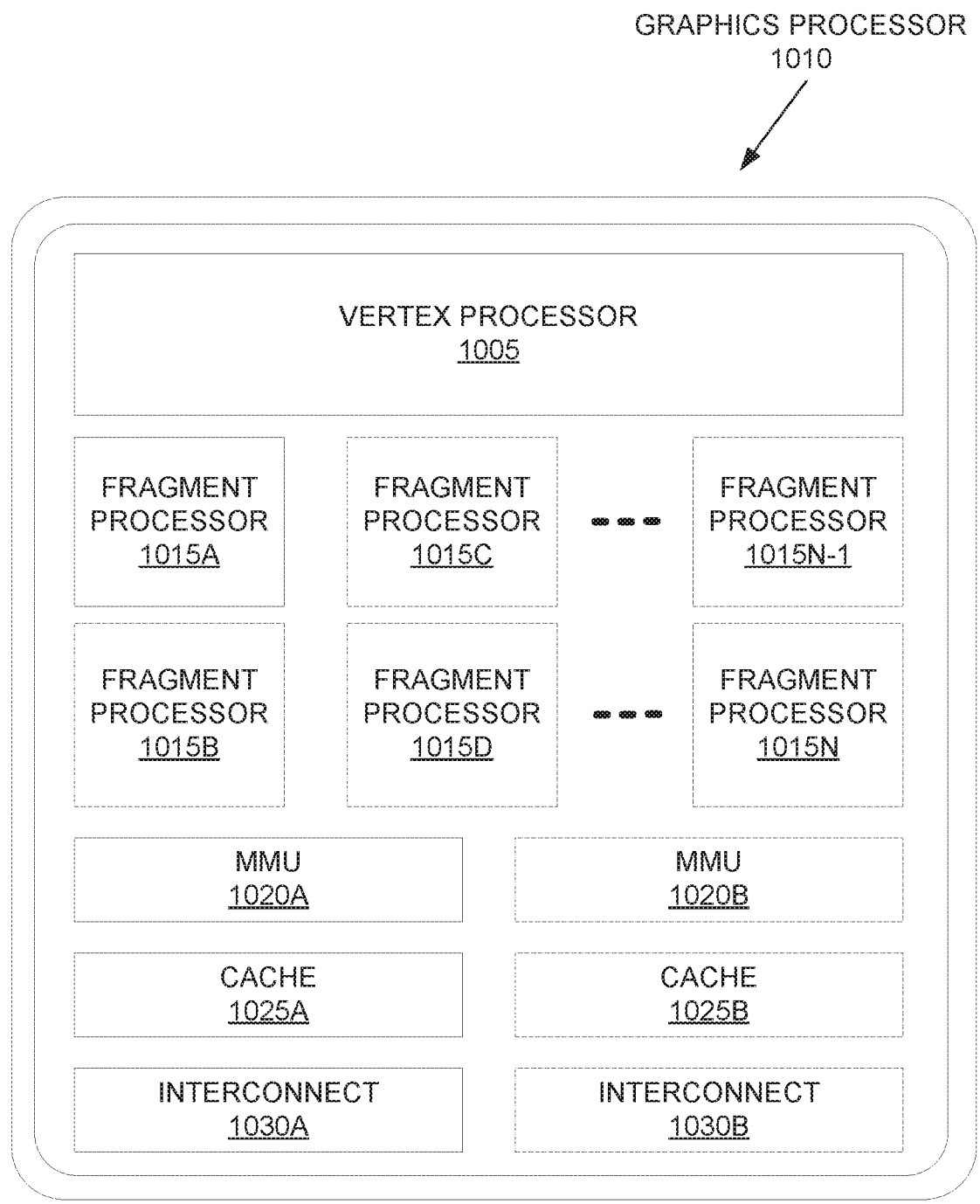
FIGS. 10A-10B illustrate exemplary graphics processors, in accordance with at least one embodiment.
Figure 10B:
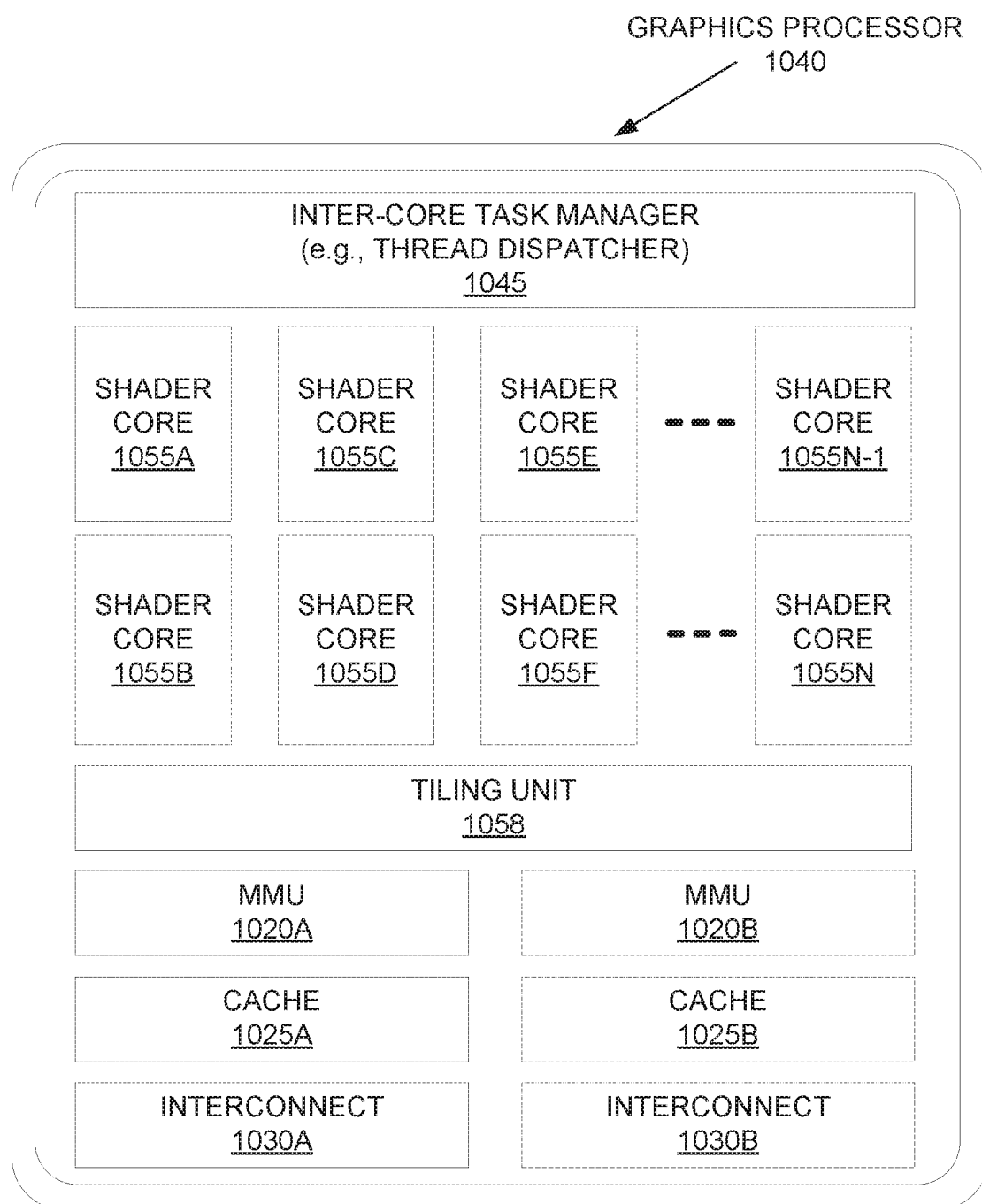

FIGS. 10A-10B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 10A illustrates an exemplary graphics processor 1010 of an SoC integrated circuit that may be fabricated using one or more IP cores, in accordance with at least one embodiment. FIG. 10B illustrates an additional exemplary graphics processor 1040 of an SoC integrated circuit that may be fabricated using one or more IP cores, in accordance with at least one embodiment. In at least one embodiment, graphics processor 1010 of FIG. 10A is a low power graphics processor core. In at least one embodiment, graphics processor 1040 of FIG. 10B is a higher performance graphics processor core. In at least one embodiment, each of graphics processors 1010, 1040 can be variants of graphics processor 510 of FIG. 5.

In at least one embodiment, graphics processor 1010 includes a vertex processor 1005 and one or more fragment processor(s) 1015A-1015N (e.g., 1015A, 1015B, 1015C, 1015D, through 1015N-1, and 1015N). In at least one embodiment, graphics processor 1010 can execute different shader programs via separate logic, such that vertex processor 1005 is optimized to execute operations for vertex shader programs, while one or more fragment processor(s) 1015A-1015N execute fragment (e.g., pixel) shading operations for fragment or pixel shader programs. In at least one embodiment, vertex processor 1005 performs a vertex processing stage of a 3D graphics pipeline and generates primitives and vertex data. In at least one embodiment, fragment processor(s) 1015A-1015N use primitive and vertex data generated by vertex processor 1005 to produce a framebuffer that is displayed on a display device. In at least one embodiment, fragment processor(s) 1015A-1015N are optimized to execute fragment shader programs as provided for in an OpenGL API, which may be used to perform similar operations as a pixel shader program as provided for in a Direct 3D API.

In at least one embodiment, graphics processor 1010 additionally includes one or more MMU(s) 1020A-1020B, cache(s) 1025A-1025B, and circuit interconnect(s) 1030A-1030B. In at least one embodiment, one or more MMU(s) 1020A-1020B provide for virtual to physical address mapping for graphics processor 1010, including for vertex processor 1005 and/or fragment processor(s) 1015A-1015N, which may reference vertex or image/texture data stored in memory, in addition to vertex or image/texture data stored in one or more cache(s) 1025A-1025B. In at least one embodiment, one or more MMU(s) 1020A-1020B may be synchronized with other MMUs within a system, including one or more MMUs associated with one or more application processor(s) 505, image processors 515, and/or video processors 520 of FIG. 5, such that each processor 505-520 can participate in a shared or unified virtual memory system. In at least one embodiment, one or more circuit interconnect(s) 1030A-1030B enable graphics processor 1010 to interface with other IP cores within an SoC, either via an internal bus of the SoC or via a direct connection.

In at least one embodiment, graphics processor 1040 includes one or more MMU(s) 1020A-1020B, caches 1025A-1025B, and circuit interconnects 1030A-1030B of graphics processor 1010 of FIG. 10A. In at least one embodiment, graphics processor 1040 includes one or more shader core(s) 1055A-1055N (e.g., 1055A, 1055B, 1055C, 1055D, 1055E, 1055F, through 1055N-1, and 1055N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1040 includes an inter-core task manager 1045, which acts as a thread dispatcher to dispatch execution threads to one or more shader cores 1055A-1055N and a tiling unit 1058 to accelerate tiling operations for tile-based rendering, in which rendering operations for a scene are subdivided in image space, for example to exploit local spatial coherence within a scene or to optimize use of internal caches.

Figure 11A:
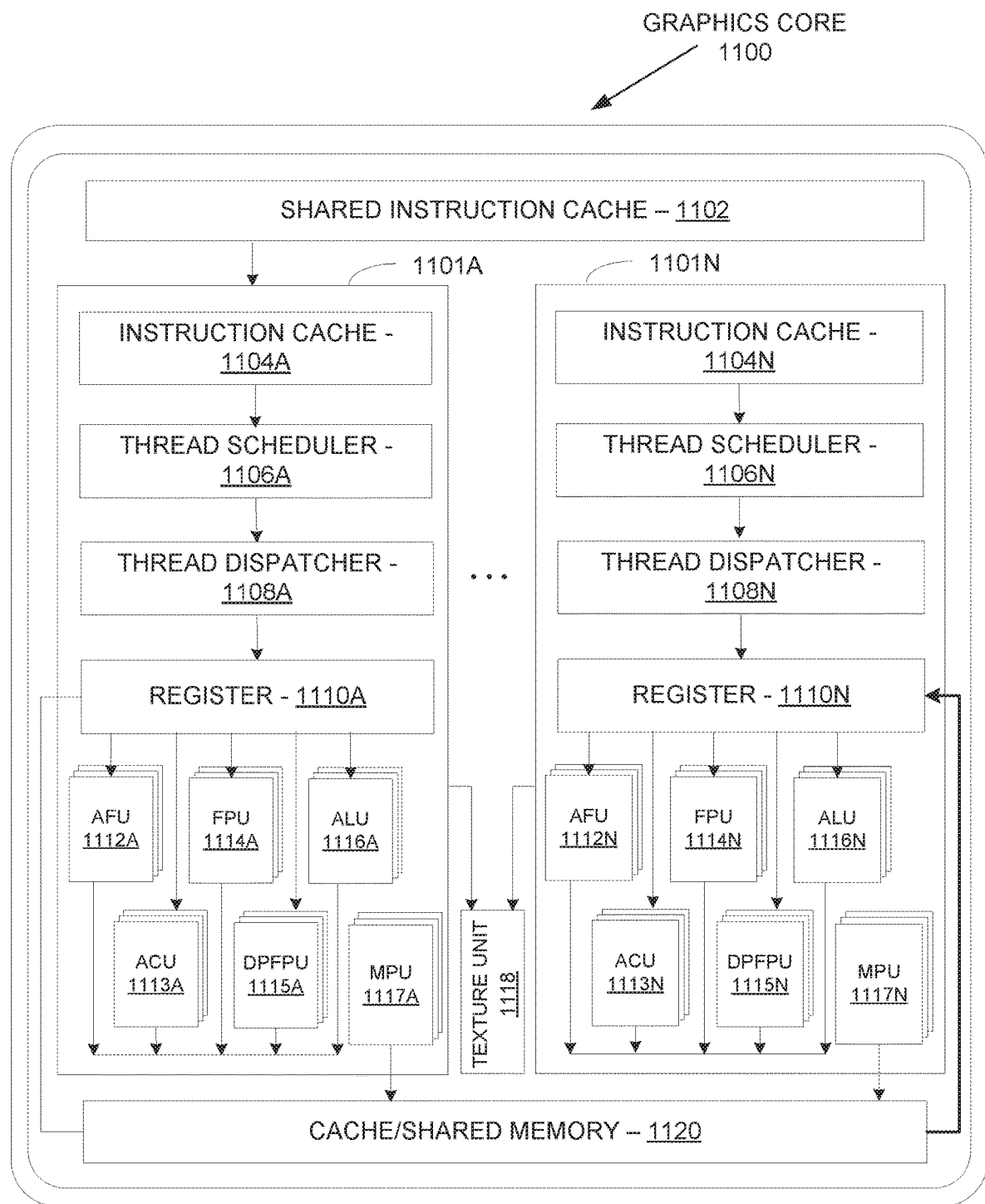
FIG. 11A illustrates a graphics core, in accordance with at least one embodiment.

FIG. 11A illustrates a graphics core 1100, in accordance with at least one embodiment. In at least one embodiment, graphics core 1100 may be included within graphics processor 510 of FIG. 5. In at least one embodiment, graphics core 1100 may be a unified shader core 1055A-1055N as in FIG. 10B. In at least one embodiment, graphics core 1100 includes a shared instruction cache 1102, a texture unit 1118, and a cache/shared memory 1120 that are common to execution resources within graphics core 1100. In at least one embodiment, graphics core 1100 can include multiple slices 1101A-1101N or partition for each core, and a graphics processor can include multiple instances of graphics core 1100. Slices 1101A-1101N can include support logic including a local instruction cache 1104A-1104N, a thread scheduler 1106A-1106N, a thread dispatcher 1108A-1108N, and a set of registers 1110A-1110N. In at least one embodiment, slices 1101A-1101N can include a set of additional function units ("AFUs") 1112A-1112N, floating-point units ("FPUs") 1114A-1114N, integer arithmetic logic units ("ALUs") 1116-1116N, address computational units ("ACUs") 1113A-1113N, double-precision floating-point units ("DPFPUs") 1115A-1115N, and matrix processing units ("MPUs") 1117A-1117N.

In at least one embodiment, FPUs 1114A-1114N can perform single-precision (32-bit) and half-precision (16-bit) floating point operations, while DPFPUs 1115A-1115N perform double precision (64-bit) floating point operations. In at least one embodiment, ALUs 1116A-1116N can perform variable precision integer operations at 8-bit, 16-bit, and 32-bit precision, and can be configured for mixed precision operations. In at least one embodiment, MPUs 1117A-1117N can also be configured for mixed precision matrix operations, including half-precision floating point and 8-bit integer operations. In at least one embodiment, MPUs 1117-1117N can perform a variety of matrix operations to accelerate CUDA programs, including enabling support for accelerated general matrix to matrix multiplication ("GEMM"). In at least one embodiment, AFUs 1112A-1112N can perform additional logic operations not supported by floating-point or integer units, including trigonometric operations (e.g., Sine, Cosine, etc.).

Figure 11B:
FIG. 11B illustrates a GPGPU, in accordance with at least one embodiment.

FIG. 11B illustrates a general-purpose graphics processing unit ("GPGPU") 1130, in accordance with at least one embodiment. In at least one embodiment, GPGPU 1130 is highly-parallel and suitable for deployment on a multi-chip module. In at least one embodiment, GPGPU 1130 can be configured to enable highly-parallel compute operations to be performed by an array of GPUs. In at least one embodiment, GPGPU 1130 can be linked directly to other instances of GPGPU 1130 to create a multi-GPU cluster to improve execution time for CUDA programs. In at least one embodiment, GPGPU 1130 includes a host interface 1132 to enable a connection with a host processor. In at least one embodiment, host interface 1132 is a PCIe interface. In at least one embodiment, host interface 1132 can be a vendor specific communications interface or communications fabric. In at least one embodiment, GPGPU 1130 receives commands from a host processor and uses a global scheduler 1134 to distribute execution threads associated with those commands to a set of compute clusters 1136A-1136H. In at least one embodiment, compute clusters 1136A-1136H share a cache memory 1138. In at least one embodiment, cache memory 1138 can serve as a higher-level cache for cache memories within compute clusters 1136A-1136H.

In at least one embodiment, GPGPU 1130 includes memory 1144A-1144B coupled with compute clusters 1136A-1136H via a set of memory controllers 1142A-1142B. In at least one embodiment, memory 1144A-1144B can include various types of memory devices including DRAM or graphics random access memory, such as synchronous graphics random access memory ("SGRAM"), including graphics double data rate ("GDDR") memory.

In at least one embodiment, compute clusters 1136A-1136H each include a set of graphics cores, such as graphics core 1100 of FIG. 11A, which can include multiple types of integer and floating point logic units that can perform computational operations at a range of precisions including suited for computations associated with CUDA programs. For example, in at least one embodiment, at least a subset of floating point units in each of compute clusters 1136A-1136H can be configured to perform 16-bit or 32-bit floating point operations, while a different subset of floating point units can be configured to perform 64-bit floating point operations.

In at least one embodiment, multiple instances of GPGPU 1130 can be configured to operate as a compute cluster. Compute clusters 1136A-1136H may implement any technically feasible communication techniques for synchronization and data exchange. In at least one embodiment, multiple instances of GPGPU 1130 communicate over host interface 1132. In at least one embodiment, GPGPU 1130 includes an I/O hub 1139 that couples GPGPU 1130 with a GPU link 1140 that enables a direct connection to other instances of GPGPU 1130. In at least one embodiment, GPU link 1140 is coupled to a dedicated GPU-to-GPU bridge that enables communication and synchronization between multiple instances of GPGPU 1130. In at least one embodiment GPU link 1140 couples with a high speed interconnect to transmit and receive data to other GPGPUs 1130 or parallel processors. In at least one embodiment, multiple instances of GPGPU 1130 are located in separate data processing systems and communicate via a network device that is accessible via host interface 1132. In at least one embodiment GPU link 1140 can be configured to enable a connection to a host processor in addition to or as an alternative to host interface 1132. In at least one embodiment, GPGPU 1130 can be configured to execute a CUDA program.

Figure 12A:
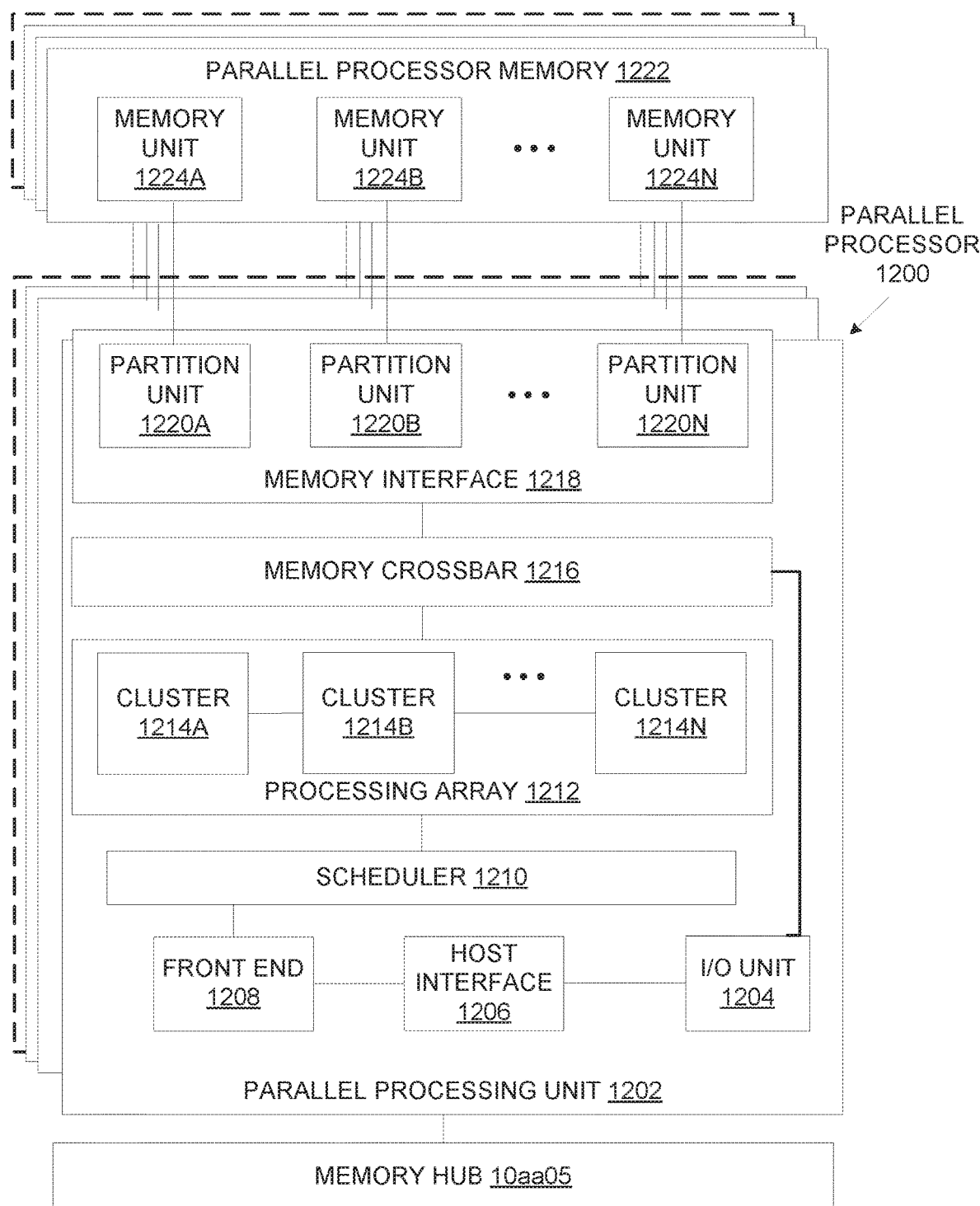
FIG. 12A illustrates a parallel processor, in accordance with at least one embodiment.

FIG. 12A illustrates a parallel processor 1200, in accordance with at least one embodiment. In at least one embodiment, various components of parallel processor 1200 may be implemented using one or more integrated circuit devices, such as programmable processors, application specific integrated circuits ("ASICs"), or FPGAs.

In at least one embodiment, parallel processor 1200 includes a parallel processing unit 1202. In at least one embodiment, parallel processing unit 1202 includes an I/O unit 1204 that enables communication with other devices, including other instances of parallel processing unit 1202. In at least one embodiment, I/O unit 1204 may be directly connected to other devices. In at least one embodiment, I/O unit 1204 connects with other devices via use of a hub or switch interface, such as memory hub 605. In at least one embodiment, connections between memory hub 605 and I/O unit 1204 form a communication link. In at least one embodiment, I/O unit 1204 connects with a host interface 1206 and a memory crossbar 1216, where host interface 1206 receives commands directed to performing processing operations and memory crossbar 1216 receives commands directed to performing memory operations.

In at least one embodiment, when host interface 1206 receives a command buffer via I/O unit 1204, host interface 1206 can direct work operations to perform those commands to a front end 1208. In at least one embodiment, front end 1208 couples with a scheduler 1210, which is configured to distribute commands or other work items to a processing array 1212. In at least one embodiment, scheduler 1210 ensures that processing array 1212 is properly configured and in a valid state before tasks are distributed to processing array 1212. In at least one embodiment, scheduler 1210 is implemented via firmware logic executing on a microcontroller. In at least one embodiment, microcontroller implemented scheduler 1210 is configurable to perform complex scheduling and work distribution operations at coarse and fine granularity, enabling rapid preemption and context switching of threads executing on processing array 1212. In at least one embodiment, host software can prove workloads for scheduling on processing array 1212 via one of multiple graphics processing doorbells. In at least one embodiment, workloads can then be automatically distributed across processing array 1212 by scheduler 1210 logic within a microcontroller including scheduler 1210.

In at least one embodiment, processing array 1212 can include up to "N" clusters (e.g., cluster 1214A, cluster 1214B, through cluster 1214N). In at least one embodiment, each cluster 1214A-1214N of processing array 1212 can execute a large number of concurrent threads. In at least one embodiment, scheduler 1210 can allocate work to clusters 1214A-1214N of processing array 1212 using various scheduling and/or work distribution algorithms, which may vary depending on the workload arising for each type of program or computation. In at least one embodiment, scheduling can be handled dynamically by scheduler 1210, or can be assisted in part by compiler logic during compilation of program logic configured for execution by processing array 1212. In at least one embodiment, different clusters 1214A-1214N of processing array 1212 can be allocated for processing different types of programs or for performing different types of computations.

In at least one embodiment, processing array 1212 can be configured to perform various types of parallel processing operations. In at least one embodiment, processing array 1212 is configured to perform general-purpose parallel compute operations. For example, in at least one embodiment, processing array 1212 can include logic to execute processing tasks including filtering of video and/or audio data, performing modeling operations, including physics operations, and performing data transformations.

In at least one embodiment, processing array 1212 is configured to perform parallel graphics processing operations. In at least one embodiment, processing array 1212 can include additional logic to support execution of such graphics processing operations, including, but not limited to texture sampling logic to perform texture operations, as well as tessellation logic and other vertex processing logic. In at least one embodiment, processing array 1212 can be configured to execute graphics processing related shader programs such as, but not limited to vertex shaders, tessellation shaders, geometry shaders, and pixel shaders. In at least one embodiment, parallel processing unit 1202 can transfer data from system memory via I/O unit 1204 for processing. In at least one embodiment, during processing, transferred data can be stored to on-chip memory (e.g., a parallel processor memory 1222) during processing, then written back to system memory.

In at least one embodiment, when parallel processing unit 1202 is used to perform graphics processing, scheduler 1210 can be configured to divide a processing workload into approximately equal sized tasks, to better enable distribution of graphics processing operations to multiple clusters 1214A-1214N of processing array 1212. In at least one embodiment, portions of processing array 1212 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1214A-1214N may be stored in buffers to allow intermediate data to be transmitted between clusters 1214A-1214N for further processing.

In at least one embodiment, processing array 1212 can receive processing tasks to be executed via scheduler 1210, which receives commands defining processing tasks from front end 1208. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1210 may be configured to fetch indices corresponding to tasks or may receive indices from front end 1208. In at least one embodiment, front end 1208 can be configured to ensure processing array 1212 is configured to a valid state before a workload specified by incoming command buffers (e.g., batch-buffers, push buffers, etc.) is initiated.

In at least one embodiment, each of one or more instances of parallel processing unit 1202 can couple with parallel processor memory 1222. In at least one embodiment, parallel processor memory 1222 can be accessed via memory crossbar 1216, which can receive memory requests from processing array 1212 as well as I/O unit 1204. In at least one embodiment, memory crossbar 1216 can access parallel processor memory 1222 via a memory interface 1218. In at least one embodiment, memory interface 1218 can include multiple partition units (e.g., a partition unit 1220A, partition unit 1220B, through partition unit 1220N) that can each couple to a portion (e.g., memory unit) of parallel processor memory 1222. In at least one embodiment, a number of partition units 1220A-1220N is configured to be equal to a number of memory units, such that a first partition unit 1220A has a corresponding first memory unit 1224A, a second partition unit 1220B has a corresponding memory unit 1224B, and an Nth partition unit 1220N has a corresponding Nth memory unit 1224N. In at least one embodiment, a number of partition units 1220A-1220N may not be equal to a number of memory devices.

In at least one embodiment, memory units 1224A-1224N can include various types of memory devices, including DRAM or graphics random access memory, such as SGRAM, including GDDR memory. In at least one embodiment, memory units 1224A-1224N may also include 3D stacked memory, including but not limited to high bandwidth memory ("HBM"). In at least one embodiment, render targets, such as frame buffers or texture maps may be stored across memory units 1224A-1224N, allowing partition units 1220A-1220N to write portions of each render target in parallel to efficiently use available bandwidth of parallel processor memory 1222. In at least one embodiment, a local instance of parallel processor memory 1222 may be excluded in favor of a unified memory design that utilizes system memory in conjunction with local cache memory.

In at least one embodiment, any one of clusters 1214A-1214N of processing array 1212 can process data that will be written to any of memory units 1224A-1224N within parallel processor memory 1222. In at least one embodiment, memory crossbar 1216 can be configured to transfer an output of each cluster 1214A-1214N to any partition unit 1220A-1220N or to another cluster 1214A-1214N, which can perform additional processing operations on an output. In at least one embodiment, each cluster 1214A-1214N can communicate with memory interface 1218 through memory crossbar 1216 to read from or write to various external memory devices. In at least one embodiment, memory crossbar 1216 has a connection to memory interface 1218 to communicate with I/O unit 1204, as well as a connection to a local instance of parallel processor memory 1222, enabling processing units within different clusters 1214A-1214N to communicate with system memory or other memory that is not local to parallel processing unit 1202. In at least one embodiment, memory crossbar 1216 can use virtual channels to separate traffic streams between clusters 1214A-1214N and partition units 1220A-1220N.

In at least one embodiment, multiple instances of parallel processing unit 1202 can be provided on a single add-in card, or multiple add-in cards can be interconnected. In at least one embodiment, different instances of parallel processing unit 1202 can be configured to interoperate even if different instances have different numbers of processing cores, different amounts of local parallel processor memory, and/or other configuration differences. For example, in at least one embodiment, some instances of parallel processing unit 1202 can include higher precision floating point units relative to other instances. In at least one embodiment, systems incorporating one or more instances of parallel processing unit 1202 or parallel processor 1200 can be implemented in a variety of configurations and form factors, including but not limited to desktop, laptop, or handheld personal computers, servers, workstations, game consoles, and/or embedded systems.

Figure 12B:
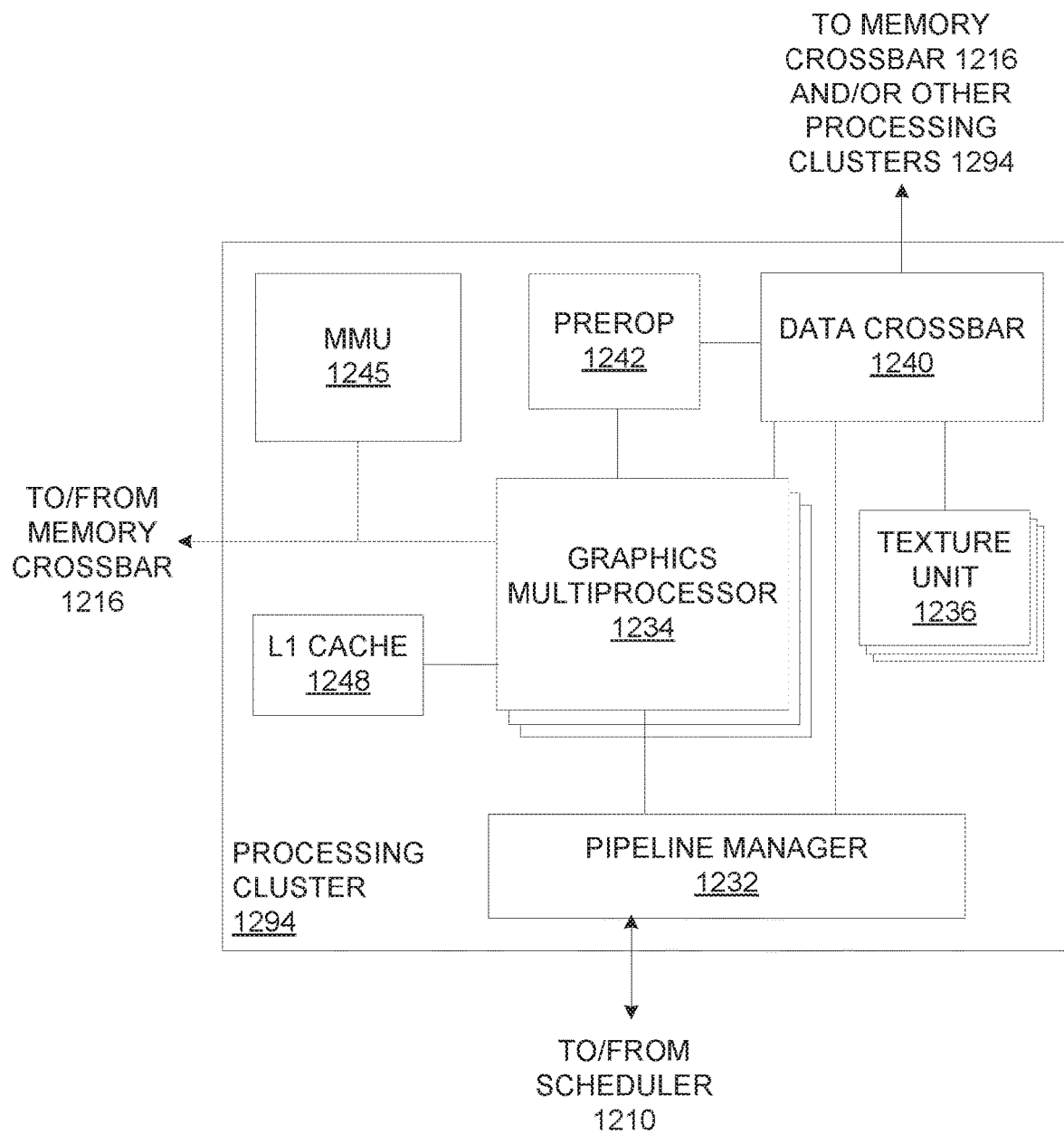
FIG. 12B illustrates a processing cluster, in accordance with at least one embodiment.

FIG. 12B illustrates a processing cluster 1294, in accordance with at least one embodiment. In at least one embodiment, processing cluster 1294 is included within a parallel processing unit. In at least one embodiment, processing cluster 1294 is one of processing clusters 1214A-1214N of FIG. 12. In at least one embodiment, processing cluster 1294 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 1294.

In at least one embodiment, operation of processing cluster 1294 can be controlled via a pipeline manager 1232 that distributes processing tasks to SIMT parallel processors. In at least one embodiment, pipeline manager 1232 receives instructions from scheduler 1210 of FIG. 12 and manages execution of those instructions via a graphics multiprocessor 1234 and/or a texture unit 1236. In at least one embodiment, graphics multiprocessor 1234 is an exemplary instance of a SIMT parallel processor. However, in at least one embodiment, various types of SIMT parallel processors of differing architectures may be included within processing cluster 1294. In at least one embodiment, one or more instances of graphics multiprocessor 1234 can be included within processing cluster 1294. In at least one embodiment, graphics multiprocessor 1234 can process data and a data crossbar 1240 can be used to distribute processed data to one of multiple possible destinations, including other shader units. In at least one embodiment, pipeline manager 1232 can facilitate distribution of processed data by specifying destinations for processed data to be distributed via data crossbar 1240.

In at least one embodiment, each graphics multiprocessor 1234 within processing cluster 1294 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 1294 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 1234. In at least one embodiment, a thread group may include fewer threads than a number of processing engines within graphics multiprocessor 1234. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 1234. In at least one embodiment, when a thread group includes more threads than the number of processing engines within graphics multiprocessor 1234, processing can be performed over consecutive clock cycles. In at least one embodiment, multiple thread groups can be executed concurrently on graphics multiprocessor 1234.

In at least one embodiment, graphics multiprocessor 1234 includes an internal cache memory to perform load and store operations. In at least one embodiment, graphics multiprocessor 1234 can forego an internal cache and use a cache memory (e.g., L1 cache 1248) within processing cluster 1294. In at least one embodiment, each graphics multiprocessor 1234 also has access to Level 2 ("L2") caches within partition units (e.g., partition units 1220A-1220N of FIG. 12A) that are shared among all processing clusters 1294 and may be used to transfer data between threads. In at least one embodiment, graphics multiprocessor 1234 may also access off-chip global memory, which can include one or more of local parallel processor memory and/or system memory. In at least one embodiment, any memory external to parallel processing unit 1202 may be used as global memory. In at least one embodiment, processing cluster 1294 includes multiple instances of graphics multiprocessor 1234 that can share common instructions and data, which may be stored in L1 cache 1248.

In at least one embodiment, each processing cluster 1294 may include an MMU 1245 that is configured to map virtual addresses into physical addresses. In at least one embodiment, one or more instances of MMU 1245 may reside within memory interface 1218 of FIG. 12. In at least one embodiment, MMU 1245 includes a set of page table entries ("PTEs") used to map a virtual address to a physical address of a tile and optionally a cache line index. In at least one embodiment, MMU 1245 may include address translation lookaside buffers ("TLBs") or caches that may reside within graphics multiprocessor 1234 or L1 cache 1248 or processing cluster 1294. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 1294 may be configured such that each graphics multiprocessor 1234 is coupled to a texture unit 1236 for performing texture mapping operations, e.g., determining texture sample positions, reading texture data, and filtering texture data. In at least one embodiment, texture data is read from an internal texture L1 cache (not shown) or from an L1 cache within graphics multiprocessor 1234 and is fetched from an L2 cache, local parallel processor memory, or system memory, as needed. In at least one embodiment, each graphics multiprocessor 1234 outputs a processed task to data crossbar 1240 to provide the processed task to another processing cluster 1294 for further processing or to store the processed task in an L2 cache, a local parallel processor memory, or a system memory via memory crossbar 1216. In at least one embodiment, a pre-raster operations unit ("preROP") 1242 is configured to receive data from graphics multiprocessor 1234, direct data to ROP units, which may be located with partition units as described herein (e.g., partition units 1220A-1220N of FIG. 12). In at least one embodiment, PreROP 1242 can perform optimizations for color blending, organize pixel color data, and perform address translations.

Figure 12C:
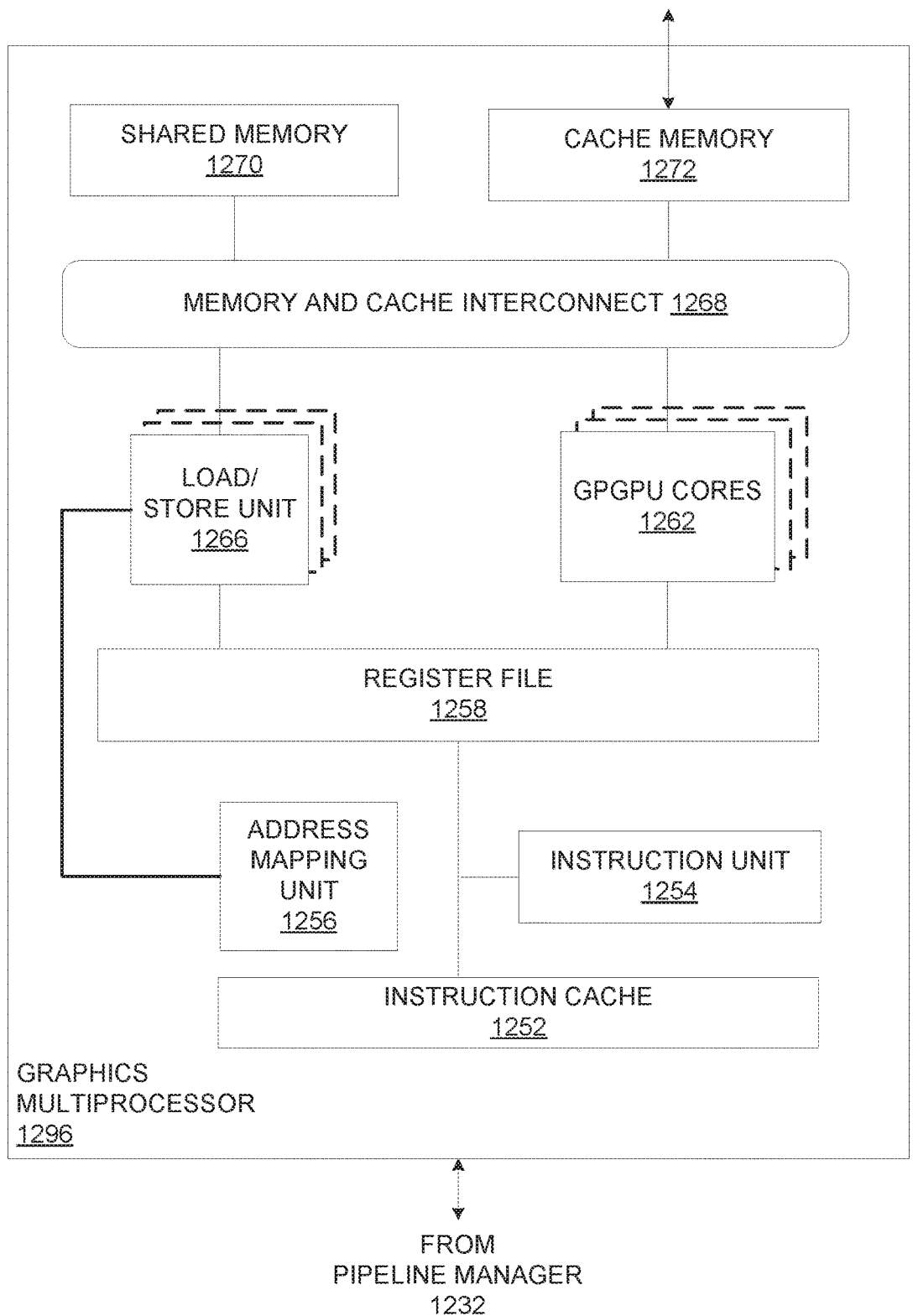
FIG. 12C illustrates a graphics multiprocessor, in accordance with at least one embodiment.

FIG. 12C illustrates a graphics multiprocessor 1296, in accordance with at least one embodiment. In at least one embodiment, graphics multiprocessor 1296 is graphics multiprocessor 1234 of FIG. 12B. In at least one embodiment, graphics multiprocessor 1296 couples with pipeline manager 1232 of processing cluster 1294. In at least one embodiment, graphics multiprocessor 1296 has an execution pipeline including but not limited to an instruction cache 1252, an instruction unit 1254, an address mapping unit 1256, a register file 1258, one or more GPGPU cores 1262, and one or more LSUs 1266. GPGPU cores 1262 and LSUs 1266 are coupled with cache memory 1272 and shared memory 1270 via a memory and cache interconnect 1268.

In at least one embodiment, instruction cache 1252 receives a stream of instructions to execute from pipeline manager 1232. In at least one embodiment, instructions are cached in instruction cache 1252 and dispatched for execution by instruction unit 1254. In at least one embodiment, instruction unit 1254 can dispatch instructions as thread groups (e.g., warps), with each thread of a thread group assigned to a different execution unit within GPGPU core 1262. In at least one embodiment, an instruction can access any of a local, shared, or global address space by specifying an address within a unified address space. In at least one embodiment, address mapping unit 1256 can be used to translate addresses in a unified address space into a distinct memory address that can be accessed by LSUs 1266.

In at least one embodiment, register file 1258 provides a set of registers for functional units of graphics multiprocessor 1296. In at least one embodiment, register file 1258 provides temporary storage for operands connected to data paths of functional units (e.g., GPGPU cores 1262, LSUs 1266) of graphics multiprocessor 1296. In at least one embodiment, register file 1258 is divided between each of functional units such that each functional unit is allocated a dedicated portion of register file 1258. In at least one embodiment, register file 1258 is divided between different thread groups being executed by graphics multiprocessor 1296.

In at least one embodiment, GPGPU cores 1262 can each include FPUs and/or integer ALUs that are used to execute instructions of graphics multiprocessor 1296. GPGPU cores 1262 can be similar in architecture or can differ in architecture. In at least one embodiment, a first portion of GPGPU cores 1262 include a single precision FPU and an integer ALU while a second portion of GPGPU cores 1262 include a double precision FPU. In at least one embodiment, FPUs can implement IEEE 754-2008 standard for floating point arithmetic or enable variable precision floating point arithmetic. In at least one embodiment, graphics multiprocessor 1296 can additionally include one or more fixed function or special function units to perform specific functions such as copy rectangle or pixel blending operations. In at least one embodiment one or more of GPGPU cores 1262 can also include fixed or special function logic.

In at least one embodiment, GPGPU cores 1262 include SIMD logic capable of performing a single instruction on multiple sets of data. In at least one embodiment GPGPU cores 1262 can physically execute SIMD4, SIMD8, and SIMD16 instructions and logically execute SIMD1, SIMD2, and SIMD32 instructions. In at least one embodiment, SIMD instructions for GPGPU cores 1262 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 1268 is an interconnect network that connects each functional unit of graphics multiprocessor 1296 to register file 1258 and to shared memory 1270. In at least one embodiment, memory and cache interconnect 1268 is a crossbar interconnect that allows LSU 1266 to implement load and store operations between shared memory 1270 and register file 1258. In at least one embodiment, register file 1258 can operate at a same frequency as GPGPU cores 1262, thus data transfer between GPGPU cores 1262 and register file 1258 is very low latency. In at least one embodiment, shared memory 1270 can be used to enable communication between threads that execute on functional units within graphics multiprocessor 1296. In at least one embodiment, cache memory 1272 can be used as a data cache for example, to cache texture data communicated between functional units and texture unit 1236. In at least one embodiment, shared memory 1270 can also be used as a program managed cached. In at least one embodiment, threads executing on GPGPU cores 1262 can programmatically store data within shared memory in addition to automatically cached data that is stored within cache memory 1272.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 13:
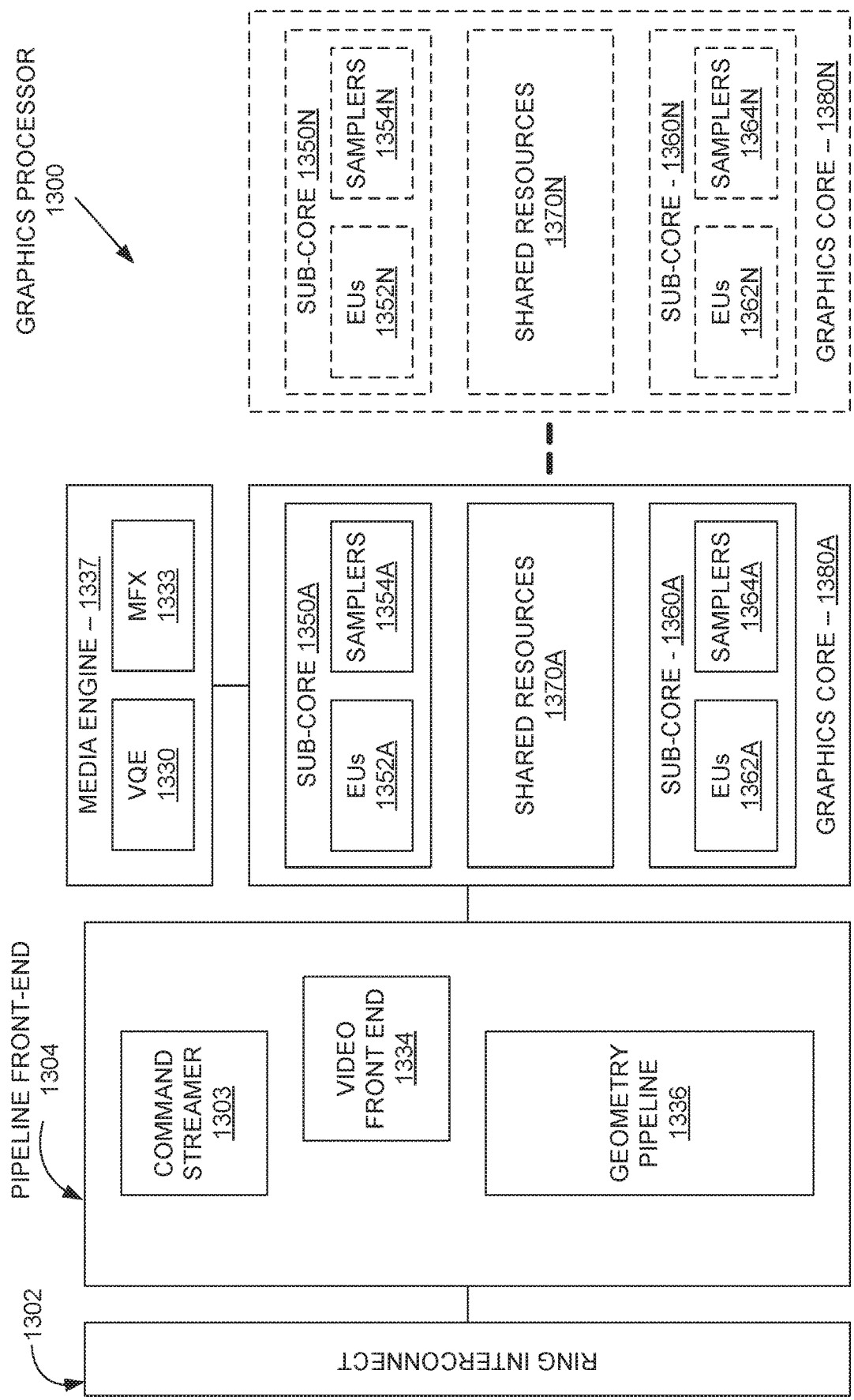
FIG. 13 illustrates a graphics processor, in accordance with at least one embodiment.

FIG. 13 illustrates a graphics processor 1300, in accordance with at least one embodiment. In at least one embodiment, graphics processor 1300 includes a ring interconnect 1302, a pipeline front-end 1304, a media engine 1337, and graphics cores 1380A-1380N. In at least one embodiment, ring interconnect 1302 couples graphics processor 1300 to other processing units, including other graphics processors or one or more general-purpose processor cores. In at least one embodiment, graphics processor 1300 is one of many processors integrated within a multi-core processing system.

In at least one embodiment, graphics processor 1300 receives batches of commands via ring interconnect 1302. In at least one embodiment, incoming commands are interpreted by a command streamer 1303 in pipeline front-end 1304. In at least one embodiment, graphics processor 1300 includes scalable execution logic to perform 3D geometry processing and media processing via graphics core(s) 1380A-1380N. In at least one embodiment, for 3D geometry processing commands, command streamer 1303 supplies commands to geometry pipeline 1336. In at least one embodiment, for at least some media processing commands, command streamer 1303 supplies commands to a video front end 1334, which couples with a media engine 1337. In at least one embodiment, media engine 1337 includes a Video Quality Engine ("VQE") 1330 for video and image post-processing and a multi-format encode/decode ("MFX") engine 1333 to provide hardware-accelerated media data encode and decode. In at least one embodiment, geometry pipeline 1336 and media engine 1337 each generate execution threads for thread execution resources provided by at least one graphics core 1380A.

In at least one embodiment, graphics processor 1300 includes scalable thread execution resources featuring modular graphics cores 1380A-1380N (sometimes referred to as core slices), each having multiple sub-cores 1350A-550N, 1360A-1360N (sometimes referred to as core sub-slices). In at least one embodiment, graphics processor 1300 can have any number of graphics cores 1380A through 1380N. In at least one embodiment, graphics processor 1300 includes a graphics core 1380A having at least a first sub-core 1350A and a second sub-core 1360A. In at least one embodiment, graphics processor 1300 is a low power processor with a single sub-core (e.g., sub-core 1350A). In at least one embodiment, graphics processor 1300 includes multiple graphics cores 1380A-1380N, each including a set of first sub-cores 1350A-1350N and a set of second sub-cores 1360A-1360N. In at least one embodiment, each sub-core in first sub-cores 1350A-1350N includes at least a first set of execution units ("EUs") 1352A-1352N and media/texture samplers 1354A-1354N. In at least one embodiment, each sub-core in second sub-cores 1360A-1360N includes at least a second set of execution units 1362A-1362N and samplers 1364A-1364N. In at least one embodiment, each sub-core 1350A-1350N, 1360A-1360N shares a set of shared resources 1370A-1370N. In at least one embodiment, shared resources 1370 include shared cache memory and pixel operation logic.

Figure 14:
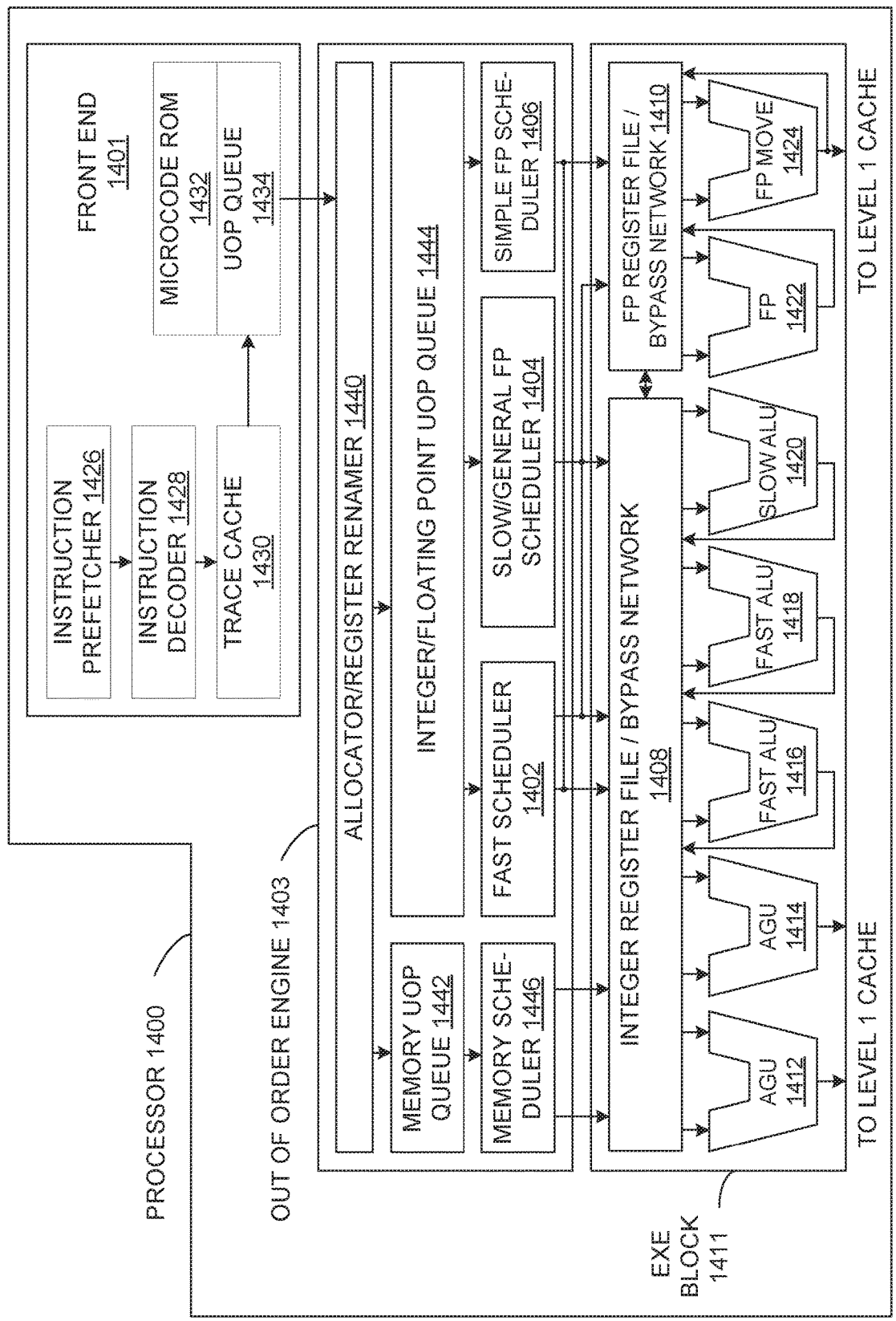
FIG. 14 illustrates a processor, in accordance with at least one embodiment.

FIG. 14 illustrates a processor 1400, in accordance with at least one embodiment. In at least one embodiment, processor 1400 may include, without limitation, logic circuits to perform instructions. In at least one embodiment, processor 1400 may perform instructions, including x86 instructions, ARM instructions, specialized instructions for ASICs, etc. In at least one embodiment, processor 1410 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 1410 may perform instructions to accelerate CUDA programs.

In at least one embodiment, processor 1400 includes an in-order front end ("front end") 1401 to fetch instructions to be executed and prepare instructions to be used later in processor pipeline. In at least one embodiment, front end 1401 may include several units. In at least one embodiment, an instruction prefetcher 1426 fetches instructions from memory and feeds instructions to an instruction decoder 1428 which in turn decodes or interprets instructions. For example, in at least one embodiment, instruction decoder 1428 decodes a received instruction into one or more operations called "micro-instructions" or "micro-operations" (also called "micro ops" or "uops") for execution. In at least one embodiment, instruction decoder 1428 parses instruction into an opcode and corresponding data and control fields that may be used by micro-architecture to perform operations. In at least one embodiment, a trace cache 1430 may assemble decoded uops into program ordered sequences or traces in a uop queue 1434 for execution. In at least one embodiment, when trace cache 1430 encounters a complex instruction, a microcode ROM 1432 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 1428 may access microcode ROM 1432 to perform instruction. In at least one embodiment, an instruction may be decoded into a small number of micro-ops for processing at instruction decoder 1428. In at least one embodiment, an instruction may be stored within microcode ROM 1432 should a number of micro-ops be needed to accomplish operation. In at least one embodiment, trace cache 1430 refers to an entry point programmable logic array ("PLA") to determine a correct micro-instruction pointer for reading microcode sequences to complete one or more instructions from microcode ROM 1432. In at least one embodiment, after microcode ROM 1432 finishes sequencing micro-ops for an instruction, front end 1401 of machine may resume fetching micro-ops from trace cache 1430.

In at least one embodiment, out-of-order execution engine ("out of order engine") 1403 may prepare instructions for execution. In at least one embodiment, out-of-order execution logic has a number of buffers to smooth out and re-order the flow of instructions to optimize performance as they go down a pipeline and get scheduled for execution. Out-of-order execution engine 1403 includes, without limitation, an allocator/register renamer 1440, a memory uop queue 1442, an integer/floating point uop queue 1444, a memory scheduler 1446, a fast scheduler 1402, a slow/general floating point scheduler ("slow/general FP scheduler") 1404, and a simple floating point scheduler ("simple FP scheduler") 1406. In at least one embodiment, fast schedule 1402, slow/general floating point scheduler 1404, and simple floating point scheduler 1406 are also collectively referred to herein as "uop schedulers 1402, 1404, 1406." Allocator/register renamer 1440 allocates machine buffers and resources that each uop needs in order to execute. In at least one embodiment, allocator/register renamer 1440 renames logic registers onto entries in a register file. In at least one embodiment, allocator/register renamer 1440 also allocates an entry for each uop in one of two uop queues, memory uop queue 1442 for memory operations and integer/floating point uop queue 1444 for non-memory operations, in front of memory scheduler 1446 and uop schedulers 1402, 1404, 1406. In at least one embodiment, uop schedulers 1402, 1404, 1406, determine when a uop is ready to execute based on readiness of their dependent input register operand sources and availability of execution resources uops need to complete their operation. In at least one embodiment, fast scheduler 1402 of at least one embodiment may schedule on each half of main clock cycle while slow/general floating point scheduler 1404 and simple floating point scheduler 1406 may schedule once per main processor clock cycle. In at least one embodiment, uop schedulers 1402, 1404, 1406 arbitrate for dispatch ports to schedule uops for execution.

In at least one embodiment, execution block b 11 includes, without limitation, an integer register file/bypass network 1408, a floating point register file/bypass network ("FP register file/bypass network") 1410, address generation units ("AGUs") 1412 and 1414, fast ALUs 1416 and 1418, a slow ALU 1420, a floating point ALU ("FP") 1422, and a floating point move unit ("FP move") 1424. In at least one embodiment, integer register file/bypass network 1408 and floating point register file/bypass network 1410 are also referred to herein as "register files 1408, 1410." In at least one embodiment, AGUSs 1412 and 1414, fast ALUs 1416 and 1418, slow ALU 1420, floating point ALU 1422, and floating point move unit 1424 are also referred to herein as "execution units 1412, 1414, 1416, 1418, 1420, 1422, and 1424." In at least one embodiment, an execution block may include, without limitation, any number (including zero) and type of register files, bypass networks, address generation units, and execution units, in any combination.

In at least one embodiment, register files 1408, 1410 may be arranged between uop schedulers 1402, 1404, 1406, and execution units 1412, 1414, 1416, 1418, 1420, 1422, and 1424. In at least one embodiment, integer register file/bypass network 1408 performs integer operations. In at least one embodiment, floating point register file/bypass network 1410 performs floating point operations. In at least one embodiment, each of register files 1408, 1410 may include, without limitation, a bypass network that may bypass or forward just completed results that have not yet been written into register file to new dependent uops. In at least one embodiment, register files 1408, 1410 may communicate data with each other. In at least one embodiment, integer register file/bypass network 1408 may include, without limitation, two separate register files, one register file for low-order thirty-two bits of data and a second register file for high order thirty-two bits of data. In at least one embodiment, floating point register file/bypass network 1410 may include, without limitation, 128-bit wide entries because floating point instructions typically have operands from 64 to 128 bits in width.

In at least one embodiment, execution units 1412, 1414, 1416, 1418, 1420, 1422, 1424 may execute instructions. In at least one embodiment, register files 1408, 1410 store integer and floating point data operand values that microinstructions need to execute. In at least one embodiment, processor 1400 may include, without limitation, any number and combination of execution units 1412, 1414, 1416, 1418, 1420, 1422, 1424. In at least one embodiment, floating point ALU 1422 and floating point move unit 1424 may execute floating point, MMX, SIMD, AVX and SSE, or other operations. In at least one embodiment, floating point ALU 1422 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 1416, 1418. In at least one embodiment, fast ALUS 1416, 1418 may execute fast operations with an effective latency of half a clock cycle. In at least one embodiment, most complex integer operations go to slow ALU 1420 as slow ALU 1420 may include, without limitation, integer execution hardware for long-latency type of operations, such as a multiplier, shifts, flag logic, and branch processing. In at least one embodiment, memory load/store operations may be executed by AGUs 1412, 1414. In at least one embodiment, fast ALU 1416, fast ALU 1418, and slow ALU 1420 may perform integer operations on 64-bit data operands. In at least one embodiment, fast ALU 1416, fast ALU 1418, and slow ALU 1420 may be implemented to support a variety of data bit sizes including sixteen, thirty-two, 128, 256, etc. In at least one embodiment, floating point ALU 1422 and floating point move unit 1424 may be implemented to support a range of operands having bits of various widths. In at least one embodiment, floating point ALU 1422 and floating point move unit 1424 may operate on 128-bit wide packed data operands in conjunction with SIMD and multimedia instructions.

In at least one embodiment, uop schedulers 1402, 1404, 1406 dispatch dependent operations before parent load has finished executing. In at least one embodiment, as uops may be speculatively scheduled and executed in processor 1400, processor 1400 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 15:
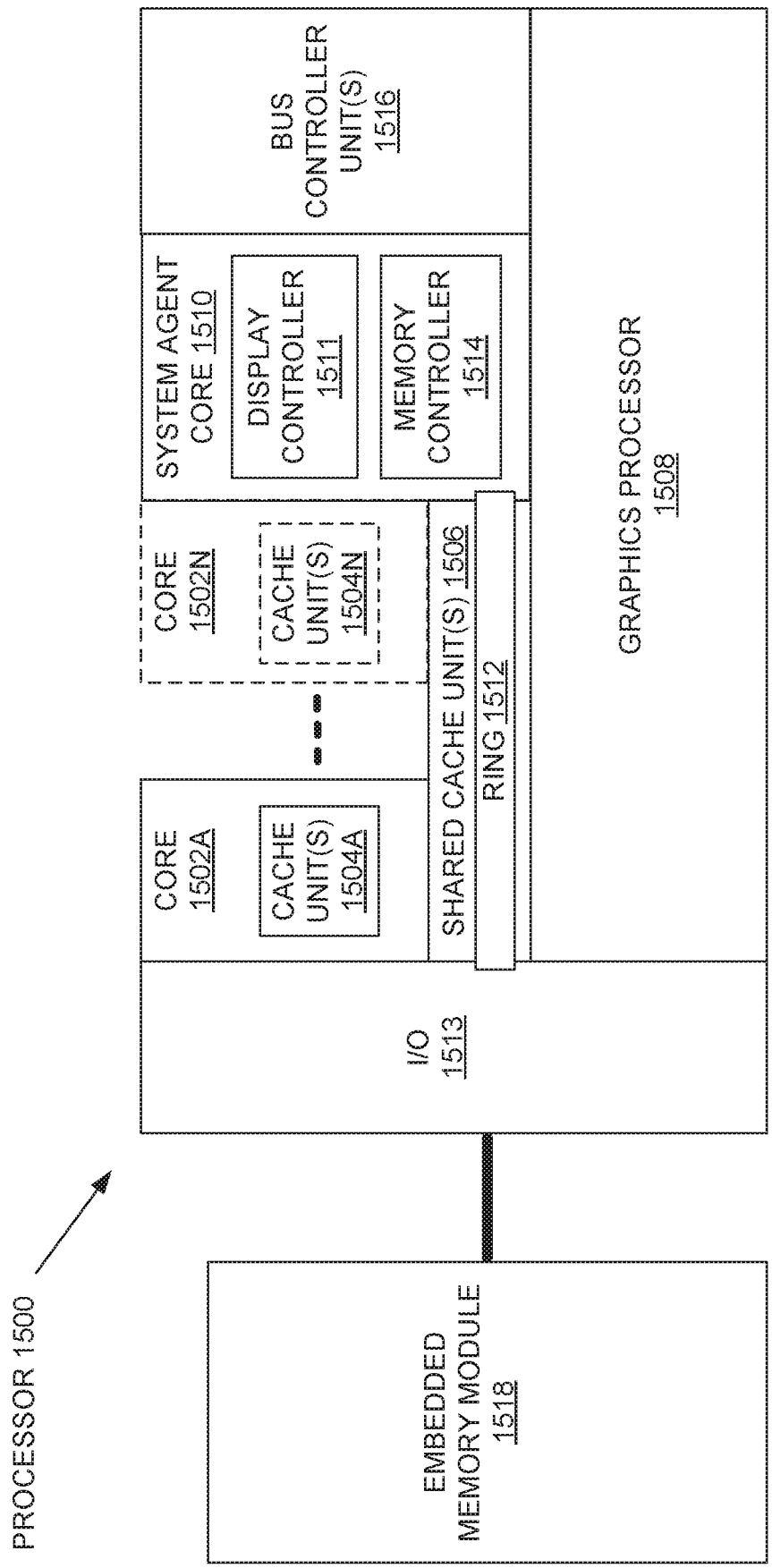
FIG. 15 illustrates a processor, in accordance with at least one embodiment.

FIG. 15 illustrates a processor 1500, in accordance with at least one embodiment. In at least one embodiment, processor 1500 includes, without limitation, one or more processor cores ("cores") 1502A-1502N, an integrated memory controller 1514, and an integrated graphics processor 1508. In at least one embodiment, processor 1500 can include additional cores up to and including additional processor core 1502N represented by dashed lined boxes. In at least one embodiment, each of processor cores 1502A-1502N includes one or more internal cache units 1504A-1504N. In at least one embodiment, each processor core also has access to one or more shared cached units 1506.

In at least one embodiment, internal cache units 1504A-1504N and shared cache units 1506 represent a cache memory hierarchy within processor 1500. In at least one embodiment, cache memory units 1504A-1504N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 1506 and 1504A-1504N.

In at least one embodiment, processor 1500 may also include a set of one or more bus controller units 1516 and a system agent core 1510. In at least one embodiment, one or more bus controller units 1516 manage a set of peripheral buses, such as one or more PCI or PCI express buses. In at least one embodiment, system agent core 1510 provides management functionality for various processor components. In at least one embodiment, system agent core 1510 includes one or more integrated memory controllers 1514 to manage access to various external memory devices (not shown).

In at least one embodiment, one or more of processor cores 1502A-1502N include support for simultaneous multithreading. In at least one embodiment, system agent core 1510 includes components for coordinating and operating processor cores 1502A-1502N during multi-threaded processing. In at least one embodiment, system agent core 1510 may additionally include a power control unit ("PCU"), which includes logic and components to regulate one or more power states of processor cores 1502A-1502N and graphics processor 1508.

In at least one embodiment, processor 1500 additionally includes graphics processor 1508 to execute graphics processing operations. In at least one embodiment, graphics processor 1508 couples with shared cache units 1506, and system agent core 1510, including one or more integrated memory controllers 1514. In at least one embodiment, system agent core 1510 also includes a display controller 1511 to drive graphics processor output to one or more coupled displays. In at least one embodiment, display controller 1511 may also be a separate module coupled with graphics processor 1508 via at least one interconnect, or may be integrated within graphics processor 1508.

In at least one embodiment, a ring based interconnect unit 1512 is used to couple internal components of processor 1500. In at least one embodiment, an alternative interconnect unit may be used, such as a point-to-point interconnect, a switched interconnect, or other techniques. In at least one embodiment, graphics processor 1508 couples with ring interconnect 1512 via an I/O link 1513.

In at least one embodiment, I/O link 1513 represents at least one of multiple varieties of I/O interconnects, including an on package I/O interconnect which facilitates communication between various processor components and a high-performance embedded memory module 1518, such as an eDRAM module. In at least one embodiment, each of processor cores 1502A-1502N and graphics processor 1508 use embedded memory modules 1518 as a shared LLC.

In at least one embodiment, processor cores 1502A-1502N are homogeneous cores executing a common instruction set architecture. In at least one embodiment, processor cores 1502A-1502N are heterogeneous in terms of I20, where one or more of processor cores 1502A-1502N execute a common instruction set, while one or more other cores of processor cores 1502A-15-02N executes a subset of a common instruction set or a different instruction set. In at least one embodiment, processor cores 1502A-1502N are heterogeneous in terms of microarchitecture, where one or more cores having a relatively higher power consumption couple with one or more cores having a lower power consumption. In at least one embodiment, processor 1500 can be implemented on one or more chips or as an SoC integrated circuit.

Figure 16:
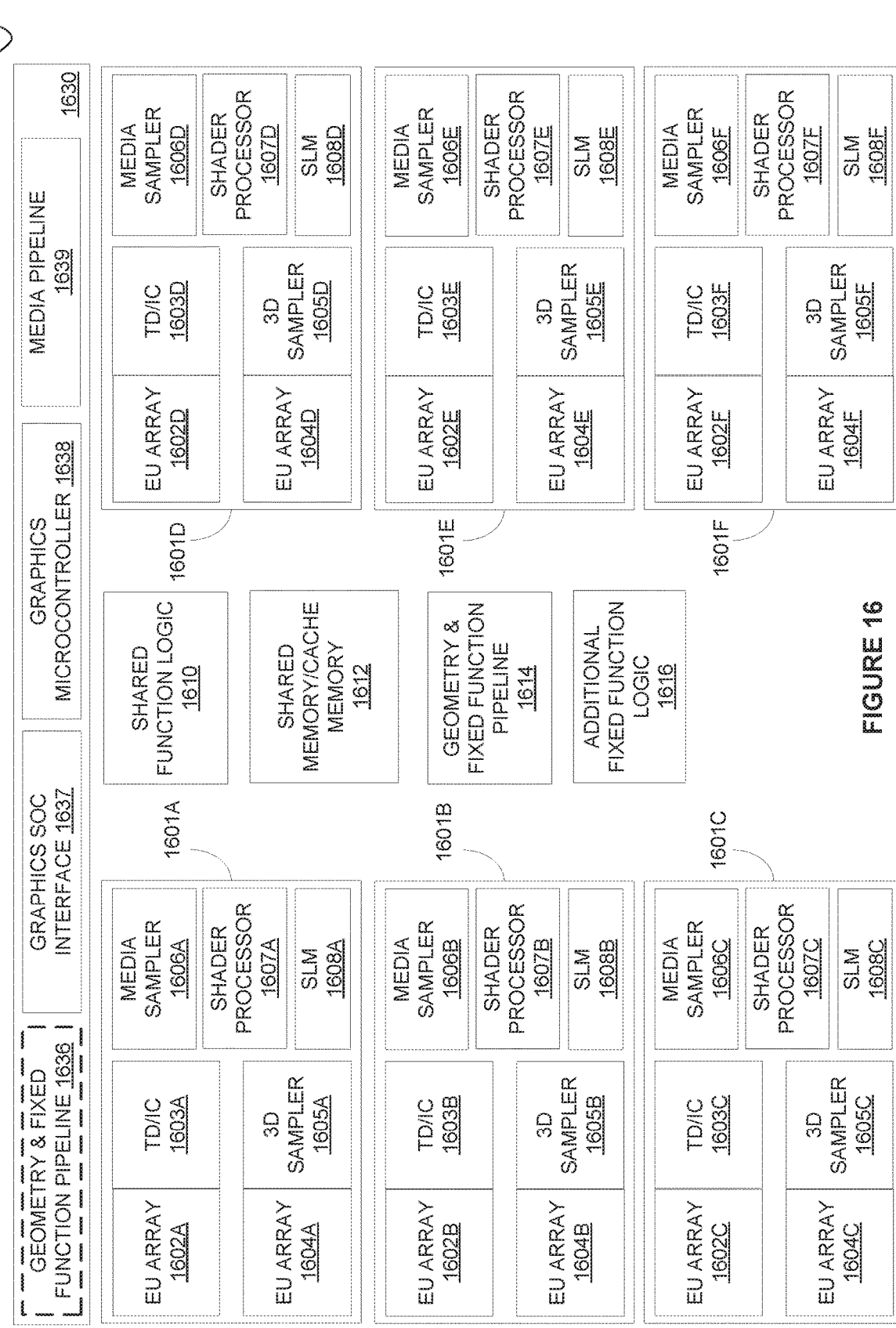
FIG. 16 illustrates a graphics processor core, in accordance with at least one embodiment.

FIG. 16 illustrates a graphics processor core 1600, in accordance with at least one embodiment described. In at least one embodiment, graphics processor core 1600 is included within a graphics core array. In at least one embodiment, graphics processor core 1600, sometimes referred to as a core slice, can be one or multiple graphics cores within a modular graphics processor. In at least one embodiment, graphics processor core 1600 is exemplary of one graphics core slice, and a graphics processor as described herein may include multiple graphics core slices based on target power and performance envelopes. In at least one embodiment, each graphics core 1600 can include a fixed function block 1630 coupled with multiple sub-cores 1601A-1601F, also referred to as sub-slices, that include modular blocks of general-purpose and fixed function logic.

In at least one embodiment, fixed function block 1630 includes a geometry/fixed function pipeline 1636 that can be shared by all sub-cores in graphics processor 1600, for example, in lower performance and/or lower power graphics processor implementations. In at least one embodiment, geometry/fixed function pipeline 1636 includes a 3D fixed function pipeline, a video front-end unit, a thread spawner and thread dispatcher, and a unified return buffer manager, which manages unified return buffers.

In at least one embodiment, fixed function block 1630 also includes a graphics SoC interface 1637, a graphics microcontroller 1638, and a media pipeline 1639. Graphics SoC interface 1637 provides an interface between graphics core 1600 and other processor cores within an SoC integrated circuit. In at least one embodiment, graphics microcontroller 1638 is a programmable sub-processor that is configurable to manage various functions of graphics processor 1600, including thread dispatch, scheduling, and pre-emption. In at least one embodiment, media pipeline 1639 includes logic to facilitate decoding, encoding, pre-processing, and/or post-processing of multimedia data, including image and video data. In at least one embodiment, media pipeline 1639 implements media operations via requests to compute or sampling logic within sub-cores 1601-1601F.

In at least one embodiment, SoC interface 1637 enables graphics core 1600 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 1637 can also enable communication with fixed function devices within an SoC, such as camera imaging pipelines, and enables use of and/or implements global memory atomics that may be shared between graphics core 1600 and CPUs within an SoC. In at least one embodiment, SoC interface 1637 can also implement power management controls for graphics core 1600 and enable an interface between a clock domain of graphic core 1600 and other clock domains within an SoC. In at least one embodiment, SoC interface 1637 enables receipt of command buffers from a command streamer and global thread dispatcher that are configured to provide commands and instructions to each of one or more graphics cores within a graphics processor. In at least one embodiment, commands and instructions can be dispatched to media pipeline 1639, when media operations are to be performed, or a geometry and fixed function pipeline (e.g., geometry and fixed function pipeline 1636, geometry and fixed function pipeline 1614) when graphics processing operations are to be performed.

In at least one embodiment, graphics microcontroller 1638 can be configured to perform various scheduling and management tasks for graphics core 1600. In at least one embodiment, graphics microcontroller 1638 can perform graphics and/or compute workload scheduling on various graphics parallel engines within execution unit (EU) arrays 1602A-1602F, 1604A-1604F within sub-cores 1601A-1601F. In at least one embodiment, host software executing on a CPU core of an SoC including graphics core 1600 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 1638 can also facilitate low-power or idle states for graphics core 1600, providing graphics core 1600 with an ability to save and restore registers within graphics core 1600 across low-power state transitions independently from an operating system and/or graphics driver software on a system.

In at least one embodiment, graphics core 1600 may have greater than or fewer than illustrated sub-cores 1601A-1601F, up to N modular sub-cores. For each set of N sub-cores, in at least one embodiment, graphics core 1600 can also include shared function logic 1610, shared and/or cache memory 1612, a geometry/fixed function pipeline 1614, as well as additional fixed function logic 1616 to accelerate various graphics and compute processing operations. In at least one embodiment, shared function logic 1610 can include logic units (e.g., sampler, math, and/or inter-thread communication logic) that can be shared by each N sub-cores within graphics core 1600. Shared and/or cache memory 1612 can be an LLC for N sub-cores 1601A-1601F within graphics core 1600 and can also serve as shared memory that is accessible by multiple sub-cores. In at least one embodiment, geometry/fixed function pipeline 1614 can be included instead of geometry/fixed function pipeline 1636 within fixed function block 1630 and can include same or similar logic units.

In at least one embodiment, graphics core 1600 includes additional fixed function logic 1616 that can include various fixed function acceleration logic for use by graphics core 1600. In at least one embodiment, additional fixed function logic 1616 includes an additional geometry pipeline for use in position only shading. In position-only shading, at least two geometry pipelines exist, whereas in a full geometry pipeline within geometry/fixed function pipeline 1616, 1636, and a cull pipeline, which is an additional geometry pipeline which may be included within additional fixed function logic 1616. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 1616 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 1616 can also include general purpose processing acceleration logic, such as fixed function matrix multiplication logic, for accelerating CUDA programs.

In at least one embodiment, each graphics sub-core 1601A-1601F includes a set of execution resources that may be used to perform graphics, media, and compute operations in response to requests by graphics pipeline, media pipeline, or shader programs. In at least one embodiment, graphics sub-cores 1601A-1601F include multiple EU arrays 1602A-1602F, 1604A-1604F, thread dispatch and inter-thread communication ("TD/IC") logic 1603A-1603F, a 3D (e.g., texture) sampler 1605A-1605F, a media sampler 1606A-1606F, a shader processor 1607A-1607F, and shared local memory ("SLM") 1608A-1608F. EU arrays 1602A-1602F, 1604A-1604F each include multiple execution units, which are GPGPUs capable of performing floating-point and integer/fixed-point logic operations in service of a graphics, media, or compute operation, including graphics, media, or compute shader programs. In at least one embodiment, TD/IC logic 1603A-1603F performs local thread dispatch and thread control operations for execution units within a sub-core and facilitate communication between threads executing on execution units of a sub-core. In at least one embodiment, 3D sampler 1605A-1605F can read texture or other 3D graphics related data into memory. In at least one embodiment, 3D sampler can read texture data differently based on a configured sample state and texture format associated with a given texture. In at least one embodiment, media sampler 1606A-1606F can perform similar read operations based on a type and format associated with media data. In at least one embodiment, each graphics sub-core 1601A-1601F can alternately include a unified 3D and media sampler. In at least one embodiment, threads executing on execution units within each of sub-cores 1601A-1601F can make use of shared local memory 1608A-1608F within each sub-core, to enable threads executing within a thread group to execute using a common pool of on-chip memory.

Figure 17:
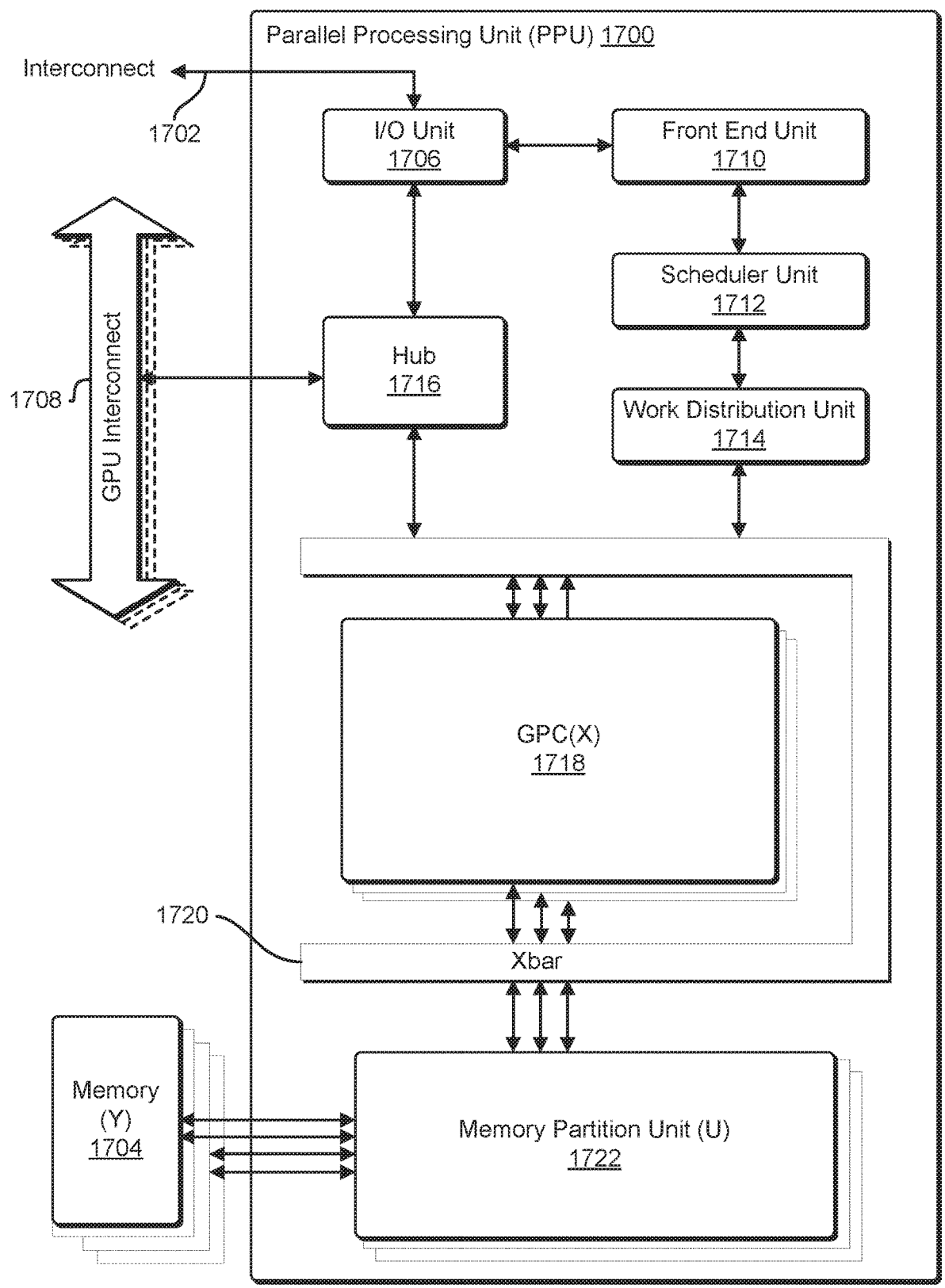
FIG. 17 illustrates a PPU, in accordance with at least one embodiment.

FIG. 17 illustrates a parallel processing unit ("PPU") 1700, in accordance with at least one embodiment. In at least one embodiment, PPU 1700 is configured with machine-readable code that, if executed by PPU 1700, causes PPU 1700 to perform some or all of processes and techniques described herein. In at least one embodiment, PPU 1700 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 1700. In at least one embodiment, PPU 1700 is a GPU configured to implement a graphics rendering pipeline for processing three-dimensional ("3D") graphics data in order to generate two-dimensional ("2D") image data for display on a display device such as an LCD device. In at least one embodiment, PPU 1700 is utilized to perform computations such as linear algebra operations and machine-learning operations. FIG. 17 illustrates an example parallel processor for illustrative purposes only and should be construed as a non-limiting example of a processor architecture that may be implemented in at least one embodiment.

In at least one embodiment, one or more PPUs 1700 are configured to accelerate High Performance Computing ("HPC"), data center, and machine learning applications. In at least one embodiment, one or more PPUs 1700 are configured to accelerate CUDA programs. In at least one embodiment, PPU 1700 includes, without limitation, an I/O unit 1706, a front-end unit 1710, a scheduler unit 1712, a work distribution unit 1714, a hub 1716, a crossbar ("Xbar") 1720, one or more general processing clusters ("GPCs") 1718, and one or more partition units ("memory partition units") 1722. In at least one embodiment, PPU 1700 is connected to a host processor or other PPUs 1700 via one or more high-speed GPU interconnects ("GPU interconnects") 1708. In at least one embodiment, PPU 1700 is connected to a host processor or other peripheral devices via an interconnect 1702. In at least one embodiment, PPU 1700 is connected to a local memory comprising one or more memory devices ("memory") 1704. In at least one embodiment, memory devices 1704 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 1708 may refer to a wire-based multi-lane communications link that is used by systems to scale and include one or more PPUs 1700 combined with one or more CPUs, supports cache coherence between PPUs 1700 and CPUs, and CPU mastering. In at least one embodiment, data and/or commands are transmitted by high-speed GPU interconnect 1708 through hub 1716 to/from other units of PPU 1700 such as one or more copy engines, video encoders, video decoders, power management units, and other components which may not be explicitly illustrated in FIG. 17.

In at least one embodiment, I/O unit 1706 is configured to transmit and receive communications (e.g., commands, data) from a host processor (not illustrated in FIG. 17) over system bus 1702. In at least one embodiment, I/O unit 1706 communicates with host processor directly via system bus 1702 or through one or more intermediate devices such as a memory bridge. In at least one embodiment, I/O unit 1706 may communicate with one or more other processors, such as one or more of PPUs 1700 via system bus 1702. In at least one embodiment, I/O unit 1706 implements a PCIe interface for communications over a PCIe bus. In at least one embodiment, I/O unit 1706 implements interfaces for communicating with external devices.

In at least one embodiment, I/O unit 1706 decodes packets received via system bus 1702. In at least one embodiment, at least some packets represent commands configured to cause PPU 1700 to perform various operations. In at least one embodiment, I/O unit 1706 transmits decoded commands to various other units of PPU 1700 as specified by commands. In at least one embodiment, commands are transmitted to front-end unit 1710 and/or transmitted to hub 1716 or other units of PPU 1700 such as one or more copy engines, a video encoder, a video decoder, a power management unit, etc. (not explicitly illustrated in FIG. 17). In at least one embodiment, I/O unit 1706 is configured to route communications between and among various logical units of PPU 1700.

In at least one embodiment, a program executed by host processor encodes a command stream in a buffer that provides workloads to PPU 1700 for processing. In at least one embodiment, a workload comprises instructions and data to be processed by those instructions. In at least one embodiment, buffer is a region in a memory that is accessible (e.g., read/write) by both a host processor and PPU 1700—a host interface unit may be configured to access buffer in a system memory connected to system bus 1702 via memory requests transmitted over system bus 1702 by I/O unit 1706. In at least one embodiment, a host processor writes a command stream to a buffer and then transmits a pointer to the start of the command stream to PPU 1700 such that front-end unit 1710 receives pointers to one or more command streams and manages one or more command streams, reading commands from command streams and forwarding commands to various units of PPU 1700.

In at least one embodiment, front-end unit 1710 is coupled to scheduler unit 1712 that configures various GPCs 1718 to process tasks defined by one or more command streams. In at least one embodiment, scheduler unit 1712 is configured to track state information related to various tasks managed by scheduler unit 1712 where state information may indicate which of GPCs 1718 a task is assigned to, whether task is active or inactive, a priority level associated with task, and so forth. In at least one embodiment, scheduler unit 1712 manages execution of a plurality of tasks on one or more of GPCs 1718.

In at least one embodiment, scheduler unit 1712 is coupled to work distribution unit 1714 that is configured to dispatch tasks for execution on GPCs 1718. In at least one embodiment, work distribution unit 1714 tracks a number of scheduled tasks received from scheduler unit 1712 and work distribution unit 1714 manages a pending task pool and an active task pool for each of GPCs 1718. In at least one embodiment, pending task pool comprises a number of slots (e.g., 32 slots) that contain tasks assigned to be processed by a particular GPC 1718; active task pool may comprise a number of slots (e.g., 4 slots) for tasks that are actively being processed by GPCs 1718 such that as one of GPCs 1718 completes execution of a task, that task is evicted from active task pool for GPC 1718 and one of other tasks from pending task pool is selected and scheduled for execution on GPC 1718. In at least one embodiment, if an active task is idle on GPC 1718, such as while waiting for a data dependency to be resolved, then the active task is evicted from GPC 1718 and returned to a pending task pool while another task in the pending task pool is selected and scheduled for execution on GPC 1718.

In at least one embodiment, work distribution unit 1714 communicates with one or more GPCs 1718 via XBar 1720. In at least one embodiment, XBar 1720 is an interconnect network that couples many units of PPU 1700 to other units of PPU 1700 and can be configured to couple work distribution unit 1714 to a particular GPC 1718. In at least one embodiment, one or more other units of PPU 1700 may also be connected to XBar 1720 via hub 1716.

In at least one embodiment, tasks are managed by scheduler unit 1712 and dispatched to one of GPCs 1718 by work distribution unit 1714. GPC 1718 is configured to process task and generate results. In at least one embodiment, results may be consumed by other tasks within GPC 1718, routed to a different GPC 1718 via XBar 1720, or stored in memory 1704. In at least one embodiment, results can be written to memory 1704 via partition units 1722, which implement a memory interface for reading and writing data to/from memory 1704. In at least one embodiment, results can be transmitted to another PPU 1704 or CPU via high-speed GPU interconnect 1708. In at least one embodiment, PPU 1700 includes, without limitation, a number U of partition units 1722 that is equal to number of separate and distinct memory devices 1704 coupled to PPU 1700.

In at least one embodiment, a host processor executes a driver kernel that implements an application programming interface ("API") that enables one or more applications executing on host processor to schedule operations for execution on PPU 1700. In at least one embodiment, multiple compute applications are simultaneously executed by PPU 1700 and PPU 1700 provides isolation, quality of service ("QoS"), and independent address spaces for multiple compute applications. In at least one embodiment, an application generates instructions (e.g., in the form of API calls) that cause a driver kernel to generate one or more tasks for execution by PPU 1700 and the driver kernel outputs tasks to one or more streams being processed by PPU 1700. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 18:
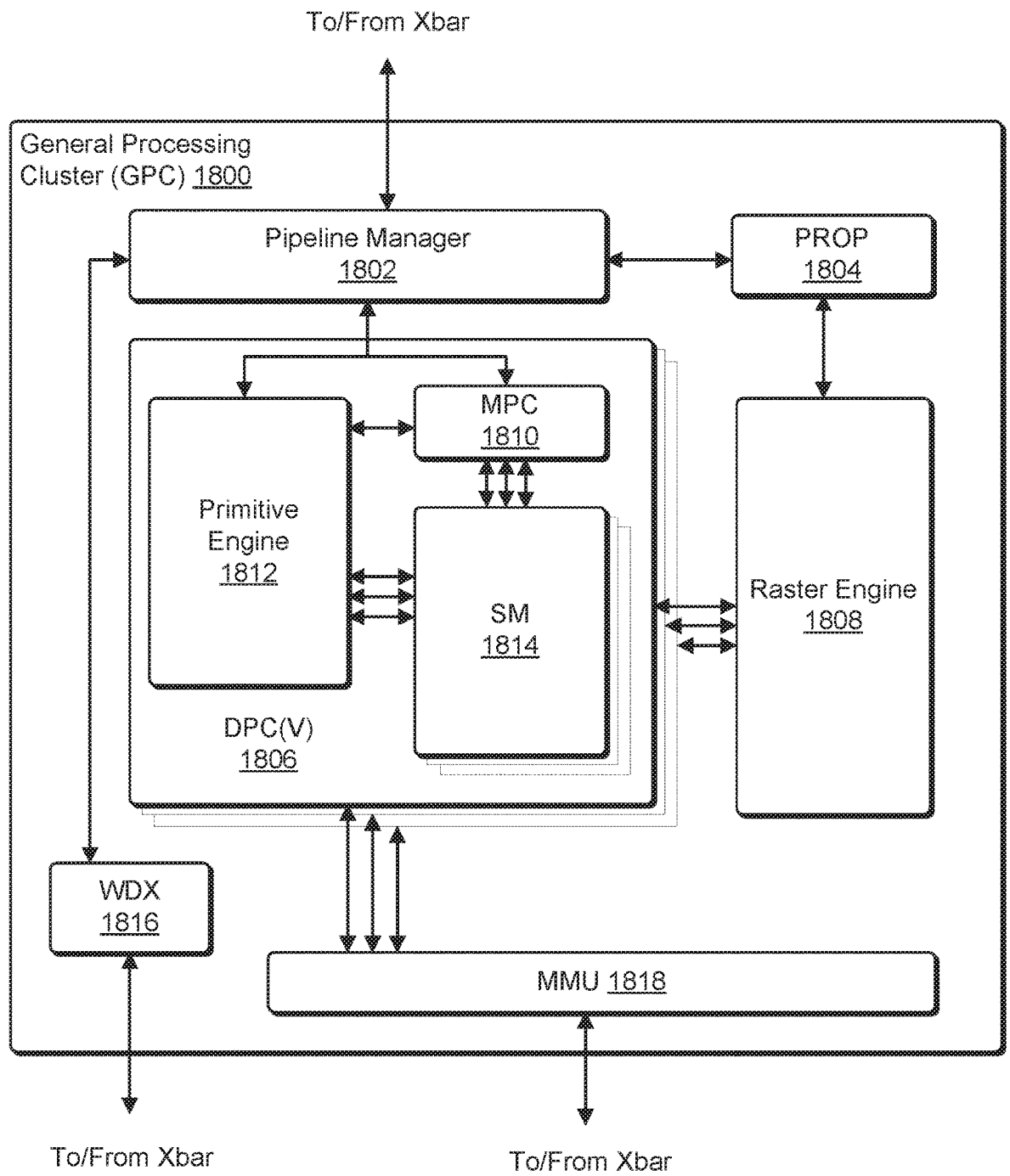
FIG. 18 illustrates a GPC, in accordance with at least one embodiment.

FIG. 18 illustrates a GPC 1800, in accordance with at least one embodiment. In at least one embodiment, GPC 1800 is GPC 1718 of FIG. 17. In at least one embodiment, each GPC 1800 includes, without limitation, a number of hardware units for processing tasks and each GPC 1800 includes, without limitation, a pipeline manager 1802, a pre-raster operations unit ("PROP") 1804, a raster engine 1808, a work distribution crossbar ("WDX") 1816, an MMU 1818, one or more Data Processing Clusters ("DPCs") 1806, and any suitable combination of parts.

In at least one embodiment, operation of GPC 1800 is controlled by pipeline manager 1802. In at least one embodiment, pipeline manager 1802 manages configuration of one or more DPCs 1806 for processing tasks allocated to GPC 1800. In at least one embodiment, pipeline manager 1802 configures at least one of one or more DPCs 1806 to implement at least a portion of a graphics rendering pipeline. In at least one embodiment, DPC 1806 is configured to execute a vertex shader program on a programmable streaming multiprocessor ("SM") 1814. In at least one embodiment, pipeline manager 1802 is configured to route packets received from a work distribution unit to appropriate logical units within GPC 1800 and, in at least one embodiment, some packets may be routed to fixed function hardware units in PROP 1804 and/or raster engine 1808 while other packets may be routed to DPCs 1806 for processing by a primitive engine 1812 or SM 1814. In at least one embodiment, pipeline manager 1802 configures at least one of DPCs 1806 to implement a computing pipeline. In at least one embodiment, pipeline manager 1802 configures at least one of DPCs 1806 to execute at least a portion of a CUDA program.

In at least one embodiment, PROP unit 1804 is configured to route data generated by raster engine 1808 and DPCs 1806 to a Raster Operations ("ROP") unit in a partition unit, such as memory partition unit 1722 described in more detail above in conjunction with FIG. 17. In at least one embodiment, PROP unit 1804 is configured to perform optimizations for color blending, organize pixel data, perform address translations, and more. In at least one embodiment, raster engine 1808 includes, without limitation, a number of fixed function hardware units configured to perform various raster operations and, in at least one embodiment, raster engine 1808 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 1808 comprises fragments to be processed by any suitable entity such as by a fragment shader implemented within DPC 1806.

In at least one embodiment, each DPC 1806 included in GPC 1800 comprise, without limitation, an M-Pipe Controller ("MPC") 1810; primitive engine 1812; one or more SMs 1814; and any suitable combination thereof. In at least one embodiment, MPC 1810 controls operation of DPC 1806, routing packets received from pipeline manager 1802 to appropriate units in DPC 1806. In at least one embodiment, packets associated with a vertex are routed to primitive engine 1812, which is configured to fetch vertex attributes associated with vertex from memory; in contrast, packets associated with a shader program may be transmitted to SM 1814.

In at least one embodiment, SM 1814 comprises, without limitation, a programmable streaming processor that is configured to process tasks represented by a number of threads. In at least one embodiment, SM 1814 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 1814 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 1814 is described in more detail in conjunction with FIG. 19.

In at least one embodiment, MMU 1818 provides an interface between GPC 1800 and a memory partition unit (e.g., partition unit 1722 of FIG. 17) and MMU 1818 provides translation of virtual addresses into physical addresses, memory protection, and arbitration of memory requests. In at least one embodiment, MMU 1818 provides one or more translation lookaside buffers (TLBs) for performing translation of virtual addresses into physical addresses in memory.

Figure 19:
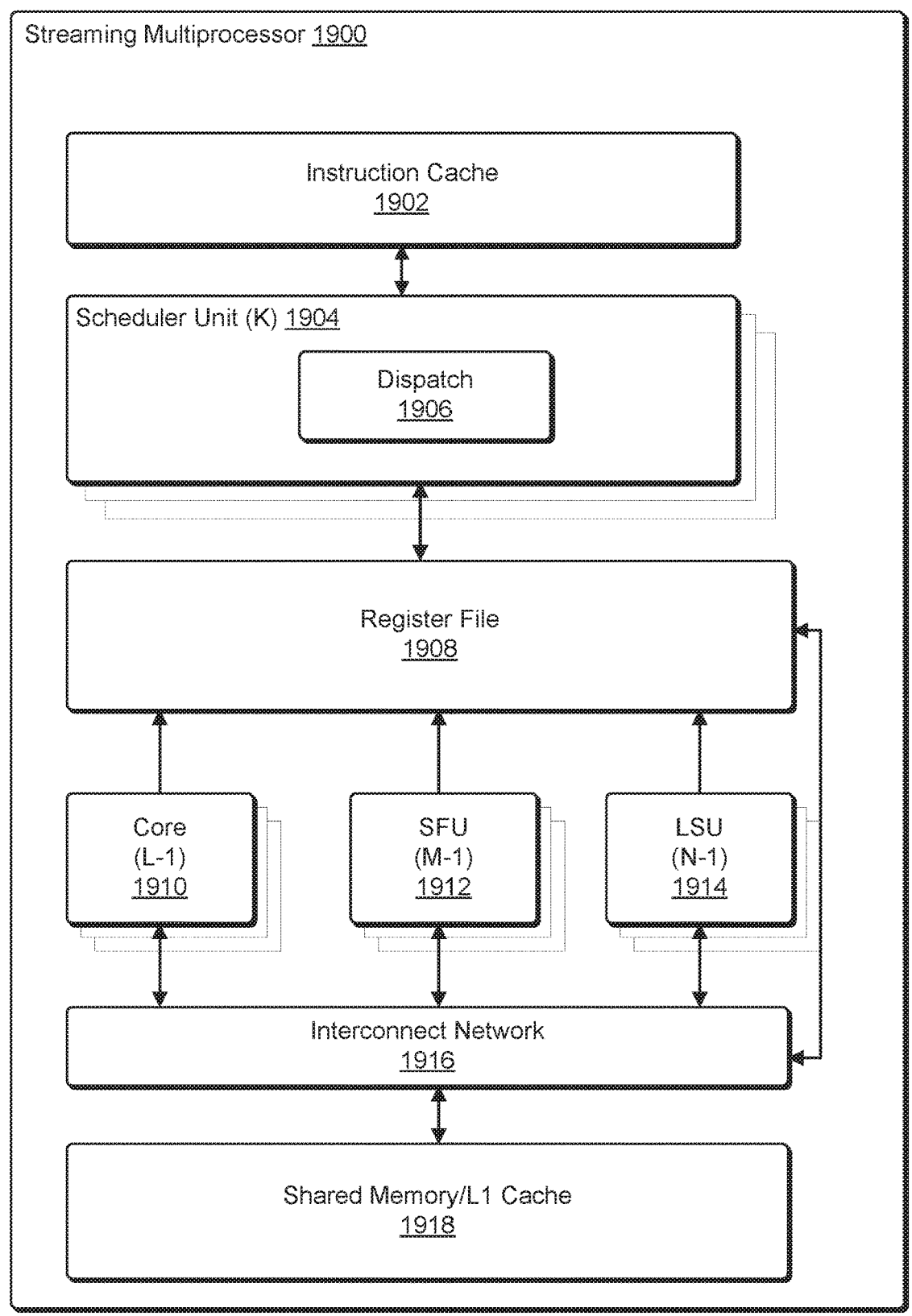
FIG. 19 illustrates a streaming multiprocessor, in accordance with at least one embodiment.

FIG. 19 illustrates a streaming multiprocessor ("SM") 1900, in accordance with at least one embodiment. In at least one embodiment, SM 1900 is SM 1814 of FIG. 18. In at least one embodiment, SM 1900 includes, without limitation, an instruction cache 1902; one or more scheduler units 1904; a register file 1908; one or more processing cores ("cores") 1910; one or more special function units ("SFUs") 1912; one or more LSUs 1914; an interconnect network 1916; a shared memory/L1 cache 1918; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 1900. In at least one embodiment, scheduler unit 1904 receives tasks from a work distribution unit and manages instruction scheduling for one or more thread blocks assigned to SM 1900. In at least one embodiment, scheduler unit 1904 schedules thread blocks for execution as warps of parallel threads, wherein each thread block is allocated at least one warp. In at least one embodiment, each warp executes threads. In at least one embodiment, scheduler unit 1904 manages a plurality of different thread blocks, allocating warps to different thread blocks and then dispatching instructions from a plurality of different cooperative groups to various functional units (e.g., processing cores 1910, SFUs 1912, and LSUs 1914) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at subblock and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 1906 is configured to transmit instructions to one or more of functional units and scheduler unit 1904 includes, without limitation, two dispatch units 1906 that enable two different instructions from same warp to be dispatched during each clock cycle. In at least one embodiment, each scheduler unit 1904 includes a single dispatch unit 1906 or additional dispatch units 1906.

In at least one embodiment, each SM 1900, in at least one embodiment, includes, without limitation, register file 1908 that provides a set of registers for functional units of SM 1900. In at least one embodiment, register file 1908 is divided between each of the functional units such that each functional unit is allocated a dedicated portion of register file 1908. In at least one embodiment, register file 1908 is divided between different warps being executed by SM 1900 and register file 1908 provides temporary storage for operands connected to data paths of functional units. In at least one embodiment, each SM 1900 comprises, without limitation, a plurality of L processing cores 1910. In at least one embodiment, SM 1900 includes, without limitation, a large number (e.g., 128 or more) of distinct processing cores 1910. In at least one embodiment, each processing core 1910 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 1910 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 1910. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point a19ition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 1900 comprises, without limitation, M SFUs 1912 that perform special functions (e.g., attribute evaluation, reciprocal square root, and like). In at least one embodiment, SFUs 1912 include, without limitation, a tree traversal unit configured to traverse a hierarchical tree data structure. In at least one embodiment, SFUs 1912 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 1900. In at least one embodiment, texture maps are stored in shared memory/L1 cache 1918. In at least one embodiment, texture units implement texture operations such as filtering operations using mip-maps (e.g., texture maps of varying levels of detail). In at least one embodiment, each SM 1900 includes, without limitation, two texture units.

In at least one embodiment, each SM 1900 comprises, without limitation, N LSUs 1914 that implement load and store operations between shared memory/L1 cache 1918 and register file 1908. In at least one embodiment, each SM 1900 includes, without limitation, interconnect network 1916 that connects each of the functional units to register file 1908 and LSU 1914 to register file 1908 and shared memory/L1 cache 1918. In at least one embodiment, interconnect network 1916 is a crossbar that can be configured to connect any of the functional units to any of the registers in register file 1908 and connect LSUs 1914 to register file 1908 and memory locations in shared memory/L1 cache 1918.

In at least one embodiment, shared memory/L1 cache 1918 is an array of on-chip memory that allows for data storage and communication between SM 1900 and a primitive engine and between threads in SM 1900. In at least one embodiment, shared memory/L1 cache 1918 comprises, without limitation, 128 KB of storage capacity and is in a path from SM 1900 to a partition unit. In at least one embodiment, shared memory/L1 cache 1918 is used to cache reads and writes. In at least one embodiment, one or more of shared memory/L1 cache 1918, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 1918 enables shared memory/L1 cache 1918 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 1900 to execute a program and perform calculations, shared memory/L1 cache 1918 to communicate between threads, and LSU 1914 to read and write global memory through shared memory/L1 cache 1918 and a memory partition unit. In at least one embodiment, when configured for general purpose parallel computation, SM 1900 writes commands that scheduler unit 1904 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructions for General-Purpose Computing

The following figures set forth, without limitation, exemplary software constructs for implementing at least one embodiment.

Figure 20:
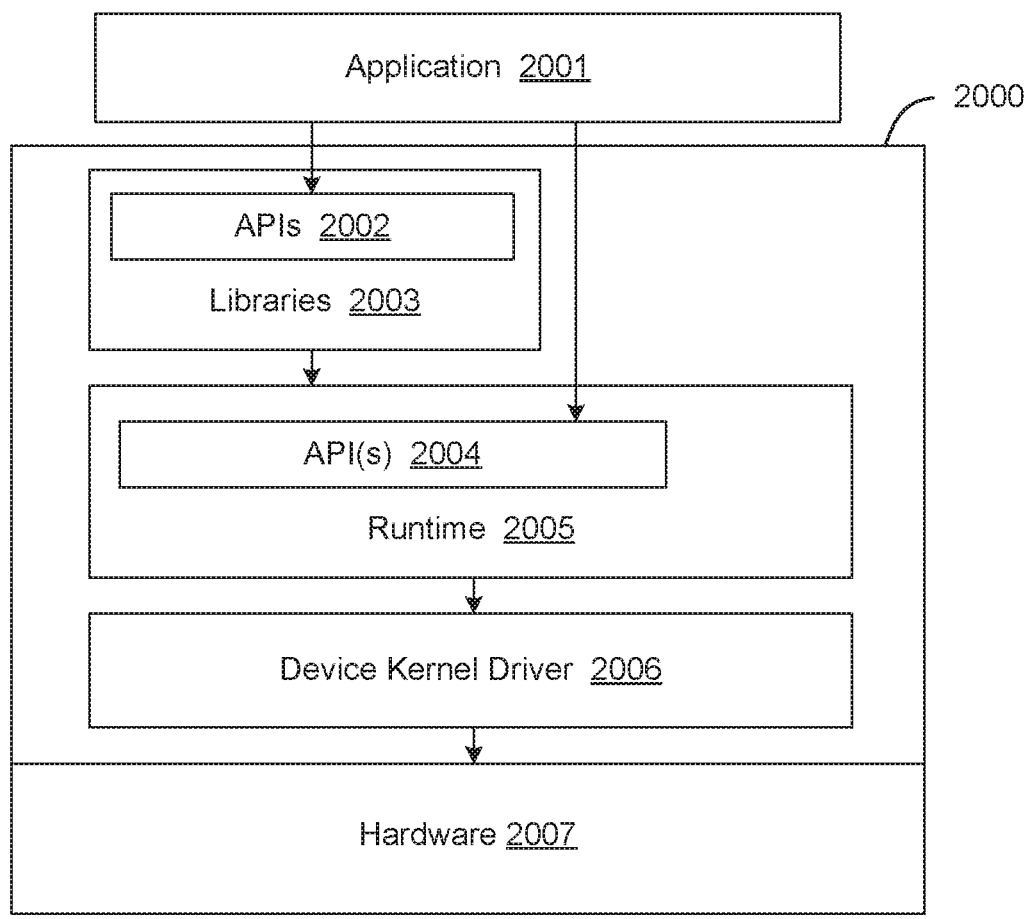
FIG. 20 illustrates a software stack of a programming platform, in accordance with at least one embodiment.

FIG. 20 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 2000 of a programming platform provides an execution environment for an application 2001. In at least one embodiment, application 2001 may include any computer software capable of being launched on software stack 2000. In at least one embodiment, application 2001 may include, but is not limited to, an artificial intelligence ("AI")/machine learning ("ML") application, a high performance computing ("HPC") application, a virtual desktop infrastructure ("VDI"), or a data center workload.

In at least one embodiment, application 2001 and software stack 2000 run on hardware 2007. Hardware 2007 may include one or more GPUs, CPUs, FPGAs, AI engines, and/or other types of compute devices that support a programming platform, in at least one embodiment. In at least one embodiment, such as with CUDA, software stack 2000 may be vendor specific and compatible with only devices from particular vendor(s). In at least one embodiment, such as in with OpenCL, software stack 2000 may be used with devices from different vendors. In at least one embodiment, hardware 2007 includes a host connected to one more devices that can be accessed to perform computational tasks via application programming interface ("API") calls. A device within hardware 2007 may include, but is not limited to, a GPU, FPGA, AI engine, or other compute device (but may also include a CPU) and its memory, as opposed to a host within hardware 2007 that may include, but is not limited to, a CPU (but may also include a compute device) and its memory, in at least one embodiment.

In at least one embodiment, software stack 2000 of a programming platform includes, without limitation, a number of libraries 2003, a runtime 2005, and a device kernel driver 2006. Each of libraries 2003 may include data and programming code that can be used by computer programs and leveraged during software development, in at least one embodiment. In at least one embodiment, libraries 2003 may include, but are not limited to, pre-written code and subroutines, classes, values, type specifications, configuration data, documentation, help data, and/or message templates. In at least one embodiment, libraries 2003 include functions that are optimized for execution on one or more types of devices. In at least one embodiment, libraries 2003 may include, but are not limited to, functions for performing mathematical, deep learning, and/or other types of operations on devices. In at least one embodiment, libraries 2103 are associated with corresponding APIs 2102, which may include one or more APIs, that expose functions implemented in libraries 2103.

In at least one embodiment, application 2001 is written as source code that is compiled into executable code, as discussed in greater detail below in conjunction with FIGS. 25-27. Executable code of application 2001 may run, at least in part, on an execution environment provided by software stack 2000, in at least one embodiment. In at least one embodiment, during execution of application 2001, code may be reached that needs to run on a device, as opposed to a host. In such a case, runtime 2005 may be called to load and launch requisite code on the device, in at least one embodiment. In at least one embodiment, runtime 2005 may include any technically feasible runtime system that is able to support execution of application S01.

In at least one embodiment, runtime 2005 is implemented as one or more runtime libraries associated with corresponding APIs, which are shown as API(s) 2004. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 2004 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 2006 is configured to facilitate communication with an underlying device. In at least one embodiment, device kernel driver 2006 may provide low-level functionalities upon which APIs, such as API(s) 2004, and/or other software relies. In at least one embodiment, device kernel driver 2006 may be configured to compile intermediate representation ("IR") code into binary code at runtime. For CUDA, device kernel driver 2006 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 2006 to compile IR code at runtime.

Figure 21:
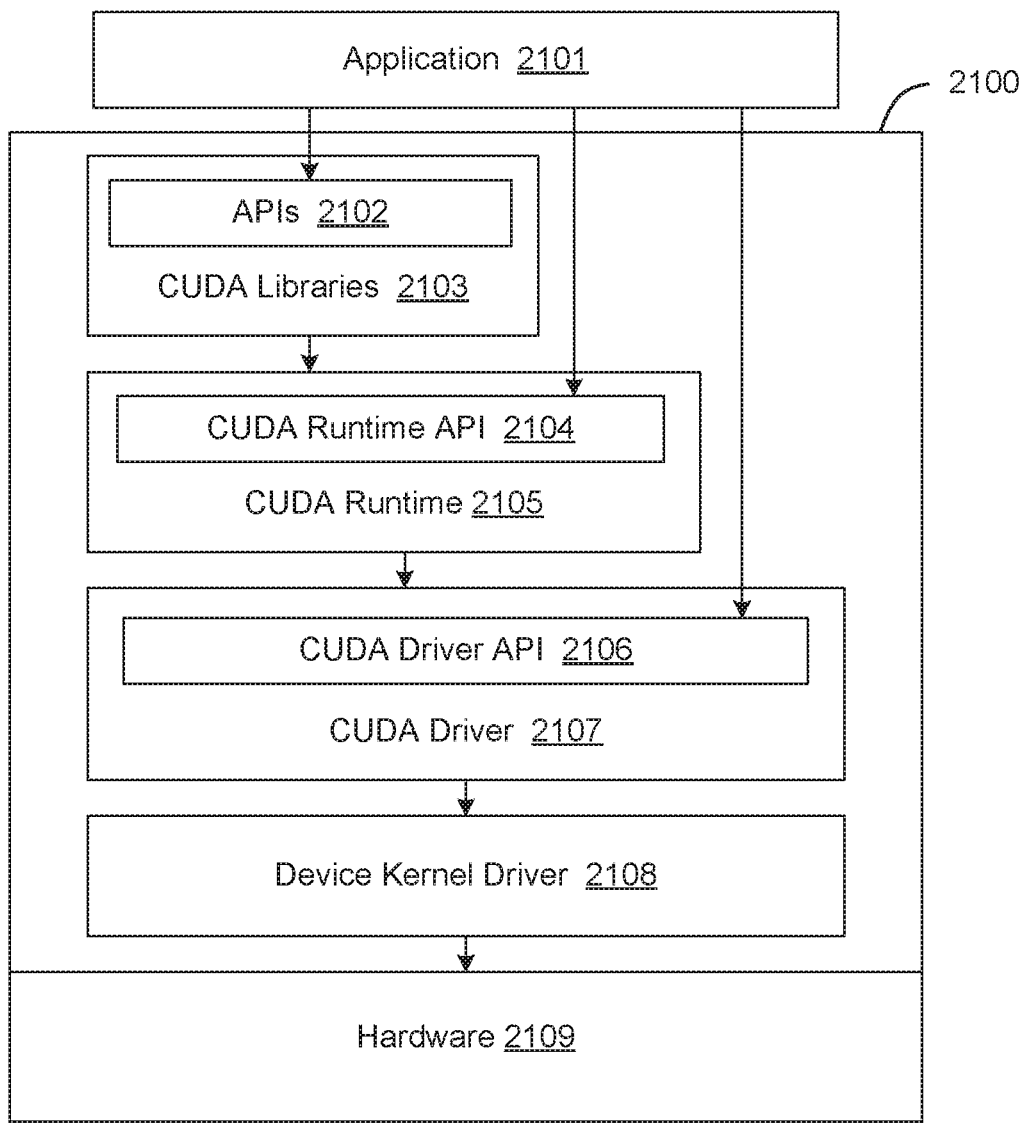
FIG. 21 illustrates a CUDA implementation of a software stack of Figure STACK A, in accordance with at least one embodiment.

FIG. 21 illustrates a CUDA implementation of software stack 2000 of FIG. 20, in accordance with at least one embodiment. In at least one embodiment, a CUDA software stack 2100, on which an application 2101 may be launched, includes CUDA libraries 2103, a CUDA runtime 2105, a CUDA driver 2107, and a device kernel driver 2108. In at least one embodiment, CUDA software stack 2100 executes on hardware 2109, which may include a GPU that supports CUDA and is developed by NVIDIA Corporation of Santa Clara, CA.

In at least one embodiment, application 2101, CUDA runtime 2105, and device kernel driver 2108 may perform similar functionalities as application 2001, runtime 2005, and device kernel driver 2006, respectively, which are described above in conjunction with FIG. 20. In at least one embodiment, CUDA driver 2107 includes a library (libcuda.so) that implements a CUDA driver API 2106. Similar to a CUDA runtime API 2104 implemented by a CUDA runtime library (cudart), CUDA driver API 2106 may, without limitation, expose functions for memory management, execution control, device management, error handling, synchronization, and/or graphics interoperability, among other things, in at least one embodiment. In at least one embodiment, CUDA driver API 2106 differs from CUDA runtime API 2104 in that CUDA runtime API 2104 simplifies device code management by providing implicit initialization, context (analogous to a process) management, and module (analogous to dynamically loaded libraries) management. In contrast to high-level CUDA runtime API 2104, CUDA driver API 2106 is a low-level API providing more fine-grained control of the device, particularly with respect to contexts and module loading, in at least one embodiment. In at least one embodiment, CUDA driver API 2106 may expose functions for context management that are not exposed by CUDA runtime API 2104. In at least one embodiment, CUDA driver API 2106 is also language-independent and supports, e.g., OpenCL in addition to CUDA runtime API 2104. Further, in at least one embodiment, development libraries, including CUDA runtime 2105, may be considered as separate from driver components, including user-mode CUDA driver 2107 and kernel-mode device driver 2108 (also sometimes referred to as a "display" driver).

In at least one embodiment, CUDA libraries 2103 may include, but are not limited to, mathematical libraries, deep learning libraries, parallel algorithm libraries, and/or signal/image/video processing libraries, which parallel computing applications such as application 2101 may utilize. In at least one embodiment, CUDA libraries 2103 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 2103 may include deep learning libraries such as a cuDNN library of primitives for deep neural networks and a TensorRT platform for high-performance deep learning inference, among others.

Figure 22:
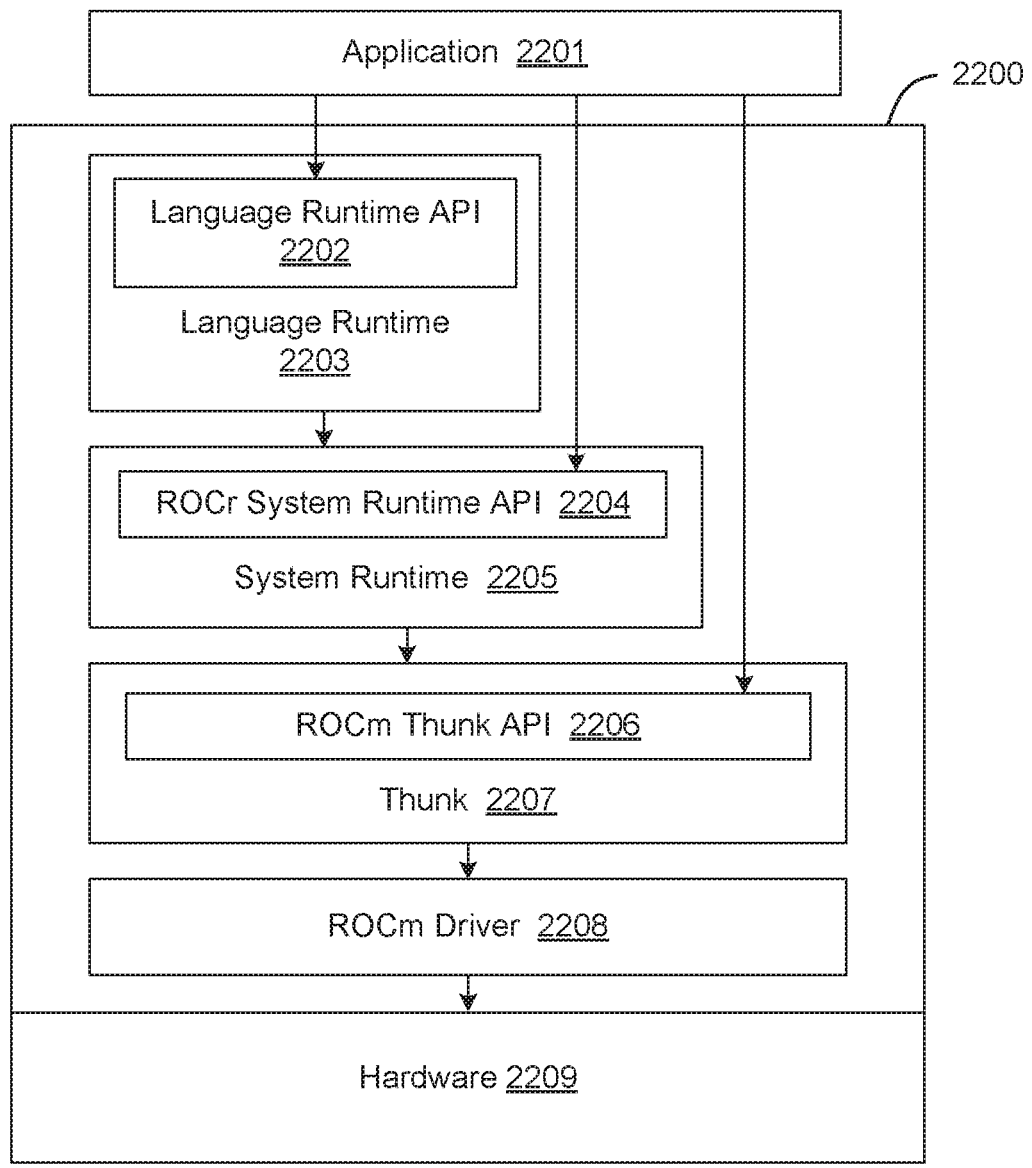
FIG. 22 illustrates a ROCm implementation of a software stack of Figure STACK A, in accordance with at least one embodiment.

FIG. 22 illustrates a ROCm implementation of software stack 2000 of FIG. 20, in accordance with at least one embodiment. In at least one embodiment, a ROCm software stack 2200, on which an application 2201 may be launched, includes a language runtime 2203, a system runtime 2205, a thunk 2207, a ROCm kernel driver 2208, and a device kernel driver 2209. In at least one embodiment, ROCm software stack 2200 executes on hardware 2210, which may include a GPU that supports ROCm and is developed by AMD Corporation of Santa Clara, CA.

In at least one embodiment, application 2201 may perform similar functionalities as application 2001 discussed above in conjunction with FIG. 20. In addition, language runtime 2203 and system runtime 2205 may perform similar functionalities as runtime 2005 discussed above in conjunction with FIG. 20, in at least one embodiment. In at least one embodiment, language runtime 2203 and system runtime 2205 differ in that system runtime 2205 is a language-independent runtime that implements a ROCr system runtime API 2204 and makes use of a Heterogeneous System Architecture ("HAS") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 2205, language runtime 2203 is an implementation of a language-specific runtime API 2202 layered on top of ROCr system runtime API 2204, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 2104 discussed above in conjunction with FIG. 21, such as functions for memory management, execution control, device management, error handling, and synchronization, among other things.

In at least one embodiment, thunk (ROCt) 2207 is an interface that can be used to interact with underlying ROCm driver 2208. In at least one embodiment, ROCm driver 2208 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 2006 discussed above in conjunction with FIG. 20. In at least one embodiment, HSA kernel driver is a driver permitting different types of processors to share system resources more effectively via hardware features.

In at least one embodiment, various libraries (not shown) may be included in ROCm software stack 2200 above language runtime 2203 and provide functionality similarity to CUDA libraries 2103, discussed above in conjunction with FIG. 21. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 23:
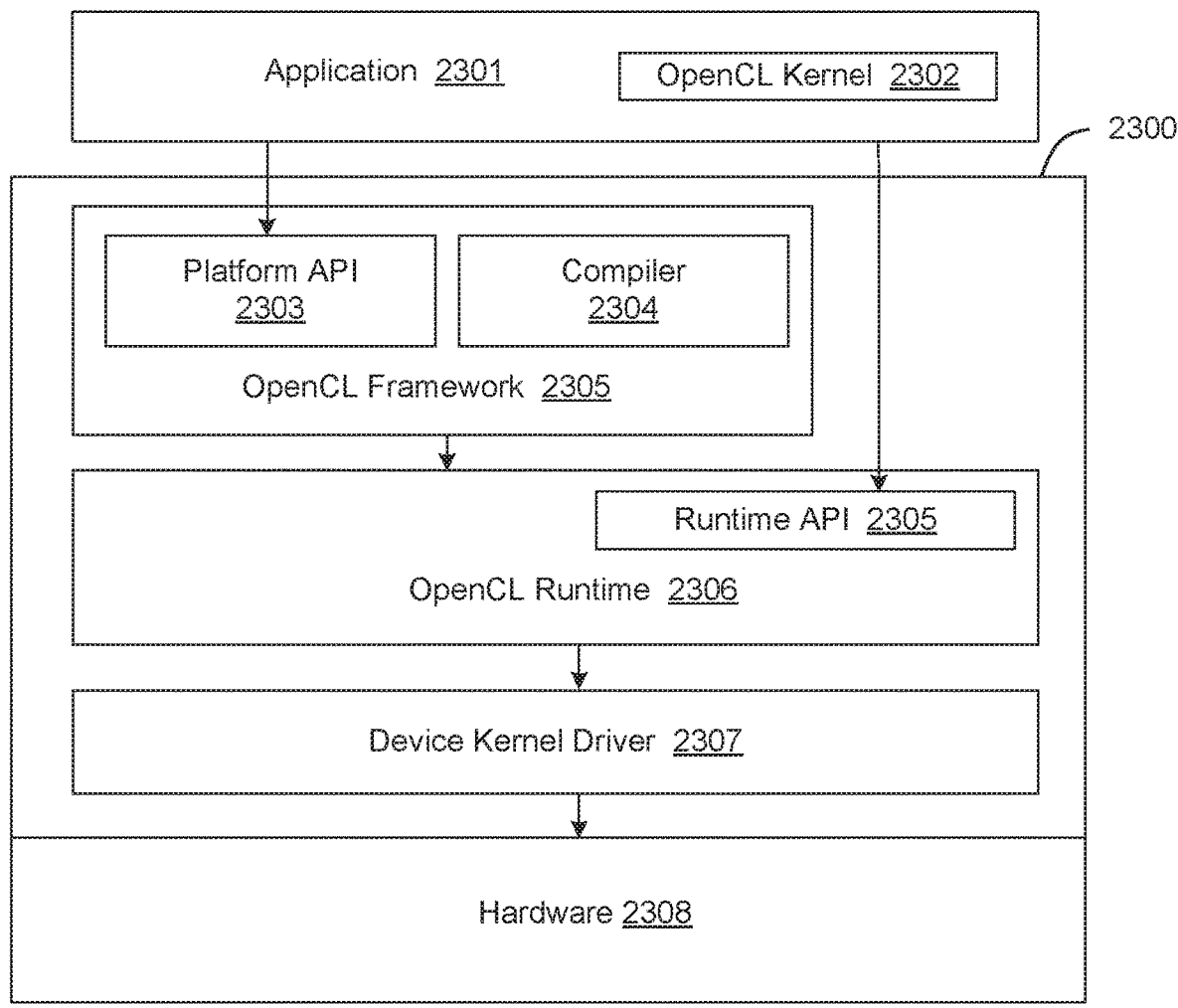
FIG. 23 illustrates an OpenCL implementation of a software stack of Figure STACK A, in accordance with at least one embodiment.

FIG. 23 illustrates an OpenCL implementation of software stack 2000 of Figure STACK A, in accordance with at least one embodiment. In at least one embodiment, an OpenCL software stack 2300, on which an application 2301 may be launched, includes an OpenCL framework 2305, an OpenCL runtime 2306, and a driver 2307. In at least one embodiment, OpenCL software stack 2300 executes on hardware 2109 that is not vendor-specific. As OpenCL is supported by devices developed by different vendors, specific OpenCL drivers may be required to interoperate with hardware from such vendors, in at least one embodiment.

In at least one embodiment, application 2301, OpenCL runtime 2306, device kernel driver 2307, and hardware 2308 may perform similar functionalities as application 2001, runtime 2005, device kernel driver 2006, and hardware 2007, respectively, that are discussed above in conjunction with FIG. 20. In at least one embodiment, application 2301 further includes an OpenCL kernel 2302 with code that is to be executed on a device.

In at least one embodiment, OpenCL defines a "platform" that allows a host to control devices connected to the host. In at least one embodiment, an OpenCL framework provides a platform layer API and a runtime API, shown as platform API 2303 and runtime API 2305. In at least one embodiment, runtime API 2305 uses contexts to manage execution of kernels on devices. In at least one embodiment, each identified device may be associated with a respective context, which runtime API 2305 may use to manage command queues, program objects, and kernel objects, share memory objects, among other things, for that device. In at least one embodiment, platform API 2303 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 2304 is also included in OpenCL framework 2305. Source code may be compiled offline prior to executing an application or online during execution of an application, in at least one embodiment. In contrast to CUDA and ROCm, OpenCL applications in at least one embodiment may be compiled online by compiler 2304, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 24:
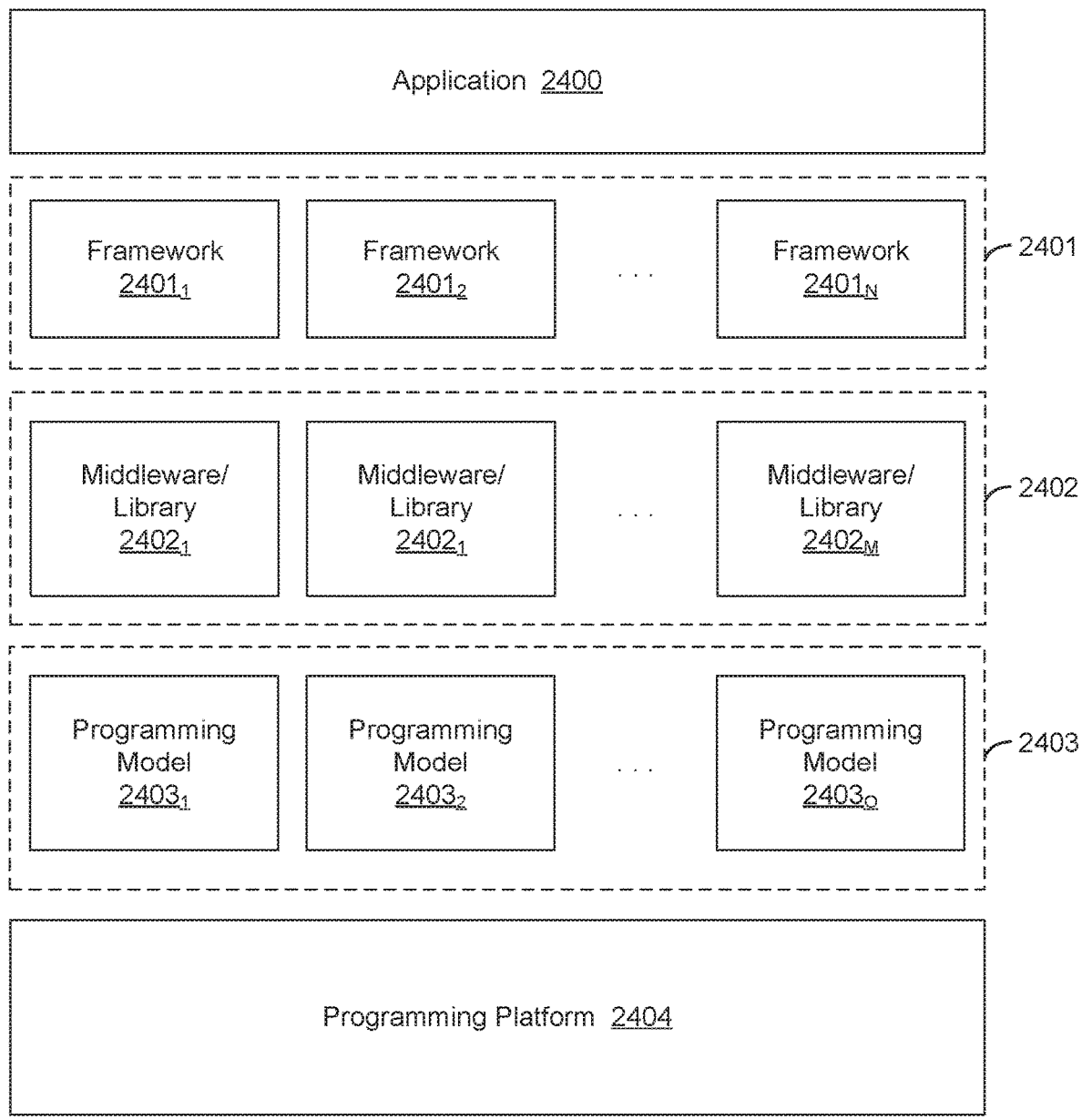
FIG. 24 illustrates software that is supported by a programming platform, in accordance with at least one embodiment.

FIG. 24 illustrates software that is supported by a programming platform, in accordance with at least one embodiment. In at least one embodiment, a programming platform 2404 is configured to support various programming models 2403, middlewares and/or libraries 2402, and frameworks 2401 that an application 2400 may rely upon. In at least one embodiment, application 2400 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 2404 may be one of a CUDA, ROCm, or OpenCL platform described above in conjunction with FIG. 21, FIG. 22, and FIG. 23, respectively. In at least one embodiment, programming platform 2404 supports multiple programming models 2403, which are abstractions of an underlying computing system permitting expressions of algorithms and data structures. Programming models 2403 may expose features of underlying hardware in order to improve performance, in at least one embodiment. In at least one embodiment, programming models 2403 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 2402 provide implementations of abstractions of programming models 2404. In at least one embodiment, such libraries include data and programming code that may be used by computer programs and leveraged during software development. In at least one embodiment, such middlewares include software that provides services to applications beyond those available from programming platform 2404. In at least one embodiment, libraries and/or middlewares 2402 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 2402 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 2401 depend on libraries and/or middlewares 2402. In at least one embodiment, each of application frameworks 2401 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 25:
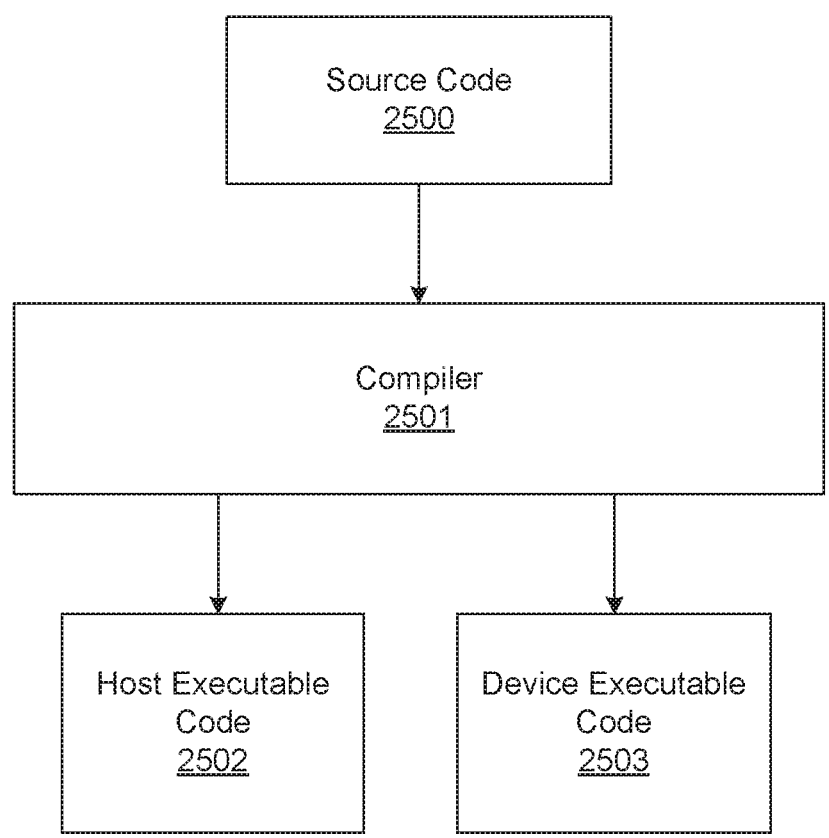
FIG. 25 illustrates compiling code to execute on programming platforms of FIGS. 20-23, in accordance with at least one embodiment.

FIG. 25 illustrates compiling code to execute on one of programming platforms of FIGS. 20-23, in accordance with at least one embodiment. In at least one embodiment, a compiler 2501 receives source code 2500 that includes both host code as well as device code. In at least one embodiment, complier 2501 is configured to convert source code 2500 into host executable code 2502 for execution on a host and device executable code 2503 for execution on a device. In at least one embodiment, source code 2500 may either be compiled offline prior to execution of an application, or online during execution of an application.

In at least one embodiment, source code 2500 may include code in any programming language supported by compiler 2501, such as C++, C, Fortran, etc. In at least one embodiment, source code 2500 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 2500 may include multiple source code files, rather than a single-source file, into which host code and device code are separated.

In at least one embodiment, compiler 2501 is configured to compile source code 2500 into host executable code 2502 for execution on a host and device executable code 2503 for execution on a device. In at least one embodiment, compiler 2501 performs operations including parsing source code 2500 into an abstract system tree (AST), performing optimizations, and generating executable code. In at least one embodiment in which source code 2500 includes a single-source file, compiler 2501 may separate device code from host code in such a single-source file, compile device code and host code into device executable code 2503 and host executable code 2502, respectively, and link device executable code 2503 and host executable code 2502 together in a single file, as discussed in greater detail below with respect to FIG. 26.

In at least one embodiment, host executable code 2502 and device executable code 2503 may be in any suitable format, such as binary code and/or IR code. In the case of CUDA, host executable code 2502 may include native object code and device executable code 2503 may include code in PTX intermediate representation, in at least one embodiment. In the case of ROCm, both host executable code 2502 and device executable code 2503 may include target binary code, in at least one embodiment.

Figure 26:
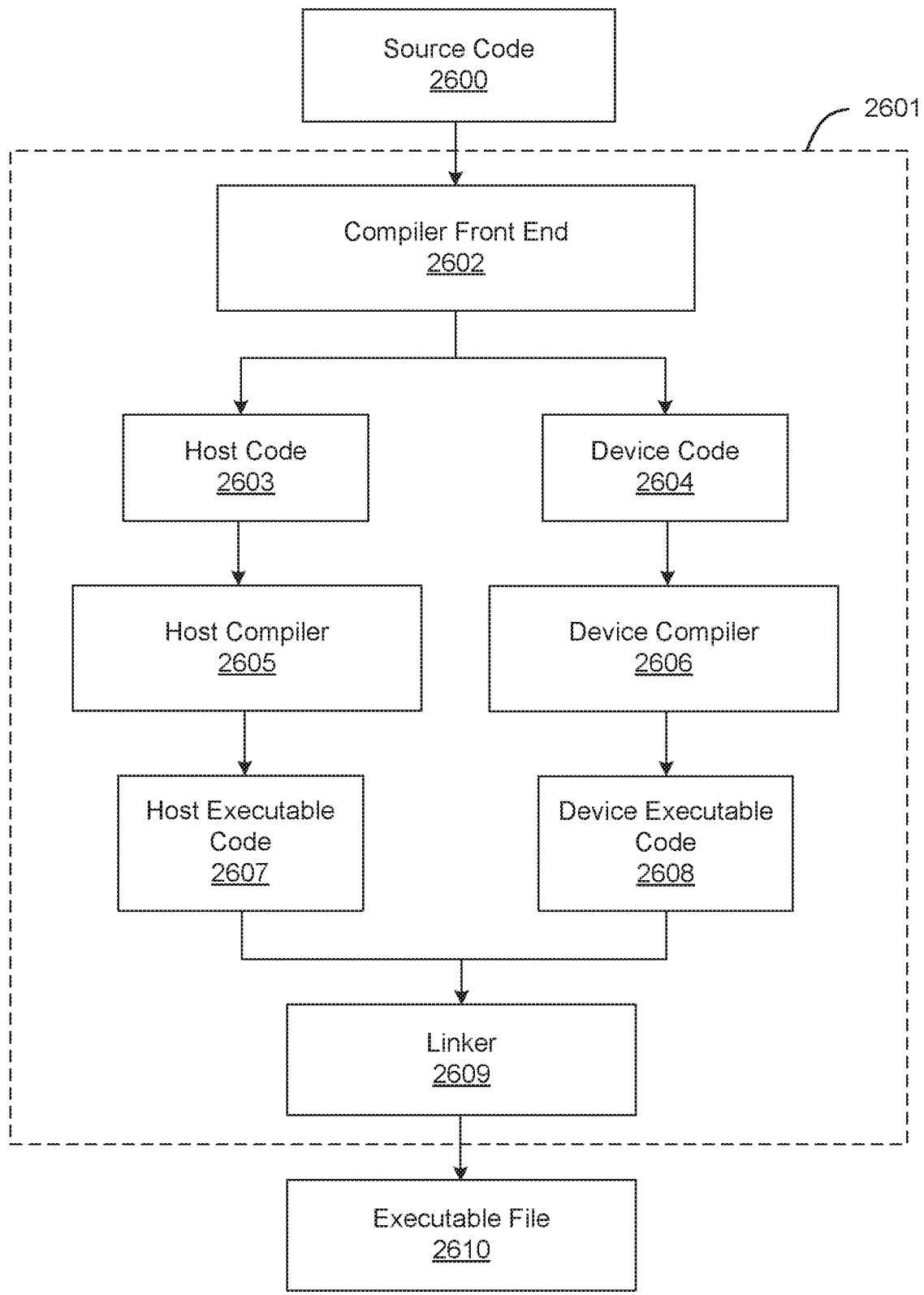
FIG. 26 illustrates in greater detail compiling code to execute on programming platforms of FIGS. 20-23, in accordance with at least one embodiment.

FIG. 26 is a more detailed illustration of compiling code to execute on one of programming platforms of FIGS. 20-23, in accordance with at least one embodiment. In at least one embodiment, a compiler 2601 is configured to receive source code 2600, compile source code 2600, and output an executable file 2608. In at least one embodiment, source code 2600 is a single-source file, such as a .cu file, a .hip.cpp file, or a file in another format, that includes both host and device code. In at least one embodiment, compiler 2601 may be, but is not limited to, an NVIDIA CUDA compiler ("NVCC") for compiling CUDA code in .cu files, or a HCC compiler for compiling HIP code in .hip.cpp files.

In at least one embodiment, compiler 2601 includes a compiler front end 2602, a host compiler 2605, a device compiler 2606, and a linker 2609. In at least one embodiment, compiler front end 2602 is configured to separate device code 2604 from host code 2603 in source code 2600. Device code 2604 is compiled by device compiler 2606 into device executable code 2608, which as described may include binary code or IR code, in at least one embodiment. Separately, host code 2603 is compiled by host compiler 2605 into host executable code 2607, in at least one embodiment. For NVCC, host compiler 2605 may be, but is not limited to, a general purpose C/C++ compiler that outputs native object code, while device compiler 2606 may be, but is not limited to, a Low Level Virtual Machine ("LLVM")-based compiler that forks a LLVM compiler infrastructure and outputs PTX code or binary code, in at least one embodiment. For HCC, both host compiler 2605 and device compiler 2606 may be, but are not limited to, LLVM-based compilers that output target binary code, in at least one embodiment.

Subsequent to compiling source code 2600 into host executable code 2607 and device executable code 2608, linker 2609 links host and device executable code 2607 and 2608 together in executable file 2610, in at least one embodiment. In at least one embodiment, native object code for a host and PTX or binary code for a device may be linked together in an Executable and Linkable Format ("ELF") file, which is a container format used to store object code.

Figure 27:
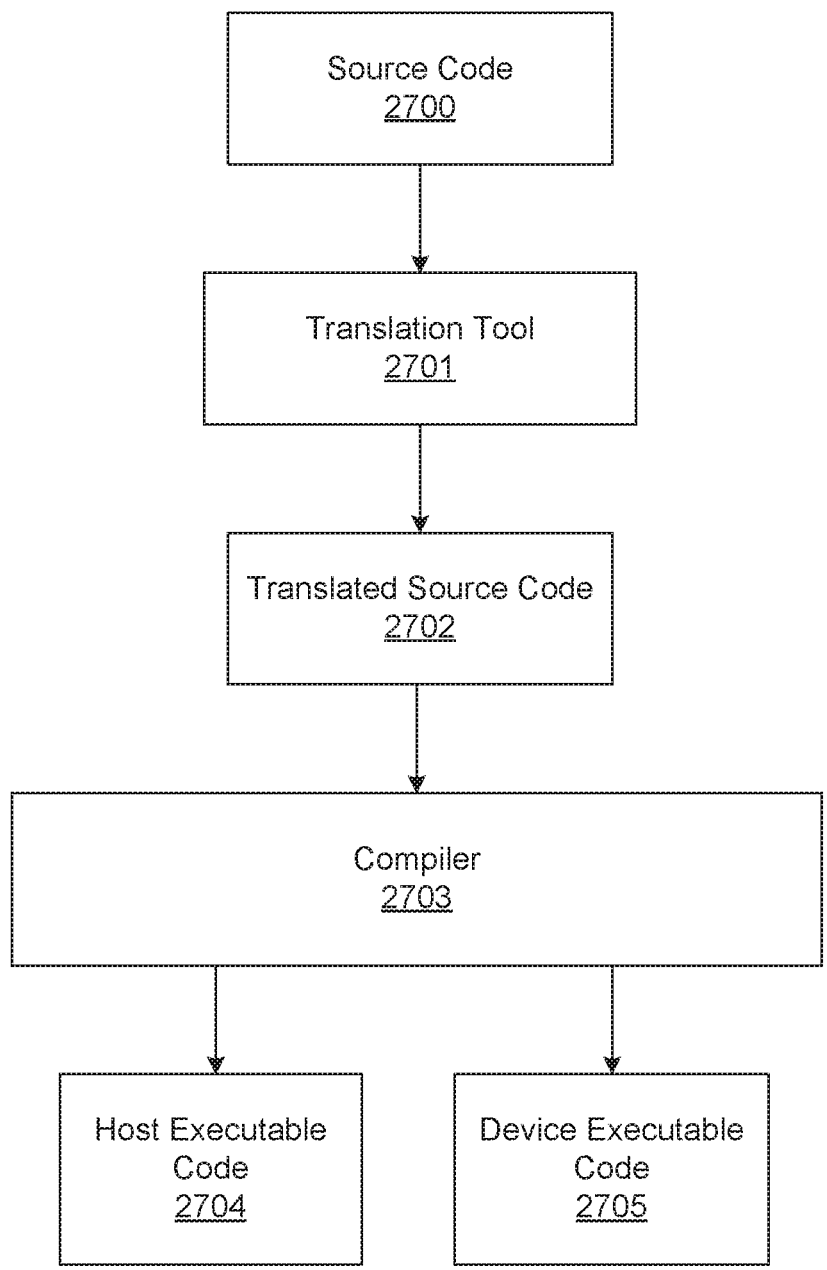
FIG. 27 illustrates translating source code prior to compiling source code, in accordance with at least one embodiment.

FIG. 27 illustrates translating source code prior to compiling source code, in accordance with at least one embodiment. In at least one embodiment, source code 2700 is passed through a translation tool 2701, which translates source code 2700 into translated source code 2702. In at least one embodiment, a compiler 2703 is used to compile translated source code 2702 into host executable code 2704 and device executable code 2705 in a process that is similar to compilation of source code 2500 by compiler 2501 into host executable code 2502 and device executable code 2503, as discussed above in conjunction with FIG. 25.

In at least one embodiment, a translation performed by translation tool 2701 is used to port source 2700 for execution in a different environment than that in which it was originally intended to run. In at least one embodiment, translation tool 2701 may include, but is not limited to, a HIP translator that is used to "hipify" CUDA code intended for a CUDA platform into HIP code that can be compiled and executed on a ROCm platform. In at least one embodiment, translation of source code 2700 may include parsing source code 2700 and converting calls to API(s) provided by one programming model (e.g., CUDA) into corresponding calls to API(s) provided by another programming model (e.g., HIP), as discussed in greater detail below in conjunction with FIGS. 28A-29. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 2701 may sometimes be incomplete, requiring additional, manual effort to fully port source code 2700.

Configuring GPUs for General-Purpose Computing

The following figures set forth, without limitation, exemplary architectures for compiling and executing compute source code, in accordance with at least one embodiment.

Figure 28A:
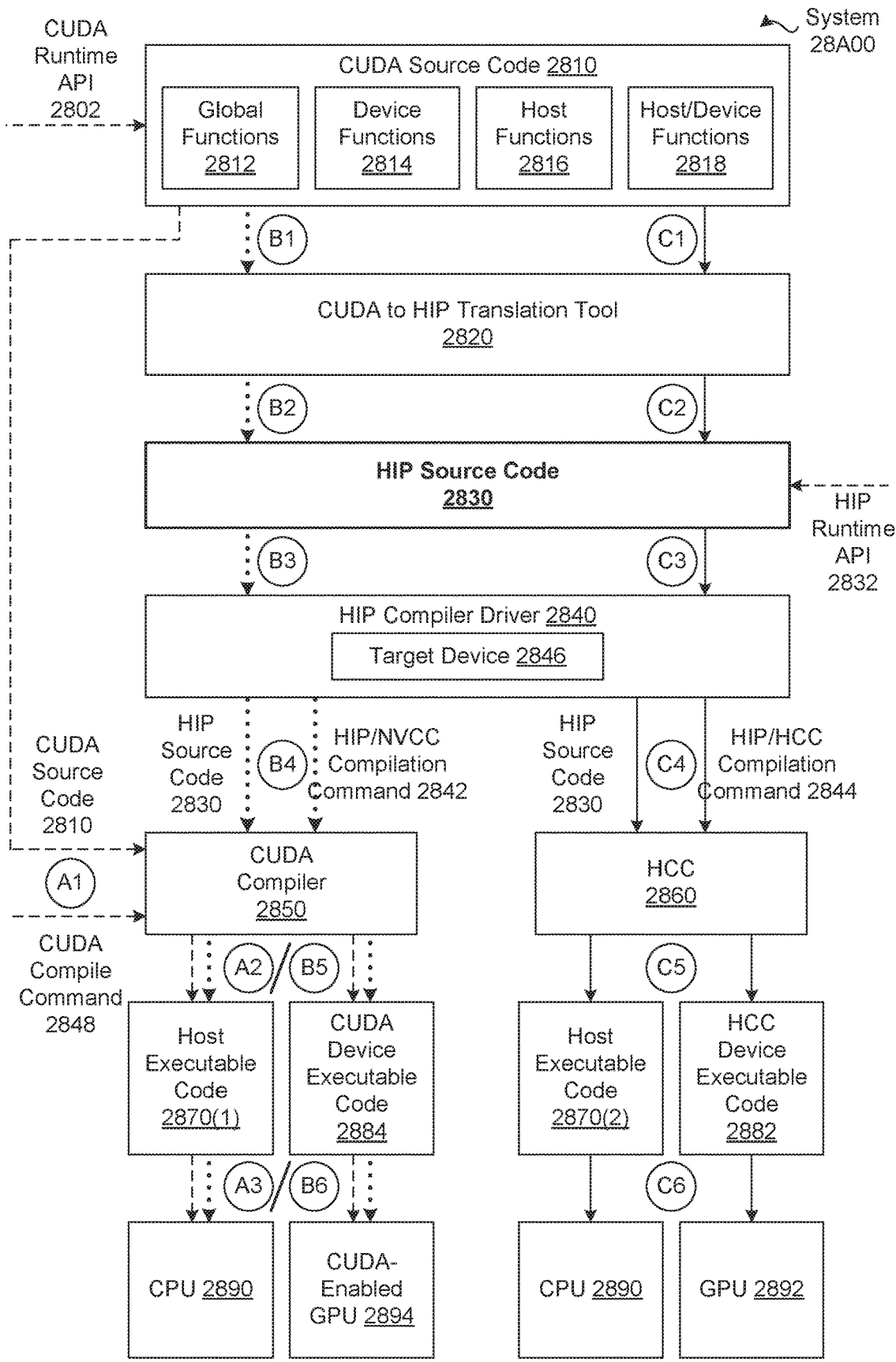
FIG. 28A illustrates a system configured to compile and execute CUDA source code using different types of processing units, in accordance with at least one embodiment.

FIG. 28A illustrates a system 28A00 configured to compile and execute CUDA source code 2810 using different types of processing units, in accordance with at least one embodiment. In at least one embodiment, system 28A00 includes, without limitation, CUDA source code 2810, a CUDA compiler 2850, host executable code 2870(1), host executable code 2870(2), CUDA device executable code 2884, a CPU 2890, a CUDA-enabled GPU 2894, a GPU 2892, a CUDA to HIP translation tool 2820, HIP source code 2830, a HIP compiler driver 2840, an HCC 2860, and HCC device executable code 2882.

In at least one embodiment, CUDA source code 2810 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 2890, GPU 28192, or another GPGPU, etc. In at least one embodiment, host code is source code that, after compilation, is executable on a host. In at least one embodiment, a host is a processor that is optimized for sequential instruction processing, such as CPU 2890.

In at least one embodiment, CUDA source code 2810 includes, without limitation, any number (including zero) of global functions 2812, any number (including zero) of device functions 2814, any number (including zero) of host functions 2816, and any number (including zero) of host/device functions 2818. In at least one embodiment, global functions 2812, device functions 2814, host functions 2816, and host/device functions 2818 may be mixed in CUDA source code 2810. In at least one embodiment, each of global functions 2812 is executable on a device and callable from a host. In at least one embodiment, one or more of global functions 2812 may therefore act as entry points to a device. In at least one embodiment, each of global functions 2812 is a kernel. In at least one embodiment and in a technique known as dynamic parallelism, one or more of global functions 2812 defines a kernel that is executable on a device and callable from such a device. In at least one embodiment, a kernel is executed N (where N is any positive integer) times in parallel by N different threads on a device during execution.

In at least one embodiment, each of device functions 2814 is executed on a device and callable from such a device only. In at least one embodiment, each of host functions 2816 is executed on a host and callable from such a host only. In at least one embodiment, each of host/device functions 2816 defines both a host version of a function that is executable on a host and callable from such a host only and a device version of the function that is executable on a device and callable from such a device only.

In at least one embodiment, CUDA source code 2810 may also include, without limitation, any number of calls to any number of functions that are defined via a CUDA runtime API 2802. In at least one embodiment, CUDA runtime API 2802 may include, without limitation, any number of functions that execute on a host to allocate and deallocate device memory, transfer data between host memory and device memory, manage systems with multiple devices, etc. In at least one embodiment, CUDA source code 2810 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 2802, a CUDA driver API, APIs for any number of CUDA libraries, etc. In at least one embodiment and relative to CUDA runtime API 2802, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 2850 compiles input CUDA code (e.g., CUDA source code 2810) to generate host executable code 2870(1) and CUDA device executable code 2884. In at least one embodiment, CUDA compiler 2850 is NVCC. In at least one embodiment, host executable code 2870(1) is a compiled version of host code included in input source code that is executable on CPU 2890. In at least one embodiment, CPU 2890 may be any processor that is optimized for sequential instruction processing.

In at least one embodiment, CUDA device executable code 2884 is a compiled version of device code included in input source code that is executable on CUDA-enabled GPU 2894. In at least one embodiment, CUDA device executable code 2884 includes, without limitation, binary code. In at least one embodiment, CUDA device executable code 2884 includes, without limitation, IR code, such as PTX code, that is further compiled at runtime into binary code for a specific target device (e.g., CUDA-enabled GPU 2894) by a device driver. In at least one embodiment, CUDA-enabled GPU 2894 may be any processor that is optimized for parallel instruction processing and that supports CUDA. In at least one embodiment, CUDA-enabled GPU 2894 is developed by NVIDIA Corporation of Santa Clara, CA.

In at least one embodiment, CUDA to HIP translation tool 2820 is configured to translate CUDA source code 2810 to functionally similar HIP source code 2830. In a least one embodiment, HIP source code 2830 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 2812, but such a HIP programming language may lack support for dynamic parallelism and therefore global functions 2812 defined in HIP code may be callable from a host only.

In at least one embodiment, HIP source code 2830 includes, without limitation, any number (including zero) of global functions 2812, any number (including zero) of device functions 2814, any number (including zero) of host functions 2816, and any number (including zero) of host/device functions 2818. In at least one embodiment, HIP source code 2830 may also include any number of calls to any number of functions that are specified in a HIP runtime API 2832. In at least one embodiment, HIP runtime API 2832 includes, without limitation, functionally similar versions of a subset of functions included in CUDA runtime API 2802. In at least one embodiment, HIP source code 2830 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 2832, a HIP driver API, APIs for any number of HIP libraries, APIs for any number of ROCm libraries, etc.

In at least one embodiment, CUDA to HIP translation tool 2820 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 2820 converts any number of calls to functions specified in CUDA runtime API 2802 to any number of calls to functions specified in HIP runtime API 2832.

In at least one embodiment, CUDA to HIP translation tool 2820 is a tool known as hipify-perl that executes a text-based translation process. In at least one embodiment, CUDA to HIP translation tool 2820 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 2820.

In at least one embodiment, HIP compiler driver 2840 is a front end that determines a target device 2846 and then configures a compiler that is compatible with target device 2846 to compile HIP source code 2830. In at least one embodiment, target device 2846 is a processor that is optimized for parallel instruction processing. In at least one embodiment, HIP compiler driver 2840 may determine target device 2846 in any technically feasible fashion.

In at least one embodiment, if target device 2846 is compatible with CUDA (e.g., CUDA-enabled GPU 2894), then HIP compiler driver 2840 generates a HIP/NVCC compilation command 2842. In at least one embodiment and as described in greater detail in conjunction with FIG. 28B, HIP/NVCC compilation command 2842 configures CUDA compiler 2850 to compile HIP source code 2830 using, without limitation, a HIP to CUDA translation header and a CUDA runtime library. In at least one embodiment and in response to HIP/NVCC compilation command 2842, CUDA compiler 2850 generates host executable code 2870(1) and CUDA device executable code 2884.

In at least one embodiment, if target device 2846 is not compatible with CUDA, then HIP compiler driver 2840 generates a HIP/HCC compilation command 2844. In at least one embodiment and as described in greater detail in conjunction with FIG. 28C, HIP/HCC compilation command 2844 configures HCC 2860 to compile HIP source code 2830 using, without limitation, an HCC header and a HIP/HCC runtime library. In at least one embodiment and in response to HIP/HCC compilation command 2844, HCC 2860 generates host executable code 2870(2) and HCC device executable code 2882. In at least one embodiment, HCC device executable code 2882 is a compiled version of device code included in HIP source code 2830 that is executable on GPU 2892. In at least one embodiment, GPU 2892 may be any processor that is optimized for parallel instruction processing, is not compatible with CUDA, and is compatible with HCC. In at least one embodiment, GPU 2892 is developed by AMD Corporation of Santa Clara, CA In at least one embodiment GPU, 2892 is a non-CUDA-enabled GPU 2892.

For explanatory purposes only, three different flows that may be implemented in at least one embodiment to compile CUDA source code 2810 for execution on CPU 2890 and different devices are depicted in FIG. 28A. In at least one embodiment, a direct CUDA flow compiles CUDA source code 2810 for execution on CPU 2890 and CUDA-enabled GPU 2894 without translating CUDA source code 2810 to HIP source code 2830. In at least one embodiment, an indirect CUDA flow translates CUDA source code 2810 to HIP source code 2830 and then compiles HIP source code 2830 for execution on CPU 2890 and CUDA-enabled GPU 2894. In at least one embodiment, a CUDA/HCC flow translates CUDA source code 2810 to HIP source code 2830 and then compiles HIP source code 2830 for execution on CPU 2890 and GPU 2892.

A direct CUDA flow that may be implemented in at least one embodiment is depicted via dashed lines and a series of bubbles annotated A1-A3. In at least one embodiment and as depicted with bubble annotated A1, CUDA compiler 2850 receives CUDA source code 2810 and a CUDA compile command 2848 that configures CUDA compiler 2850 to compile CUDA source code 2810. In at least one embodiment, CUDA source code 2810 used in a direct CUDA flow is written in a CUDA programming language that is based on a programming language other than C++ (e.g., C, Fortran, Python, Java, etc.). In at least one embodiment and in response to CUDA compile command 2848, CUDA compiler 2850 generates host executable code 2870(1) and CUDA device executable code 2884 (depicted with bubble annotated A2). In at least one embodiment and as depicted with bubble annotated A3, host executable code 2870(1) and CUDA device executable code 2884 may be executed on, respectively, CPU 2890 and CUDA-enabled GPU 2894. In at least one embodiment, CUDA device executable code 2884 includes, without limitation, binary code. In at least one embodiment, CUDA device executable code 2884 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 2820 receives CUDA source code 2810. In at least one embodiment and as depicted with bubble annotated B2, CUDA to HIP translation tool 2820 translates CUDA source code 2810 to HIP source code 2830. In at least one embodiment and as depicted with bubble annotated B3, HIP compiler driver 2840 receives HIP source code 2830 and determines that target device 2846 is CUDA-enabled.

In at least one embodiment and as depicted with bubble annotated B4, HIP compiler driver 2840 generates HIP/NVCC compilation command 2842 and transmits both HIP/NVCC compilation command 2842 and HIP source code 2830 to CUDA compiler 2850. In at least one embodiment and as described in greater detail in conjunction with FIG. 28B, HIP/NVCC compilation command 2842 configures CUDA compiler 2850 to compile HIP source code 2830 using, without limitation, a HIP to CUDA translation header and a CUDA runtime library. In at least one embodiment and in response to HIP/NVCC compilation command 2842, CUDA compiler 2850 generates host executable code 2870

(1) and CUDA device executable code 2884 (depicted with bubble annotated B5). In at least one embodiment and as depicted with bubble annotated B6, host executable code 2870(1) and CUDA device executable code 2884 may be executed on, respectively, CPU 2890 and CUDA-enabled GPU 2894. In at least one embodiment, CUDA device executable code 2884 includes, without limitation, binary code. In at least one embodiment, CUDA device executable code 2884 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 2820 receives CUDA source code 2810. In at least one embodiment and as depicted with bubble annotated C2, CUDA to HIP translation tool 2820 translates CUDA source code 2810 to HIP source code 2830. In at least one embodiment and as depicted with bubble annotated C3, HIP compiler driver 2840 receives HIP source code 2830 and determines that target device 2846 is not CUDA-enabled.

In at least one embodiment, HIP compiler driver 2840 generates HIP/HCC compilation command 2844 and transmits both HIP/HCC compilation command 2844 and HIP source code 2830 to HCC 2860 (depicted with bubble annotated C4). In at least one embodiment and as described in greater detail in conjunction with FIG. 28C, HIP/HCC compilation command 2844 configures HCC 2860 to compile HIP source code 2830 using, without limitation, an HCC header and a HIP/HCC runtime library. In at least one embodiment and in response to HIP/HCC compilation command 2844, HCC 2860 generates host executable code 2870(2) and HCC device executable code 2882 (depicted with bubble annotated C5). In at least one embodiment and as depicted with bubble annotated C6, host executable code 2870(2) and HCC device executable code 2882 may be executed on, respectively, CPU 2890 and GPU 2892.

In at least one embodiment, after CUDA source code 2810 is translated to HIP source code 2830, HIP compiler driver 2840 may subsequently be used to generate executable code for either CUDA-enabled GPU 2894 or GPU 2892 without re-executing CUDA to HIP translation tool 2820. In at least one embodiment, CUDA to HIP translation tool 2820 translates CUDA source code 2810 to HIP source code 2830 that is then stored in memory. In at least one embodiment, HIP compiler driver 2840 then configures HCC 2860 to generate host executable code 2870(2) and HCC device executable code 2882 based on HIP source code 2830. In at least one embodiment, HIP compiler driver 2840 subsequently configures CUDA compiler 2850 to generate host executable code 2870(1) and CUDA device executable code 2884 based on stored HIP source code 2830.

Figure 28B:
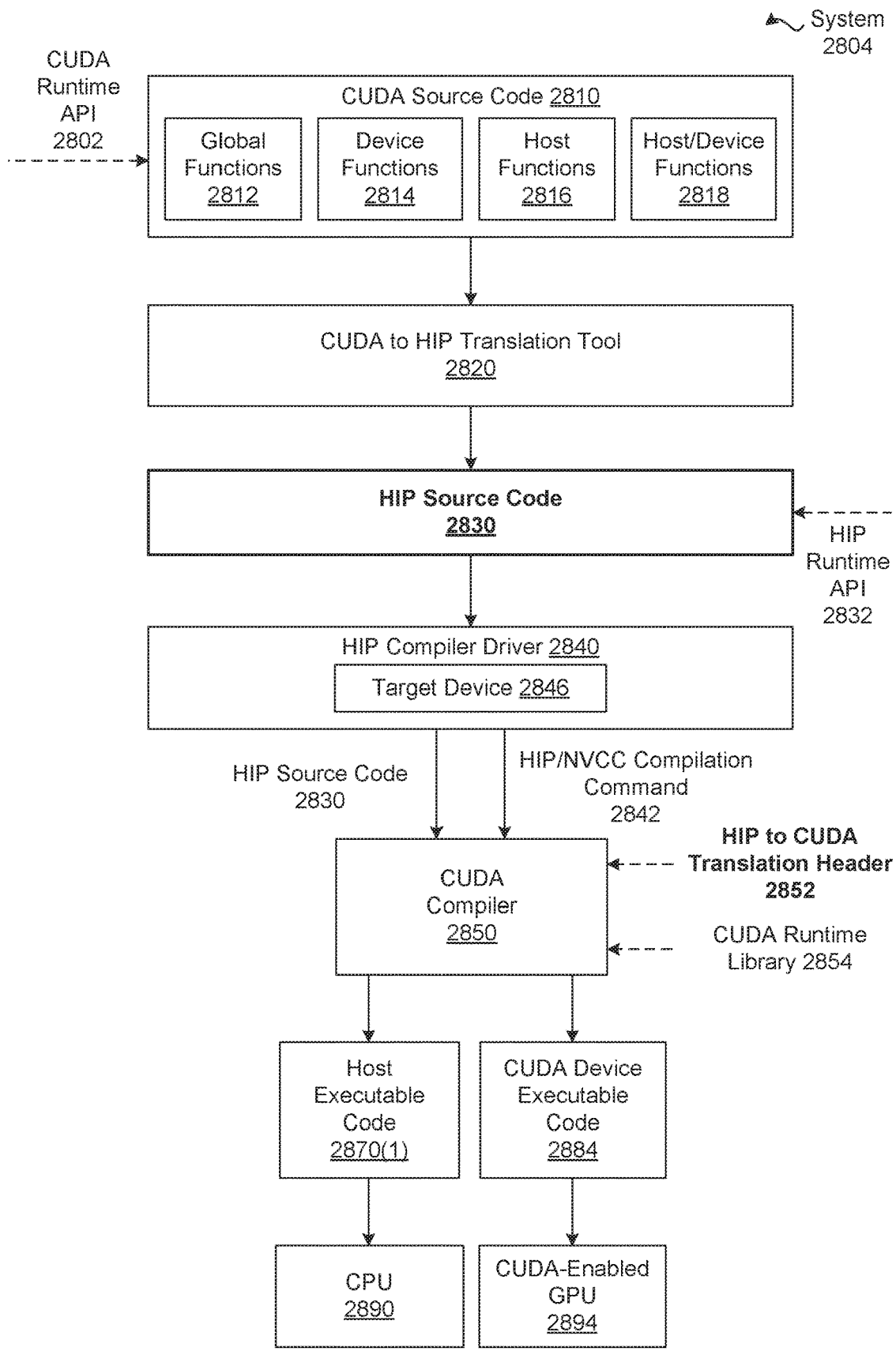
FIG. 28B illustrates a system configured to compile and execute CUDA source code of FIG. 28A using a CPU and a CUDA-enabled GPU, in accordance with at least one embodiment.

FIG. 28B illustrates a system 2804 configured to compile and execute CUDA source code 2810 of FIG. 28A using CPU 2890 and CUDA-enabled GPU 2894, in accordance with at least one embodiment. In at least one embodiment, system 2804 includes, without limitation, CUDA source code 2810, CUDA to HIP translation tool 2820, HIP source code 2830, HIP compiler driver 2840, CUDA compiler 2850, host executable code 2870(1), CUDA device executable code 2884, CPU 2890, and CUDA-enabled GPU 2894.

In at least one embodiment and as described previously herein in conjunction with FIG. 28A, CUDA source code 2810 includes, without limitation, any number (including zero) of global functions 2812, any number (including zero) of device functions 2814, any number (including zero) of host functions 2816, and any number (including zero) of host/device functions 2818. In at least one embodiment, CUDA source code 2810 also includes, without limitation, any number of calls to any number of functions that are specified in any number of CUDA APIs.

In at least one embodiment, CUDA to HIP translation tool 2820 translates CUDA source code 2810 to HIP source code 2830. In at least one embodiment, CUDA to HIP translation tool 2820 converts each kernel call in CUDA source code 2810 from a CUDA syntax to a HIP syntax and converts any number of other CUDA calls in CUDA source code 2810 to any number of other functionally similar HIP calls.

In at least one embodiment, HIP compiler driver 2840 determines that target device 2846 is CUDA-enabled and generates HIP/NVCC compilation command 2842. In at least one embodiment, HIP compiler driver 2840 then configures CUDA compiler 2850 via HIP/NVCC compilation command 2842 to compile HIP source code 2830. In at least one embodiment, HIP compiler driver 2840 provides access to a HIP to CUDA translation header 2852 as part of configuring CUDA compiler 2850. In at least one embodiment, HIP to CUDA translation header 2852 translates any number of mechanisms (e.g., functions) specified in any number of HIP APIs to any number of mechanisms specified in any number of CUDA APIs. In at least one embodiment, CUDA compiler 2850 uses HIP to CUDA translation header 2852 in conjunction with a CUDA runtime library 2854 corresponding to CUDA runtime API 2802 to generate host executable code 2870(1) and CUDA device executable code 2884. In at least one embodiment, host executable code 2870(1) and CUDA device executable code 2884 may then be executed on, respectively, CPU 2890 and CUDA-enabled GPU 2894. In at least one embodiment, CUDA device executable code 2884 includes, without limitation, binary code. In at least one embodiment, CUDA device executable code 2884 includes, without limitation, PTX code and is further compiled into binary code for a specific target device at runtime.

Figure 28C:
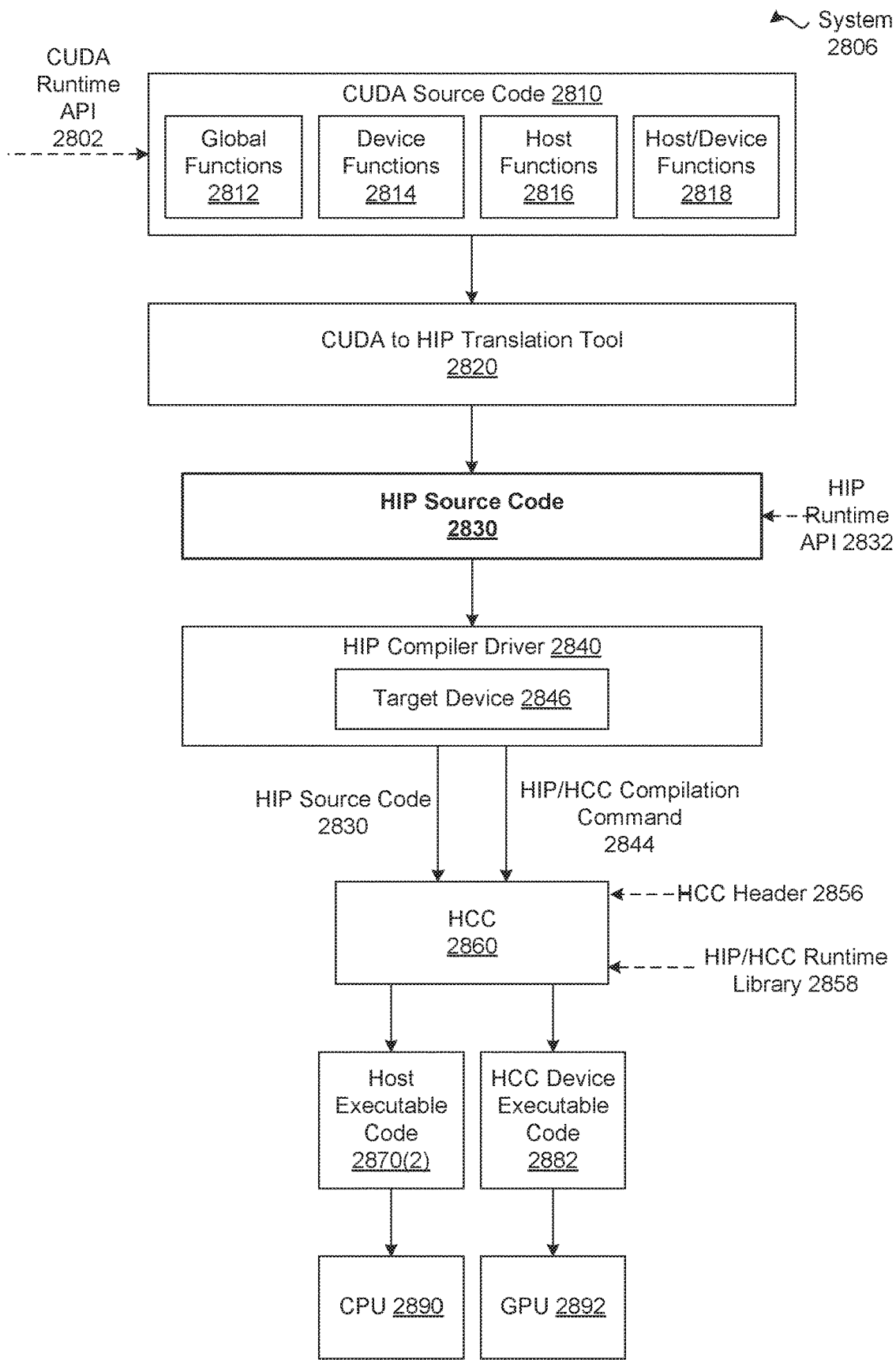
FIG. 28C illustrates a system configured to compile and execute CUDA source code of FIG. 28A using a CPU and a non-CUDA-enabled GPU, in accordance with at least one embodiment.

FIG. 28C illustrates a system 2806 configured to compile and execute CUDA source code 2810 of FIG. 28A using CPU 2890 and non-CUDA-enabled GPU 2892, in accordance with at least one embodiment. In at least one embodiment, system 2806 includes, without limitation, CUDA source code 2810, CUDA to HIP translation tool 2820, HIP source code 2830, HIP compiler driver 2840, HCC 2860, host executable code 2870(2), HCC device executable code 2882, CPU 2890, and GPU 2892.

In at least one embodiment and as described previously herein in conjunction with FIG. 28A, CUDA source code 2810 includes, without limitation, any number (including zero) of global functions 2812, any number (including zero) of device functions 2814, any number (including zero) of host functions 2816, and any number (including zero) of host/device functions 2818. In at least one embodiment, CUDA source code 2810 also includes, without limitation, any number of calls to any number of functions that are specified in any number of CUDA APIs.

In at least one embodiment, CUDA to HIP translation tool 2820 translates CUDA source code 2810 to HIP source code 2830. In at least one embodiment, CUDA to HIP translation tool 2820 converts each kernel call in CUDA source code 2810 from a CUDA syntax to a HIP syntax and converts any number of other CUDA calls in source code 2810 to any number of other functionally similar HIP calls.

In at least one embodiment, HIP compiler driver 2840 subsequently determines that target device 2846 is not CUDA-enabled and generates HIP/HCC compilation command 2844. In at least one embodiment, HIP compiler driver 2840 then configures HCC 2860 to execute HIP/HCC compilation command 2844 to compile HIP source code 2830. In at least one embodiment, HIP/HCC compilation command 2844 configures HCC 2860 to use, without limitation, a HIP/HCC runtime library 2858 and an HCC header 2856 to generate host executable code 2870(2) and HCC device executable code 2882. In at least one embodiment, HIP/HCC runtime library 2858 corresponds to HIP runtime API 2832. In at least one embodiment, HCC header 2856 includes, without limitation, any number and type of interoperability mechanisms for HIP and HCC. In at least one embodiment, host executable code 2870(2) and HCC device executable code 2882 may be executed on, respectively, CPU 2890 and GPU 2892.

FIG. 29 illustrates an exemplary kernel translated by CUDA-to-HIP translation tool 2820 of FIG. 28C, in accordance with at least one embodiment. In at least one embodiment, CUDA source code 2810 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 2810 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 2910. In at least one embodiment, CUDA kernel launch syntax 2910 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 2910 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 2910, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 2910, SharedMemorySize defaults to zero. In at least one embodiment and with respect to CUDA kernel launch syntax 2910, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 2810 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 2910, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 2810 to HIP source code 2830, CUDA to HIP translation tool 2820 translates each kernel call in CUDA source code 2810 from CUDA kernel launch syntax 2910 to a HIP kernel launch syntax 2920 and converts any number of other CUDA calls in source code 2810 to any number of other functionally similar HIP calls. In at least one embodiment, HIP kernel launch syntax 2920 is specified as "hipLaunchKernelGGL(KernelName,GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 2920 as in CUDA kernel launch syntax 2910 (described previously herein). In at least one embodiment, arguments SharedMemorySize and Stream are required in HIP kernel launch syntax 2920 and are optional in CUDA kernel launch syntax 2910.

In at least one embodiment, a portion of HIP source code 2830 depicted in FIG. 29 is identical to a portion of CUDA source code 2810 depicted in FIG. 29 except for a kernel call that causes kernel MatAdd to execute on a device. In at least one embodiment, kernel MatAdd is defined in HIP source code 2830 with the same "_global_" declaration specifier with which kernel MatAdd is defined in CUDA source code 2810. In at least one embodiment, a kernel call in HIP source code 2830 is "hipLaunchKernelGGL(MatAdd, numBlocks, threadsPerBlock, 0, 0, A, B, C);", while a corresponding kernel call in CUDA source code 2810 is "MatAdd<<<numBlocks, threadsPerBlock>>>(A, B, C);".

Figure 30:
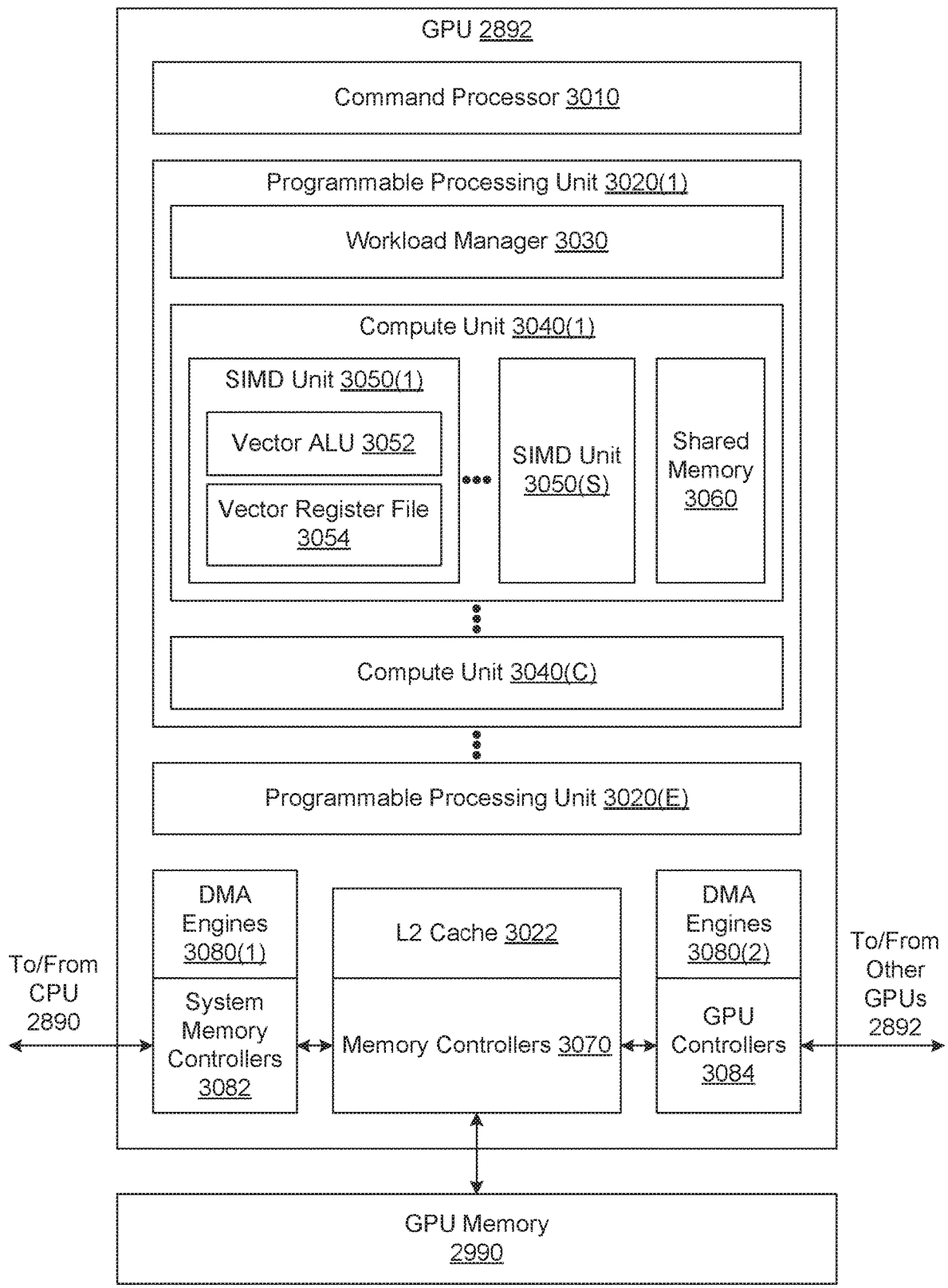
FIG. 30 illustrates non-CUDA-enabled GPU of FIG. 28C in greater detail, in accordance with at least one embodiment.

FIG. 30 illustrates non-CUDA-enabled GPU 2892 of FIG. 28C in greater detail, in accordance with at least one embodiment. In at least one embodiment, GPU 2892 is developed by AMD corporation of Santa Clara. In at least one embodiment, GPU 2892 can be configured to perform compute operations in a highly-parallel fashion. In at least one embodiment, GPU 2892 is configured to execute graphics pipeline operations such as draw commands, pixel operations, geometric computations, and other operations associated with rendering an image to a display. In at least one embodiment, GPU 2892 is configured to execute operations unrelated to graphics. In at least one embodiment, GPU 2892 is configured to execute both operations related to graphics and operations unrelated to graphics. In at least one embodiment, GPU 2892 can be configured to execute device code included in HIP source code 2830.

In at least one embodiment, GPU 2892 includes, without limitation, any number of programmable processing units 3020, a command processor 3010, an L2 cache 3022, memory controllers 3070, DMA engines 3080(1), system memory controllers 3082, DMA engines 3080(2), and GPU controllers 3084. In at least one embodiment, each programmable processing unit 3020 includes, without limitation, a workload manager 3030 and any number of compute units 3040. In at least one embodiment, command processor 3010 reads commands from one or more command queues (not shown) and distributes commands to workload managers 3030. In at least one embodiment, for each programmable processing unit 3020, associated workload manager 3030 distributes work to compute units 3040 included in programmable processing unit 3020. In at least one embodiment, each compute unit 3040 may execute any number of thread blocks, but each thread block executes on a single compute unit 3040. In at least one embodiment, a workgroup is a thread block.

In at least one embodiment, each compute unit 3040 includes, without limitation, any number of SIMD units 3050 and a shared memory 3060. In at least one embodiment, each SIMD unit 3050 implements a SIMD architecture and is configured to perform operations in parallel. In at least one embodiment, each SIMD unit 3050 includes, without limitation, a vector ALU 3052 and a vector register file 3054. In at least one embodiment, each SIMD unit 3050 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3060.

In at least one embodiment, programmable processing units 3020 are referred to as "shader engines." In at least one embodiment, each programmable processing unit 3020 includes, without limitation, any amount of dedicated graphics hardware in addition to compute units 3040. In at least one embodiment, each programmable processing unit 3020 includes, without limitation, any number (including zero) of geometry processors, any number (including zero) of rasterizers, any number (including zero) of render back ends, workload manager 3030, and any number of compute units 3040.

In at least one embodiment, compute units 3040 share L2 cache 3022. In at least one embodiment, L2 cache 3022 is partitioned. In at least one embodiment, a GPU memory 3090 is accessible by all compute units 3040 in GPU 2892. In at least one embodiment, memory controllers 3070 and system memory controllers 3082 facilitate data transfers between GPU 2892 and a host, and DMA engines 3080(1) enable asynchronous memory transfers between GPU 2892 and such a host. In at least one embodiment, memory controllers 3070 and GPU controllers 3084 facilitate data transfers between GPU 2892 and other GPUs 2892, and DMA engines 3080(2) enable asynchronous memory transfers between GPU 2892 and other GPUs 2892.

In at least one embodiment, GPU 2892 includes, without limitation, any amount and type of system interconnect that facilitates data and control transmissions across any number and type of directly or indirectly linked components that may be internal or external to GPU 2892. In at least one embodiment, GPU 2892 includes, without limitation, any number and type of I/O interfaces (e.g., PCIe) that are coupled to any number and type of peripheral devices. In at least one embodiment, GPU 2892 may include, without limitation, any number (including zero) of display engines and any number (including zero) of multimedia engines. In at least one embodiment, GPU 2892 implements a memory subsystem that includes, without limitation, any amount and type of memory controllers (e.g., memory controllers 3070 and system memory controllers 3082) and memory devices (e.g., shared memories 3060) that may be dedicated to one component or shared among multiple components. In at least one embodiment, GPU 2892 implements a cache subsystem that includes, without limitation, one or more cache memories (e.g., L2 cache 3022) that may each be private to or shared between any number of components (e.g., SIMD units 3050, compute units 3040, and programmable processing units 3020).

Figure 31:
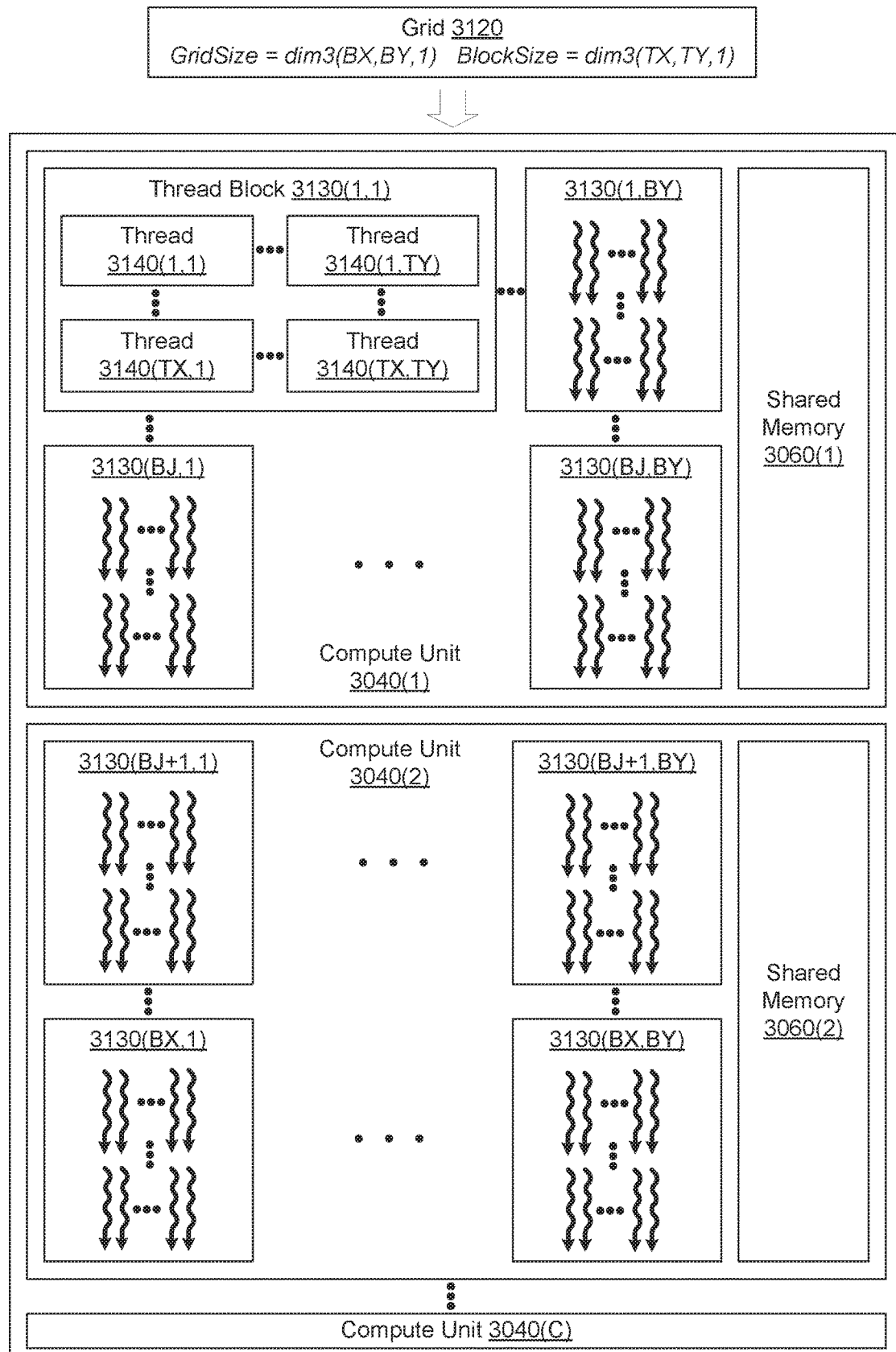
FIG. 31 illustrates how threads of an exemplary CUDA grid are mapped to different compute units of FIG. 30, in accordance with at least one embodiment.

FIG. 31 illustrates how threads of an exemplary CUDA grid 3120 are mapped to different compute units 3040 of FIG. 30, in accordance with at least one embodiment. In at least one embodiment and for explanatory purposes only, grid 3120 has a GridSize of BX by BY by 1 and a BlockSize of TX by TY by 1. In at least one embodiment, grid 3120 therefore includes, without limitation, (BX*BY) thread blocks 3130 and each thread block 3130 includes, without limitation, (TX*TY) threads 3140. Threads 3140 are depicted in FIG. 31 as squiggly arrows.

In at least one embodiment, grid 3120 is mapped to programmable processing unit 3020(1) that includes, without limitation, compute units 3040(1)-3040(C). In at least one embodiment and as shown, (BJ*BY) thread blocks 3130 are mapped to compute unit 3040(1), and the remaining thread blocks 3130 are mapped to compute unit 3040(2). In at least one embodiment, each thread block 3130 may include, without limitation, any number of warps, and each warp is mapped to a different SIMD unit 3050 of FIG. 30.

In at least one embodiment, warps in a given thread block 3130 may synchronize together and communicate through shared memory 3060 included in associated compute unit 3040. For example and in at least one embodiment, warps in thread block 3130(BJ,1) can synchronize together and communicate through shared memory 3060(1). For example and in at least one embodiment, warps in thread block 3130(BJ+1,1) can synchronize together and communicate through shared memory 3060(2).

Task Graphs and Executable Graphs

In at least one embodiment, use of specialized computing resources and/or arrays of parallel computing resources provide opportunities for more effectively and more quickly executing complex workloads. In at least one embodiment, execution of many image processing, machine learning, and related workloads can often be accelerated by using one or more specialized computing resources and/or two or more computing resources operating in parallel. In at least one embodiment, a host processor, such as a host central processing unit ("CPU"), is responsible for preparing and distributing one or more tasks to one or more other computing resources and then retrieving results of one or more tasks from one or more other computing resources. In at least one embodiment, as long as one or more other computing resources are able to complete one or more tasks faster than one or more tasks could be performed by a host CPU directly, then use of one or more other computing resources to perform one or more tasks is generally considered to be advantageous.

In at least one embodiment, offloading one or more tasks to one or more other computing resources can be overhead intensive. In at least one embodiment, overhead may include, among other possibilities, selecting one or more other computing resources, configuring and/or transmitting executable instructions to one or more other computing resources, transmitting data to one or more other computing resources, and retrieving results from one or more other computing resources. In at least one embodiment, if this overhead is not managed carefully, cost of overhead can significantly reduce efficiency of using one or more other computing resources to perform computing tasks.

In at least one embodiment, one approach for reducing overhead is to consider multiple tasks as an integrated whole, rather than considering each of multiple tasks separately. In at least one embodiment, there are dependencies among various tasks in a workload, where some tasks generate data that is needed by other tasks, some tasks need to complete before other tasks can begin, some tasks need to share exclusive use resources with other tasks, and/or some tasks need to synchronize execution with other tasks. In at least one embodiment, some computing resources are better suited for some tasks than other computing resources. In at least one embodiment, techniques that consider dependencies between tasks and/or consider which combinations of computing resources are most computationally efficient are generally able to reduce overhead and computing time associated with executing multiple tasks across multiple computing resources relative to managing each of multiple tasks in isolation.

In at least one embodiment, multiple tasks may be organized as an integrated whole by using a task graph. In at least one embodiment, in a task graph, a workload that includes multiple tasks is organized as a directed graph, where each node corresponds to a task to be performed, and each directed edge between two nodes corresponds to a data dependency, an execution dependency, or some other dependency between two nodes. In at least one embodiment, a dependency may indicate when a task of one node has to complete before a task of another node can begin. In at least one embodiment, a dependency may indicate when one node has to wait for data from another node before the node can begin and/or continue its task. In at least one embodiment, once a task graph is prepared, a task graph is converted to an executable version of task graph ("executable graph"). In at least one embodiment, an executable graph may be generated from a task graph using instantiation. In at least one embodiment, because converting a task graph to an executable graph has access to an entire task graph, various optimizations may be performed, which may reduce an overall execution time of a workload.

In at least one embodiment, an executable graph may be used multiple times to have computing resources perform a same workload without having to be regenerated from a task graph. In at least one embodiment, one drawback of using executable graphs to perform workloads is that an executable graph is limited to a same workload of a task graph from which executable graph was generated.

Modifying an Executable Graph to Perform a Workload of a New Task Graph

Figure 32:
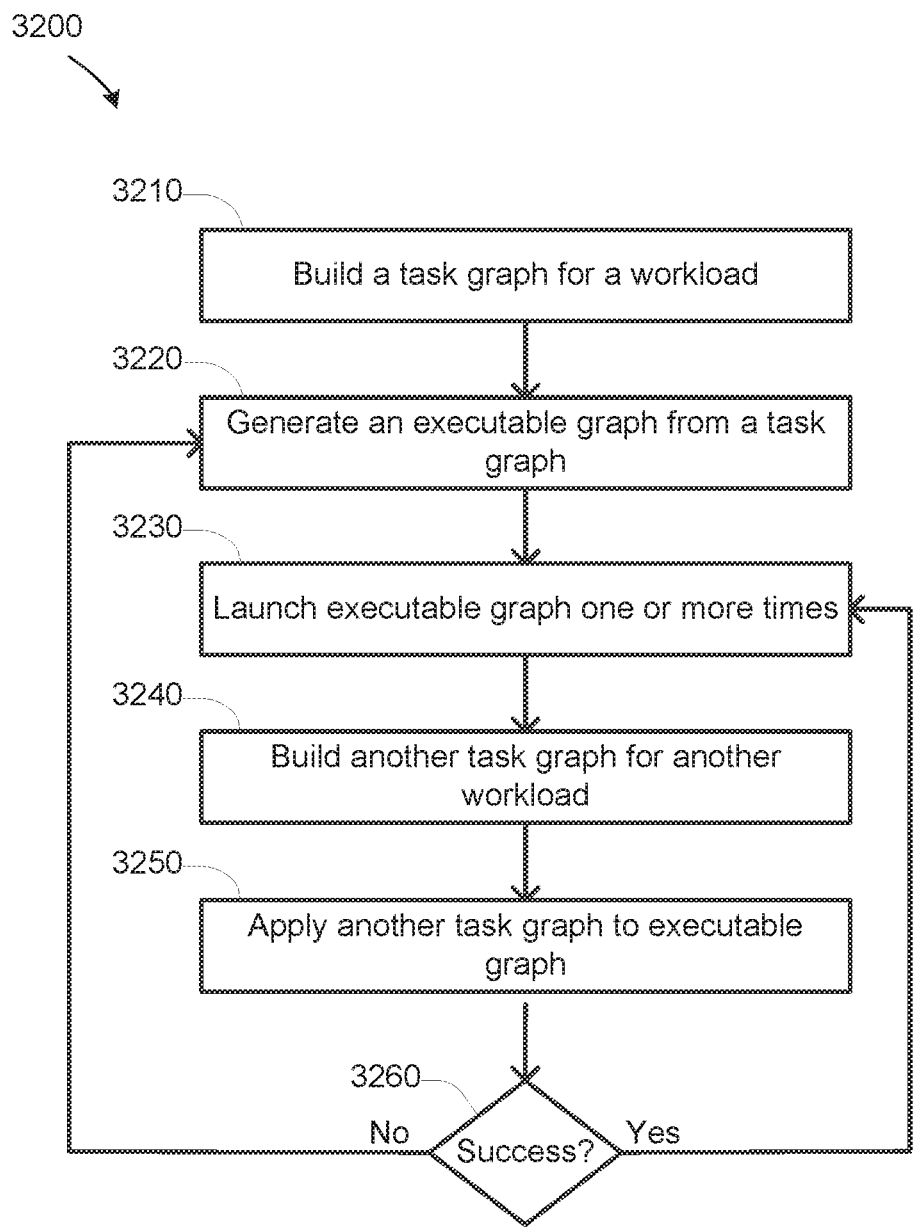
FIG. 32 illustrates a flow chart in accordance with a least one embodiment.

FIG. 32 illustrates a flow chart in accordance with at least one embodiment. Although method steps 3210-3260 of a method 3200 are described in conjunction with systems and techniques of FIGS. 1-31, it is understood that any system configured to perform steps 3210-3260 is consistent with at least one embodiment. In at least one embodiment, one or more of steps 3210-3260 of method 3200 may be implemented, at least in part, as executable code stored on non-transitory, tangible, machine readable media that when run by one or more processors, such as any processor or computing device of FIGS. 1-31, may cause one or more processors to perform one or more of steps 3210-3260.

In at least one embodiment, method 3200 begins at a step 3210, where a task graph for a workload is built. In at least one embodiment, a task graph may be built explicitly by making one or more application programming interface (API) or library function calls. API or library function calls are used to create each node of a task graph and associate a node with a computing task. In at least one embodiment, a computing task may correspond to a kernel task to be performed by a computing resource, a host task corresponding to a callback function to be performed on a host CPU used to launch an executable graph, a memory set task, a memory copy task, etc. In at least one embodiment, a same and/or different API or library function calls may be used to add directed edges to a task graph to specify a data, execution, and/or other dependency between two tasks. In at least one embodiment, directed edges may be added to a task graph indirectly based on data dependencies where data generated by one task is source data for another task. In at least one embodiment, a task graph may alternatively be built indirectly by recording a stream of tasks. In at least one embodiment, a stream of tasks is recorded by creating a task stream for recording a task graph and/or converting an existing task stream to a task stream for recording a task graph using one or more API or library function calls, making one or more additional API or library function calls that specify tasks to be added to a task stream, and then completing conversion of a task stream to a task graph using one or more third API or library function calls. In at least one embodiment, a task graph is a non-executable task graph.

In at least one embodiment, as each task is added as a node to a task graph, a creation order of each node is associated with each node. In at least one embodiment, a creation order associated with each node corresponds to an ordinal number indicating whether each node is a first, second, third, or so forth node created and added to a task graph. In at least one embodiment, a creation order of each node may correspond to a count value of a counter that is initialized (e.g., to zero or one) when a task graph is initially created and is incremented each time a new node is added to a task graph.

Figure 33A:
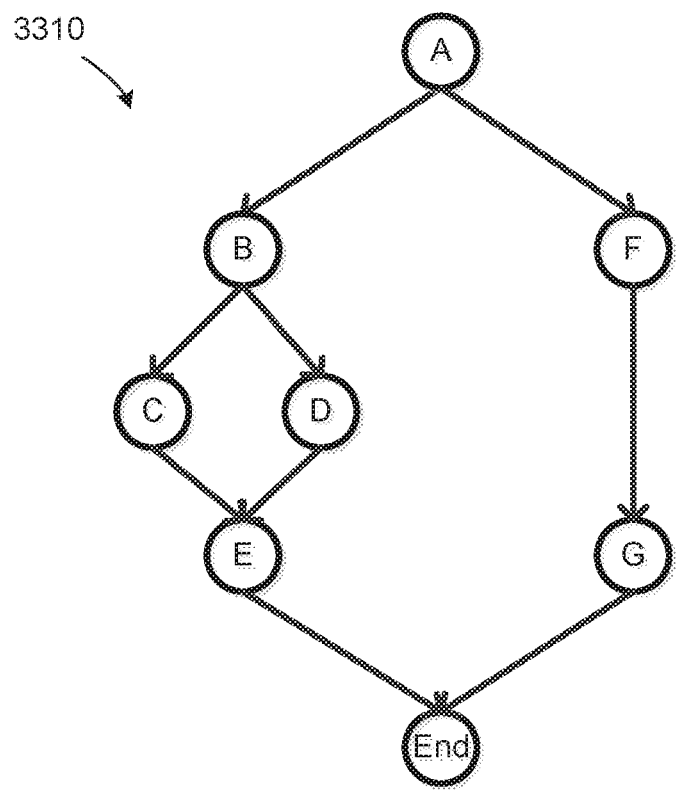
FIGS. 33A-C illustrate exemplary task graphs in accordance with at least one embodiment.
Figure 33B:
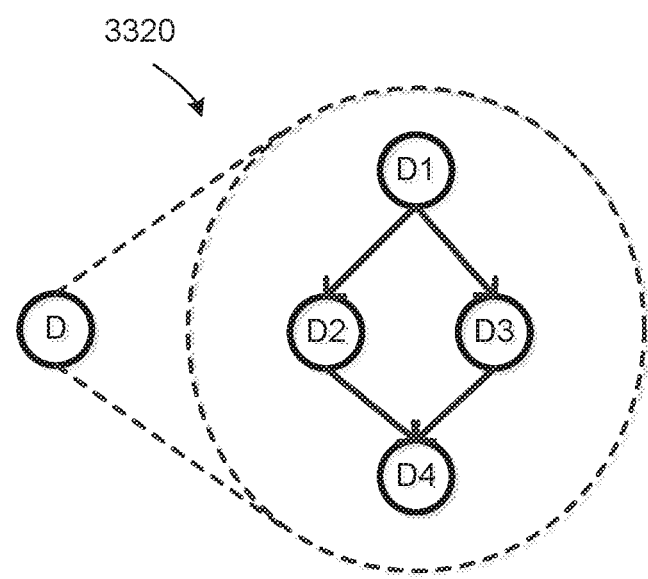
Figure 33C:
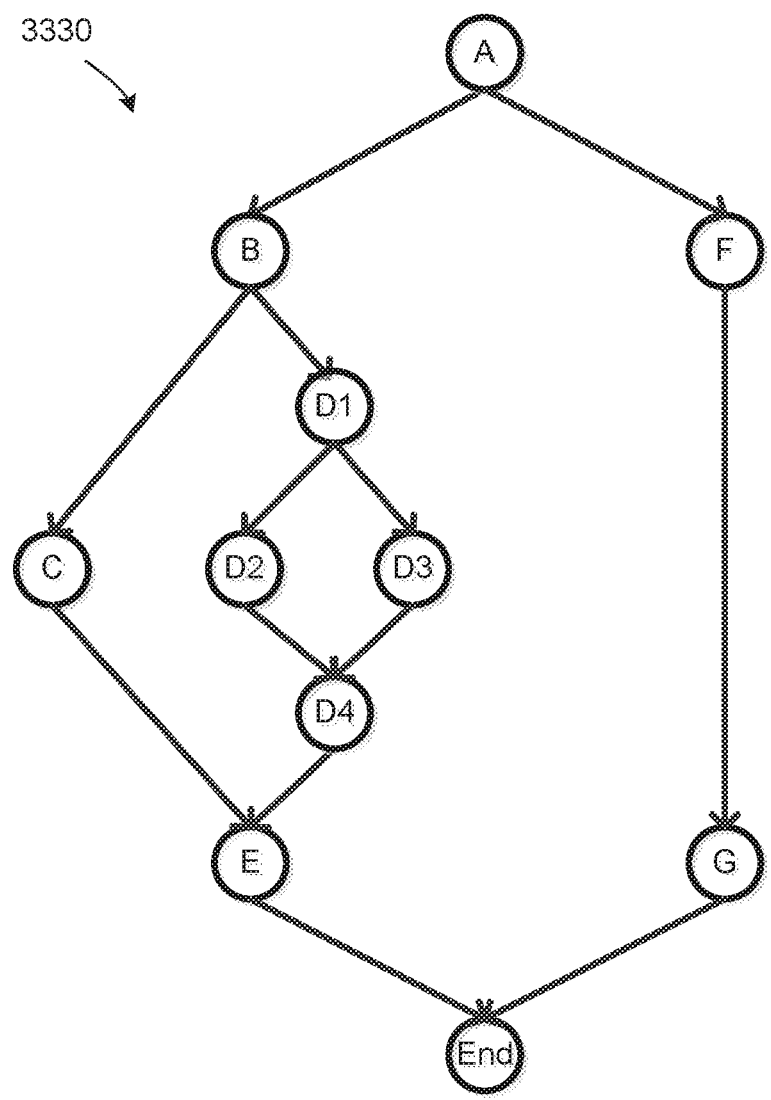

FIGS. 33A-C illustrate exemplary task graphs in accordance with at least one embodiment. In at least one embodiment, task graphs 3310, 3320, and/or 3330 may be consistent with CUDA graphs for specifying one or more CUDA tasks. In at least one embodiment, task graphs 3310, 3320, and/or 3330 may be consistent with HIP graphs for specifying one or more HIP tasks. As shown in FIG. 33, task graph 3310 is a directed graph that includes eight nodes/tasks shown as circles with labels A-G and End. Task graph 3300 starts at task A. Directed edges between task A and tasks B and F, respectively, shown as arrows correspond to dependencies between task A and tasks B and F. More specifically, a directed edge between task A and task B indicates that task A has to complete before task B can begin, and a directed edge between task A and task F indicates that task A has to complete before task F can begin. Because there is no directed edge between tasks B and F, performance of tasks B and F are independent of each other, which means that tasks B and F may be performed in any order relative to each other; including task B being performed before task F, task F being performed before task B, tasks B and F being performed at least partially concurrently, tasks B and F being performed in interleaved fashion relative to each other, and/or any combination thereof. Additional task dependencies in task graph 3300 include that task B has to complete before task C may begin, task B has to complete before task D may begin, tasks C and D both have to complete before task E may begin, and task F has to complete before task G may begin. Additionally, task graph 3300 indicates that both tasks E and G have to complete before a workload of task graph 3300 is finished when task End is reached. In at least one embodiment, control is returned to host CPU by task End. In at least one embodiment, another task (not shown) may start when task End is reached.

In at least one embodiment and not shown in FIG. 33A, each of tasks A-G may correspond to a sub-graph including two or more tasks/nodes. In at least one embodiment, a sub-graph may correspond to one or more nodes and/or dependencies that are created by an API and/or library function call that implements a multi-task workload. In at least one embodiment, FIG. 33B illustrates a sub-graph 3320 corresponding to node D. Sub-graph 3320 includes four tasks labeled D1-D4. Sub-graph 3320 further shows that task D1 has to complete before tasks D2 and D3 may begin and tasks D2 and D3 both have to complete before task D4 may begin. Additionally, because there are no dependencies between tasks D2 and D3, tasks D2 and D3 may be performed in any order relative to each other. Sub-graph 3320 further indicates that task D4 has to complete before task D is complete.

Referring back to FIG. 32, in at least one embodiment and at a step 3220, an executable graph is generated from a task graph. In at least one embodiment, step 3220 is performed via instantiation. In at least one embodiment, step 3220 is performed via compilation. In at least one embodiment, generation of an executable graph includes assigning each task/node of a task graph to a corresponding computing resource and/or a subset of a corresponding computing resource, such as any computing resources, graphics processors, fragment processors, cores, execution units, clusters, multiprocessors, compute units, and/or streaming multiprocessors of FIGS. 1-31, etc. In at least one embodiment, a corresponding computing resource may be selected based on a task to be performed, such as whether a task is a kernel task, a host task, a memory set task, a memory copy task, etc. In at least one embodiment, a corresponding computing resource may be additionally and/or alternatively selected based on computations to be performed by a task, a number of resources such as threads, warps, etc. needed for a task, and/or other criteria. In at least one embodiment, a corresponding computing resource may be additionally and/or alternatively selected based on dependencies between tasks in a task graph.

In at least one embodiment, creation order information, such as an ordinal number, associated with each task/node in task graph is associated with a corresponding task/node in executable graph.

In at least one embodiment, one or more optimizations may be performed when generating an executable graph from a task graph. In at least one embodiment, an optimization may include rearranging tasks to take advantage of parallelism among tasks. In at least one embodiment, rearranging of tasks may include one or more of determining how many computing resources to use, shifting tasks around among computing resources, etc. In at least one embodiment, an optimization may include redistributing tasks to computing resources to reduce overhead due to data dependencies, such as by assigning a task that has a data dependency on another task to a same computing resource as another task. In at least one embodiment, redistributing tasks may reduce execution time because results of another task are available to a task without having to transfer results to a different computing resource for use by a task. In at least one embodiment, redistributing tasks may reduce execution time because completion of another task may be detected more quickly allowing a task to start more quickly after another task completes. In at least one embodiment, a task may be assigned to a computing resource to lower computational costs or delays of transferring results of another task to a computing resource assigned to a previous task. In at least one embodiment, an optimization may include rearranging tasks to better balance and/or optimize capabilities of computing resources, such as a number of threads, warps, compute thread arrays, cores, streaming multiprocessors, etc. available to each computing resource. In at least one embodiment, a task graph may be converted to an executable graph by making one or more API or library function calls.

In at least one embodiment, at a step 3230, an executable graph is launched one or more times to cause a workload to be performed. In at least one embodiment, once an executable graph is prepared, an executable graph may be launched to cause one or more computing resources to perform a workload of a task graph. In at least one embodiment, an executable graph may be launched using one or more API or library function calls. In at least one embodiment, launching an executable graph may include, for each task/node in an executable graph, one or more of sending an executable code corresponding to each task to an associated computing resource, sending a configuration to each associated computing resource based on one or more properties of each task, transferring (if necessary) data for each task to each associated computing resource, and/or when each associated computing resource completes each task, transferring results of each task back to a host CPU or to one or more computing resources that need results of each task as data for a next respective task to be performed. In at least one embodiment, when all tasks in an executable graph have been executed by an associated computing resource, a workload of task graph has been performed. In at least one embodiment, an executable graph may be launched as many times as a same workload is to be performed.

In at least one embodiment, at a step 3240, another task graph for another workload is built. In at least one embodiment, step 3240 is substantially similar to step 3210 except that another task graph is built. In at least one embodiment, a workload of another task graph may be different from a workload of task graph built during process 3210. In at least one embodiment, another task graph is a non-executable task graph.

In at least one embodiment, at a step 3250, another task graph is applied to executable graph. In at least one embodiment, a goal of step 3250 is to modify executable graph so that executable graph is useable to have one or more computing resources perform a workload of another task graph rather than perform a workload of task graph built during step 3210. In at least one embodiment, when step 3250 is successful in applying another task graph to executable graph, executable graph can be modified without having to incur computing costs and delays of converting another task graph to a new executable graph, such as by using step 3220. In at least one embodiment, another task graph may be applied to executable graph using one or more API and/or library functions calls.

In at least one embodiment, step 3250 may be helpful when any task graph is created from a stream of tasks and/or when code used to create any task graph includes one or more API and/or library function calls so that a topology of a task graph, and/or parameters of tasks of a task graph are not generally known to a developer writing code to build a task graph. In at least one embodiment, a developer may not know whether any API and/or library function call creates new task nodes and/or creates new dependencies among task nodes. In at least one embodiment, a developer may have a more simplistic understanding of a task graph, such as is shown by task graph 3310, even though one or more nodes of a task graph may have an embedded sub-graph included therein, such as is shown by task graph 3330 where node D has been replaced by embedded sub-graph 3320. In at least one embodiment, this may be further compounded when one or more API and/or library functions calls also make one or more additional API or library functions calls.

Figure 34:
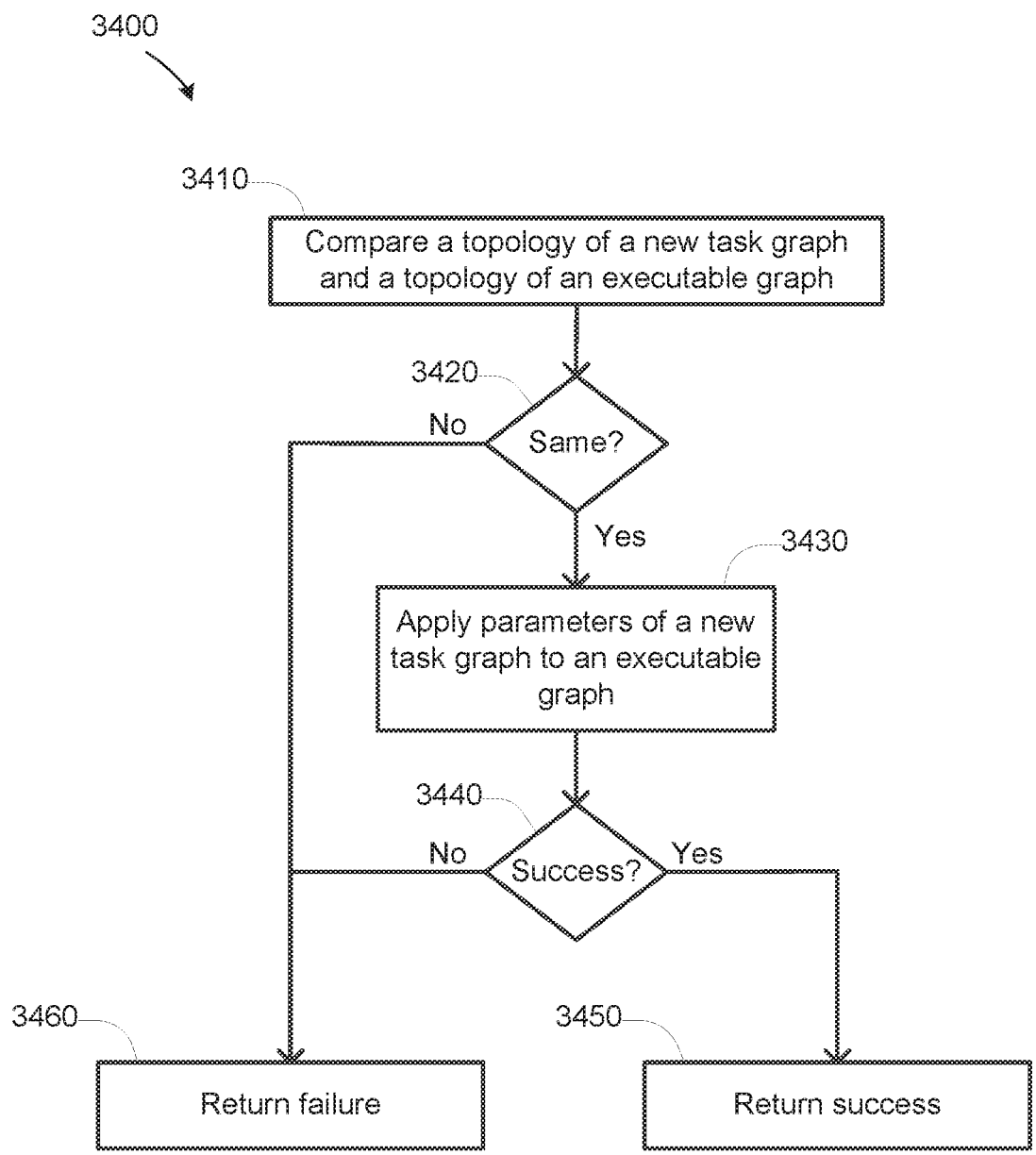
FIG. 34 illustrates a flow chart in accordance with at least one embodiment.

In at least one embodiment, a developer may not be able to know whether two task graphs have a same topology and/or whether parameters of tasks in two task graphs allow a task graph to be applied to executable graph generated from another task graph. In at least one embodiment, step 3460 addresses these issues by using a method 3400 as shown in FIG. 34, which illustrates a flow chart in accordance with at least one embodiment. In at least one embodiment, and within a context of step 3460, new task graph corresponds to a task graph built during step 3440 and executable graph corresponds to executable graph generated during step 3420. Although method steps 3410-3460 of a method 3400 are described in conjunction with systems and techniques of FIGS. 1-31, it is understood that any system configured to perform steps 3410-3460 is consistent with at least one embodiment. In at least one embodiment, one or more of steps 3410-3460 of method 3400 may be implemented, at least in part, as executable code stored on non-transitory, tangible, machine readable media that when run by one or more processors, such as any processor or computing device of FIGS. 1-31) may cause one or more processors to perform one or more of steps 3410-3460.

In at least one embodiment, method 3400 begins at a step 3410, where a topology of new task graph is compared to a topology of executable graph. In at least one embodiment, a topology of new task graph and a topology of executable graph may be compared by confirming that new task graph and executable graph have a same arrangement of nodes/tasks and a same arrangement of directed edges/dependencies between nodes/tasks. In at least one embodiment, this can be a complex comparison as two graphs may have a same topology even though one topology may have one or more reflections, permutations, etc. among various nodes to another topology. In at least one embodiment consistent with task graph 3310 from FIG. 33A, a task graph with nodes C and D swapped is topologically equivalent to task graph 3310.

In at least one embodiment, however, a comparison of topologies may be streamlined by taking advantage of creation order information associated with each node when new task graph was built and creation order information associated with each node when executable graph was generated.

Figure 35:
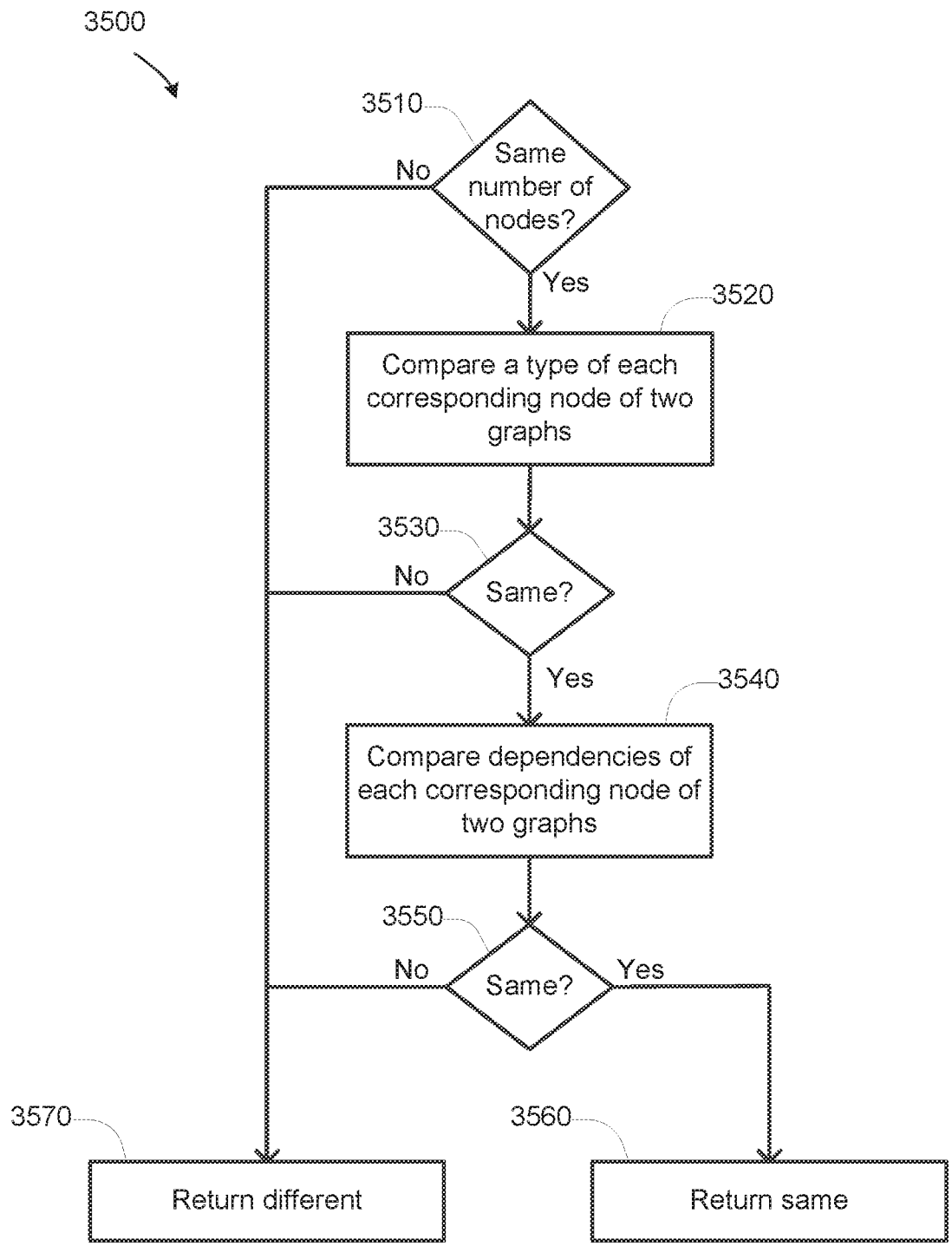
FIG. 35 illustrates a flow chart in accordance with at least one embodiment.

FIG. 35 illustrates a flow chart in accordance with at least one embodiment. Within a context of step 3410, new task graph and executable graph correspond to two graphs being compared. Although method steps 3510-3570 of a method 3500 are described in conjunction with systems and techniques of FIGS. 1-31, it is understood that any system configured to perform steps 3510-3570 is consistent with at least one embodiment. In at least one embodiment, one or more of steps 3510-3570 of method 3500 may be implemented, at least in part, as executable code stored on non-transitory, tangible, machine readable media that when run by one or more processors, such as any processor or computing device of FIGS. 1-31) may cause one or more processors to perform one or more of steps 3510-3570.

In at least one embodiment, method 3500 begins at a step 3510, where it is determined whether both graphs being compared have a same number of nodes. In at least one embodiment, when both graphs have a same number of nodes comparison of both graphs continues with a step 3520. In at least one embodiment, when both graphs do not have a same number of nodes, both graphs have a different topology and that result is returned using a step 3570.

In at least one embodiment, at a step 3520, a type of each corresponding node of both graphs is compared. In at least one embodiment, a node from one graph corresponds to a node of another graph when both nodes are associated with a same creation or ordinal number. In at least one embodiment, once corresponding nodes are identified, a type of a node is compared to a type of a corresponding node to determine whether those types are a same type. In at least one embodiment, when a node is a kernel node for performing a kernel task of a specific type, a corresponding node has to be a kernel node for performing a kernel task of a same specific type for those types to be a same type. In at least one embodiment, when a node corresponds to a memory set task for setting a one-dimension memory block of a specific memory type to a fill value, a corresponding node has to correspond to a memory set task for setting a one-dimensional memory block of a same specific memory type to a fill value for those types to be a same type. In at least one embodiment, a similar test may be performed for nodes corresponding to memory set tasks, memory copy tasks, host tasks, etc. In at least one embodiment, if a node in a graph does not have a corresponding node in another graph, such as because no corresponding node with a same associated creation order is found in another graph, then there is no corresponding node with a same type. In at least one embodiment, as soon as any node and a corresponding node are found to not have a same type, step 3520 may finish without comparing types of any further nodes.

In at least one embodiment, at a step 3530, it is determined whether each node and corresponding node are of a same type. In at least one embodiment, when any node in a graph and a corresponding node in another graph do not have a same type, graphs have a different topology and that result is returned using step 3570. In at least one embodiment, when each node in a graph has a corresponding node in another graph with a same type and each node in another graph has a corresponding node in a graph with a same type, graphs are further compared beginning with a step 3540.

In at least one embodiment, at step 3540, dependencies of each corresponding node of graphs are compared. In at least one embodiment, a node in a graph has same dependencies as a corresponding node in another graph when a list of dependencies of a node includes nodes with same associated creation order information as a list of dependencies of a corresponding node. In at least one embodiment, if a node associated with a creation order ordinal number of 15 has a dependency on nodes associated with creation order ordinal numbers of 6 and 11 and corresponding node with a creation ordinal number of 15 has a dependency on corresponding nodes associated with creation order ordinal number of 6 and 11, then node and corresponding node have same dependencies. In at least one embodiment, as soon as any node and a corresponding node are found to not have same dependencies, step 3540 may finish without comparing dependencies of any further nodes.

In at least one embodiment, at a step 3550, it is determined whether each node in a graph and corresponding node in another graph have a same list of dependencies. In at least one embodiment, when any node in a graph and a corresponding node in another graph do not have a same list of dependencies, graphs have a different topology and that result is returned using step 3570. In at least one embodiment, when each node in a graph has a corresponding node in another graph with a same list of dependencies, graphs are considered to have a same topology and that result is returned using a step 3560.

In at least one embodiment, at step 3560, a result indicating that both graphs have a same topology is returned. In at least one embodiment, indication that both graphs have a same topology may be provided as a return value to a function called to perform method 3500. In at least one embodiment, method 3500 ends upon completing step 3560.

In at least one embodiment, at step 3570, a result indicating that both graphs have a different topology is returned. In at least one embodiment, indication that both graphs have a different topology may be provided as a return value to a function called to perform method 3500. In at least one embodiment, method 3500 ends upon completing step 3570.

In at least one embodiment, steps of method 3500 may be performed in different orders than is indicated in FIG. 35. In at least one embodiment, steps 3540 and 3550 may be performed before steps 3520 and 3530. In at least one embodiment, steps 3520 and 3540 may be performed concurrently by comparing both a type and dependencies of each node one node at a time.

Referring back to FIG. 34, in at least one embodiment and at a step 3420, it is determined whether topologies of new task graph and executable graph are a same topology based on comparisons performed during step 3410. In at least one embodiment, a result returned by steps 3560 or 3570 may be used to determine whether topologies of new task graph and executable graph are a same or different topologies. In at least one embodiment, when topologies of new task graph and executable graph are a same topology, parameters of new task graph are applied to executable graph beginning with a step 3430. In at least one embodiment, when topologies of new task graph and executable graph are a different topology, failure in applying new task graph to executable graph is returned using a step 3460.

In at least one embodiment, at step 3430, parameters of new task graph are applied to executable task. In at least one embodiment, in order to modify executable graph so that executable graph can perform a workload of new task graph, executable graph is modified based on parameters of new task. In at least one embodiment, modifications that may be made to an executable graph may interfere with and/or break one or more of the optimizations performed during step 3220. In at least one embodiment, modifications that may be made to an executable graph do not interfere with optimizations performed during step 3220. In at least one embodiment, topology comparison of step 3410 has already confirmed that tasks and dependencies of new task graph and executable graph have corresponding nodes of a same type with same dependencies. In at least one embodiment, application of parameters of new task graph to executable graph is limited so that any modifications to parameters of nodes in executable graph when applying parameters of new task graph are limited to certain types of parameters for certain types of tasks. In at least one embodiment, permissible modifications to an executable graph may be limited to certain types of parameters for certain types of tasks, which do not interfere with optimizations applied during step 3220.

In at least one embodiment, a node corresponding to a host task, which involves an associated computing resource triggering a callback function on a host CPU, may include modifiable parameters that include one or more of an identifier, such as a pointer, of callback function on a host CPU and/or data accessible to an associated computing device that is to be passed to a callback function as one or more arguments. In at least one embodiment, modifications to callback function and/or argument parameters may be possible because these modifications do not modify a function being performed by an associated computing resource to perform a host task or interfere with any optimizations typically applied to a host task during generation of an executable graph.

In at least one embodiment, a node corresponding to a memory set task, which involves an associated computing resource setting a block of memory accessible to an associated computing resource to a specified fill value, may have modifiable parameters that include one or more of a starting location of a block of memory, a size of a block of memory, and/or a fill value to which memory locations in a block of memory are to be set. In at least one embodiment, a size of a block of memory may correspond to a number of memory words of a one-dimensional block of memory, a number of rows and columns of a two-dimensional block of memory, etc. In at least one embodiment, modifications to location, size, and/or fill value parameters do not modify a function being performed by an associated computing resource to perform a memory set task and/or interfere with any optimizations typically applied to a memory set task during generation of an executable graph. In at least one embodiment, it may not be possible to modify a block type of a block of memory, such as from a one-dimensional block to a two-dimensional block or vice versa, and/or a type of a memory being set, such as between global, local, texture, constant, shared, register, etc. memories, because these types of modifications may involve different implementations of a memory set task.

In at least one embodiment, a node corresponding to a memory copy task, which involves an associated computing resource moving contents from a block of memory accessible to an associated computing resource to another block of memory accessible to associated computing resource, may have modifiable parameters that include one or more of a source location of a block of memory, a destination location of another block of memory, and/or a size of an amount of memory to copy. In at least one embodiment, a size of an amount of memory to copy may correspond to a number of memory words of a one-dimensional block of memory, a number of rows and columns of a two-dimensional block of memory, etc. In at least one embodiment, modifications to source location, destination location, and/or size parameters do not modify a function being performed by an associated computing resource to perform a memory copy task or interfere with any optimizations typically applied to a memory copy task during generation of an executable graph. In at least one embodiment, it may not be possible to modify a block type of a memory being copied, such as from a one-dimensional block to a two-dimensional block or vice versa, and/or a type of memory in either block of memory, such as between global, local, texture, constant, shared, register, etc. memories because these types of modifications may involve different implementations of a memory copy task.

In at least one embodiment, a node corresponding to a kernel task, which involves an associated computing resource performing a compute task, may have modifiable parameters that include a number of threads to use and/or pointers to data accessible to associated computing resource that are arguments to a compute task. In at least one embodiment, modifications to these parameters may be possible as they do not modify a function being performed by an associated computing resource to perform a kernel task or interfere with any optimizations typically applied to a kernel task during generation of an executable graph. In at least one embodiment, it may not be possible to modify a starting address of a compute task, a compute task to perform, a pointer to a next task to be performed, etc. as these modify an underlying computing task and/or may interfere with dependencies between tasks in an executable graph.

In at least one embodiment, at a step 3440, it is determined whether parameters of new task graph have been successfully applied to executable graph by step 3430. In at least one embodiment, when each parameter of new task graph is successfully applied to executable graph, success is returned using a step 3450. In at least one embodiment, when any parameter of new task graph cannot be successfully applied to executable graph, failure is returned using step 3460.

In at least one embodiment, at step 3450, a result indicating that new task graph has been successfully applied to executable graph is returned. In at least one embodiment, success in applying new task graph to executable graph may be provided as a return value to a function called to perform method 3400. In at least one embodiment, method 3400 ends upon completing step 3450.

In at least one embodiment, at step 3460, a result indicating that new task graph has not been successfully applied to executable graph is returned. In at least one embodiment, failure in applying new task graph to executable graph may be provided as a return value to a function called to perform method 3400. In at least one embodiment, method 3400 ends upon completing step 3460.

In at least one embodiment, steps of method 3400 may be performed in different orders than is indicated in FIG. 34. In at least one embodiment, steps 3410 and 3430 may be performed concurrently by comparing topologies of a new task graph and an executable graph and applying parameters of new task graph to executable graph in a same pass through nodes of new task graph and executable graph. In at least one embodiment, any failures detected and/or encountered during comparing of topologies of a new task graph and an executable graph and/or in applying parameters of new task graph to executable graph may be reported to a log, a user, a user interface, etc. In at least one embodiment, a failure may be reported via an alert, a warning, an error, etc. In at least one embodiment, a failure may be reported with an explanation as to a source of failure. In at least one embodiment, reporting of a failure may aid a user changing how a task graph is built to avoid a recurrence of a failure.

Referring back to FIG. 32, in at least one embodiment and at a step 3260 it is determined whether another task graph is successfully applied to executable graph. In at least one embodiment, success of each API and/or library functions call made during step 3250 to apply another task graph to executable graph may be determined based on a status and/or error code returned by each API and/or library function call. In at least one embodiment, a status and/or an error code may correspond to success returned by step 3450 and/or failure returned by step 3460. In at least one embodiment, when another task graph is successfully applied to executable graph, executable graph may be launched one or more times by returning to step 3230 where executable graph is used to cause one or more computing resources to perform another workload of another task graph with each launch of executable graph. In at least one embodiment, when another task graph is not successfully applied to executable graph, control is returned to step 3220 where a new executable graph is generated from another task graph. In at least one embodiment, new executable graph may then be launched to cause one or more computing resources to perform a workload of another task graph using step 3230.

In at least one embodiment, even when executable graph obtained by applying another task graph to executable graph using step 3250 may result in a slower performance of another workload than if executable graph is generated from another task graph using step 3220, a time savings by avoiding overhead of generating another executable graph from another task graph using step 3220 may result in a shorter overall processing time to get another workload performed. In at least one embodiment, executable graph obtained by applying another task graph to executable graph using step 3250 may result in a slower performance of another workload when applying another task graph to executable graph using step 3250 interferes with and/or breaks one or more optimizations applied to executable graph when executable graph was created.

In sum, the disclosed techniques may be used to allow an executable graph to perform a workload associated with a new task graph. In at least one embodiment, a task graph describing a workload is built. An executable graph is then generated from task graph by using a process such as instantiation. An executable graph is then launched one or more times with each launch of executable graph resulting in a workload of task graph being performed. Another task graph describing another workload is then built. Instead of generating a new executable graph from another task graph, one or more API and/or library function calls are then used to attempt to apply another task graph to already generated executable graph. An attempt to apply another task graph to an executable graph includes comparing topologies of another task graph and executable graph to see if those topologies are a same topology. If topologies are a same topology, then parameters of another task graph is applied to executable graph. If each parameter of another task graph is successfully applied to executable graph, then executable graph can be launched to cause one or more computing resources to perform another workload of another task graph without having to incur overhead of generating a new executable graph from another task graph. If another task graph cannot be successfully applied to executable graph, a new executable graph is generated from another task graph.

At least one technical advantage of the disclosed embodiments is that the disclosed embodiments can be used to apply a new task graph to an executable graph generated from another task graph, so that executable graph can be executed to perform another workload without having to generate an additional executable graph and/or know a topology of any of a task graph and/or executable graph. Thus, with the disclosed embodiments, one or more computing resources can be caused to perform different workloads without having to incur oftentimes significant overhead associated with generating a new executable graph each time a new task graph is built. In contrast to prior art approaches, the disclosed embodiments enable a single executable graph to be used to cause one or more computing resources to perform multiple different workloads, which reduces overall execution time relative to prior art approaches. These technical advantages provide one or more technological advancements over prior art approaches.

1. In at least one embodiment, a non-transitory computer-readable medium that includes instructions that, when executed by one or more processors, cause the one or more processors to execute at least one application programming interface (API) call to modify an executable version of a first task graph by applying a non-executable version of a second task graph to the executable version of the first task graph.

2 The non-transitory computer-readable medium according to clause 1, wherein the non-executable version of the second task graph is applied to the executable version of the first graph by: comparing a first topology associated with the executable version of the first task graph to a second topology associated with the non-executable version of the second task graph; determining that the first topology is a same topology as the second topology; and applying one or more parameters of the non-executable version of the second task graph to the executable version of the first task graph.

3. The non-transitory computer-readable medium of according to clause 1 or clause 2, wherein after the one or more parameters of the non-executable version of the second task graph are applied to the executable version of the first task graph, the executable version of the first task graph, upon launch, configures one or more computing resources to perform a workload associated with the non-executable version of the second task graph rather than a workload associated with a non-executable version of the first task graph.

4. The non-transitory computer-readable medium according to any of clauses 1-3, wherein, when a first parameter of the non-executable version of the second task graph is applied to the executable version of the first task graph, the first parameter does not interfere with an optimization that was incorporated into the executable version of the first task graph when the executable version of the first task graph was generated from the non-executable version of the first task graph.

5 The non-transitory computer-readable medium according to any of clauses 1-4, wherein applying a first parameter of the non-executable version of the second task graph to a corresponding parameter of the executable version of the first task graph changes the corresponding parameter, the corresponding parameter comprises: a pointer to a callback function on a host central processing unit or to an argument of the callback function for a host task associated with the executable version of the first task graph; a location of a block of memory to set, a size of the block of memory, or a fill value of the block of memory for a memory set task associated with the executable version of the first task graph; a location of a block of source memory, a location of a destination where contents of the source memory are to be copied, or a size of the block of source memory for a memory copy task associated with the executable version of the first task; or a number of threads or one or more arguments for a kernel task associated with the executable version of the first graph.

6. The non-transitory computer-readable medium according to any of clauses 1-5, wherein the first topology is compared to the second topology by: determining whether each node included in the first topology corresponds to a node included in the second topology having a same task type; and determining whether each node included in the second topology corresponds to a node included in the first topology having a same task type.

7. The non-transitory computer-readable medium according to any of clauses 1-6, wherein a node included in the first topology corresponds to a node included in the second topology when both nodes are associated with a same creation order value.

8. The non-transitory computer-readable medium according to any of clauses 1-7, wherein the first topology is further compared to the second topology by determining whether each node included in the first topology a corresponding node included in the second topology have a same list of dependencies.

9. The non-transitory computer-readable medium according to any of clauses 1-8, wherein the first topology is further compared to the second topology by determining whether the first topology and the second topology have a same number of nodes.

10. In at least one embodiment, a computer-implemented method for applying a new task graph to an executable graph comprises: modifying an executable version of a first task graph by applying a non-executable second task graph to the executable version of the first task graph.

11. The computer-implemented method according to clause 10, further comprising, after the non-executable second task graph is applied to the executable version of the first task graph, the executable version of the first task graph, upon launch, configures one or more computing resources to perform a workload associated with the non-executable version of the second task graph rather than a workload associated with a non-executable version of the first task graph.

12. The computer-implemented method according to clause 10 or clause 11, wherein applying the second task graph to the executable version of the first graph comprises: comparing a first topology of the executable version of the first task graph to a second topology of the non-executable version of the second task graph; and when the first topology is a same topology as the second topology, applying parameters of the second task graph to the executable version of the first task graph.

13. The computer-implemented method according to any of clauses 10-12, wherein applying a first parameter of the non-executable second task graph to a corresponding parameter of the executable version of the first task graph changes the corresponding parameter, the corresponding parameter comprises: a pointer to a callback function on a host central processing unit or to an argument of the callback function for a host task associated with the executable version of the first task graph; a location of a block of memory to set, a size of the block of memory, or a fill value of the block of memory for a memory set task associated with the executable version of the first task graph; a location of a block of source memory, a location of a destination where contents of the source memory are to be copied, or a size of the block of source memory for a memory copy task associated with the executable version of the first task; or a number of threads or one or more arguments for a kernel task associated with the executable version of the first graph.

14. The computer-implemented method according to any of clauses 10-13, wherein comparing the first topology to the second topology comprises one or more of: determining whether the first topology and the second topology have a same number of nodes; determining whether each first node in the first topology has a corresponding second node in the second topology with a same task type; determining whether each second node in the second topology has a corresponding first node in the first topology with a same task type; determining whether each first node in the first topology and the corresponding second node in the second topology have a same list of dependencies; or determining whether each second node in the second topology and the corresponding first node in the first topology have a same list of dependencies.

15. The computer-implemented method according to any of clauses 10-14, wherein at least one of the first task graph or the second task graph comprises a Compute Unified Device Architecture (CUDA) graph or an executable Heterogeneous compute Interface for Portability (HIP) graph.

16. In at least one embodiment, a computer-implemented method for applying a new task graph to an executable graph comprises: generating an executable graph from a non-executable first task graph, wherein the executable graph configures one or more computing resources to perform a first workload associated with the non-executable first task graph; and modifying the executable graph by applying one or more parameters of a non-executable second task graph to the executable graph, wherein the modified executable graph configures the one or more computing resources to perform a second workload that is associated with the non-executable second task graph and is different than the first workload.

17. The computer-implemented method according to clause 16, wherein applying the non-executable second task graph to the executable graph comprises: comparing a first topology of the executable graph to a second topology of the non-executable second task graph; and when the first topology and the second topology are a same topology, applying parameters of the non-executable second task graph to the executable graph.

18. The computer-implemented method according to clause 16 or clause 17, wherein comparing the first topology to the second topology comprises determining whether a first node in the first topology and a corresponding second node in the second topology have a same type and a same list of dependencies.

19. The computer-implemented method according to any of clauses 16-18, wherein the corresponding second node corresponds to the first node when both the first node and the second node are associated with a same creation order value.

20. The computer-implemented method according to any of clauses 16-19, wherein at least one of the first task graph or the second task graph comprises a Compute Unified Device Architecture (CUDA) graph or an executable Heterogeneous compute Interface for Portability (HIP) graph.

Any and all combinations of any of the claim elements recited in any of the claims and/or any elements described in this application, in any fashion, fall within the contemplated scope of the present embodiments and protection.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). Number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. Set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A non-transitory computer-readable medium that includes instructions that, when executed by one or more processors, cause the one or more processors to execute at least one application programming interface (API) call to modify a processor-executable version of a first task graph by applying one or more parameters of a non-processor-executable version of a second task graph to the processor-executable version of the first task graph to cause the modified processor-executable version of the first task graph to use one or more computing resources to perform one or more tasks differently than the processor-executable version of the first task graph before modification.

2. The non-transitory computer-readable medium of claim 1, wherein the non-processor-executable version of the second task graph is applied to the processor-executable version of the first task graph by:
comparing a first topology associated with the processor-executable version of the first task graph to a second topology associated with the non-processor-executable version of the second task graph;
determining that the first topology is a same topology as the second topology; and
applying one or more parameters of the non-processor-executable version of the second task graph to the processor-executable version of the first task graph.

3. The non-transitory computer-readable medium of claim 2, wherein after the one or more parameters of the non-processor-executable version of the second task graph are applied to the processor-executable version of the first task graph, the processor-executable version of the first task graph, upon launch, configures one or more computing resources to perform a workload associated with the non-processor-executable version of the second task graph rather than a workload associated with a non-processor-executable version of the first task graph.

4. The non-transitory computer-readable medium of claim 2, wherein, when a first parameter of the non-processor-executable version of the second task graph is applied to the processor-executable version of the first task graph, the first parameter does not interfere with an optimization that was incorporated into the processor-executable version of the first task graph when the processor-executable version of the first task graph was generated from the non-processor-executable version of the first task graph.

5. The non-transitory computer-readable medium of claim 2, wherein applying a first parameter of the non-processor-executable version of the second task graph to a corresponding parameter of the processor-executable version of the first task graph changes the corresponding parameter, the corresponding parameter comprises:
a pointer to a callback function on a host central processing unit or to an argument of the callback function for a host task associated with the processor-executable version of the first task graph;
a location of a block of memory to set, a size of the block of memory, or a fill value of the block of memory for a memory set task associated with the processor-executable version of the first task graph;
a location of a block of source memory, a location of a destination where contents of the source memory are to be copied, or a size of the block of source memory for a memory copy task associated with the processor-executable version of the first task graph; or
a number of threads or one or more arguments for a kernel task associated with the processor-executable version of the first task graph.

6. The non-transitory computer-readable medium of claim 2, wherein the first topology is compared to the second topology by:
determining whether each node included in the first topology corresponds to a node included in the second topology having a same task type; and
determining whether each node included in the second topology corresponds to a node included in the first topology having a same task type.

7. The non-transitory computer-readable medium of claim 6, wherein a node included in the first topology corresponds to a node included in the second topology when both nodes are associated with a same creation order value.

8. The non-transitory computer-readable medium of claim 6, wherein the first topology is further compared to the second topology by determining whether each node included in the first topology and a corresponding node included in the second topology have a same list of dependencies.

9. The non-transitory computer-readable medium of claim 6, wherein the first topology is further compared to the second topology by determining whether the first topology and the second topology have a same number of nodes.

10. A computer-implemented method for applying a new task graph to a processor-executable graph, the method comprising:
modifying a processor-executable version of a first task graph by applying one or more parameters of a non-processor-executable version of a second task graph to the processor-executable version of the first task graph to cause the modified processor-executable version of the first task graph to use one or more computing resources to perform one or more tasks differently than the processor-executable version of the first task graph before modification.

11. The computer-implemented method of claim 10, further comprising, after the non-processor-executable version of the second task graph is applied to the processor-executable version of the first task graph, the processor-executable version of the first task graph, upon launch, configures one or more computing resources to perform a workload associated with the non-processor-executable version of the second task graph rather than a workload associated with a non-processor-executable version of the first task graph.

12. The computer-implemented method of claim 10, wherein applying the second task graph to the processor-executable version of the first task graph comprises:
comparing a first topology of the processor-executable version of the first task graph to a second topology of the non-processor-executable version of the second task graph; and
when the first topology is a same topology as the second topology, applying parameters of the second task graph to the processor-executable version of the first task graph.

13. The computer-implemented method of claim 12, wherein applying a first parameter of the non-processor-executable version of the second task graph to a corresponding parameter of the processor-executable version of the first task graph changes the corresponding parameter, the corresponding parameter comprises:
a pointer to a callback function on a host central processing unit or to an argument of the callback function for a host task associated with the processor-executable version of the first task graph;
a location of a block of memory to set, a size of the block of memory, or a fill value of the block of memory for a memory set task associated with the processor-executable version of the first task graph;
a location of a block of source memory, a location of a destination where contents of the source memory are to be copied, or a size of the block of source memory for a memory copy task associated with the processor-executable version of the first task graph; or
a number of threads or one or more arguments for a kernel task associated with the processor-executable version of the first task graph.

14. The computer-implemented method of claim 12, wherein comparing the first topology to the second topology comprises one or more of:
- determining whether the first topology and the second topology have a same number of nodes;
- determining whether each first node in the first topology has a corresponding second node in the second topology with a same task type;
- determining whether each second node in the second topology has a corresponding first node in the first topology with a same task type;
- determining whether each first node in the first topology and the corresponding second node in the second topology have a same list of dependencies; or
- determining whether each second node in the second topology and the corresponding first node in the first topology have a same list of dependencies.

15. The computer-implemented method of claim 10, wherein at least one of the first task graph or the second task graph comprises a Compute Unified Device Architecture (CUDA) graph or an executable Heterogeneous compute Interface for Portability (HIP) graph.

16. The computer-implemented method of claim 10, wherein applying the non-processor-executable version of the second task graph to the processor-executable version of the first task graph comprises adapting the processor-executable version of the first task graph to perform a workload of the second task graph.

17. A computer-implemented method for applying a new task graph to an executable graph, the method comprising:
- generating a processor-executable task graph from a non-processor-executable first task graph, wherein the executable task graph configures one or more computing resources to perform a first workload associated with the non-processor-executable first task graph; and
- modifying the processor-executable task graph by applying one or more parameters of a non-processor-executable second task graph to the processor-executable task graph,
- wherein the modified processor-executable task graph configures the one or more computing resources differently than the processor-executable task graph before modification to perform a second workload that is associated with the non-processor-executable second task graph and is different than the first workload.

18. The computer-implemented method of claim 17, wherein applying the non-processor-executable second task graph to the processor-executable task graph comprises:
- comparing a first topology of the processor-executable task graph to a second topology of the non-processor-executable second task graph; and
- when the first topology and the second topology are a same topology, applying parameters of the non-processor-executable second task graph to the processor-executable task graph.

19. The computer-implemented method of claim 18, wherein comparing the first topology to the second topology comprises determining whether a first node in the first topology and a corresponding second node in the second topology have a same type and a same list of dependencies.

20. The computer-implemented method of claim 19, wherein the corresponding second node corresponds to the first node when both the first node and the second node are associated with a same creation order value.

21. The computer-implemented method of claim 17, wherein at least one of the first task graph or the second task graph comprises a Compute Unified Device Architecture (CUDA) graph or an executable Heterogeneous compute Interface for Portability (HIP) graph.

* * * * *